US008878760B2

(12) United States Patent
Kawabata et al.

(10) Patent No.: US 8,878,760 B2
(45) Date of Patent: Nov. 4, 2014

(54) LIQUID CRYSTAL DISPLAY DEVICE, METHOD FOR DRIVING LIQUID CRYSTAL DISPLAY DEVICE, AND TELEVISION RECEIVER

(75) Inventors: Masae Kawabata, Osaka (JP); Fumikazu Shimoshikiryoh, Osaka (JP); Toshikazu Tsuchiya, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 321 days.

(21) Appl. No.: 12/998,724

(22) PCT Filed: Oct. 5, 2009

(86) PCT No.: PCT/JP2009/067359
§ 371 (c)(1),
(2), (4) Date: May 25, 2011

(87) PCT Pub. No.: WO2010/061686
PCT Pub. Date: Jun. 3, 2010

(65) Prior Publication Data
US 2011/0221970 A1    Sep. 15, 2011

(30) Foreign Application Priority Data
Nov. 26, 2008 (JP) ................. 2008-301294

(51) Int. Cl.
G09G 3/36 (2006.01)
G06F 3/038 (2013.01)
G09G 5/00 (2006.01)
G09G 5/10 (2006.01)
G02F 1/1362 (2006.01)

(52) U.S. Cl.
CPC ...... *G09G 3/3614* (2013.01); *G09G 2320/0233* (2013.01); *G02F 1/136213* (2013.01); *G09G 2300/0447* (2013.01); *G09G 2310/08* (2013.01); *G09G 2300/0413* (2013.01); *G09G 2310/0202* (2013.01)
USPC ............. 345/94; 345/204; 345/690; 345/87; 345/96; 345/103

(58) Field of Classification Search
USPC ..................... 345/204, 690, 87–104
See application file for complete search history.

(56) References Cited

U.S. PATENT DOCUMENTS 4,792,857 A * 12/1988 Akiyama ............... 348/793
5,699,076 A * 12/1997 Tomiyasu ............... 345/103
(Continued)

FOREIGN PATENT DOCUMENTS

| JP | 11352938 A | | 12/1999 |
|---|---|---|---|
| JP | 2001-051252 A | | 2/2001 |
| JP | 2004-046236 A | | 2/2004 |
| JP | 2004046236 A | * | 2/2004 |
| JP | 2004062146 A | | 2/2004 |
| JP | 2006-039290 A | | 2/2006 |
| JP | 2006-039542 A | | 2/2006 |
| WO | WO-2008/139695 A1 | | 11/2008 |
| WO | WO-2008139693 A1 | | 11/2008 |

*Primary Examiner* — Ilana Spar
(74) *Attorney, Agent, or Firm* — Harness, Dickey & Pierce

(57) ABSTRACT

At least one embodiment of a liquid crystal display device including: scanning signal lines provided in a display area; and a dummy scanning signal line provided in a non-display area, the scanning signal lines being divided into groups each of which includes a plurality of scanning signal lines, the groups being sequentially selected, signal electric potentials of an identical polarity being sequentially supplied to a data signal line while scanning signal lines belonging to a selected group are sequentially scanned horizontally, the polarity of the signal electric potentials being inverted when the selected group is changed from a preceding group to a succeeding group which is selected immediately after the preceding group, a dummy scanning period being inserted between a horizontal scanning period corresponding to last horizontal scanning in the preceding group and a horizontal scanning period corresponding to first horizontal scanning in the succeeding group, and the dummy scanning signal line being subjected to dummy scanning during the dummy scanning period. With the arrangement, it is possible to suppress horizontal-shaped unevenness that occurs in a case where block inversion driving is carried out.

33 Claims, 35 Drawing Sheets

(56) References Cited

U.S. PATENT DOCUMENTS

| | | | |
|---|---|---|---|
| 6,335,719 B1 * | 1/2002 | An et al. | 345/98 |
| 6,903,716 B2 * | 6/2005 | Kawabe et al. | 345/99 |
| 2003/0227429 A1 | 12/2003 | Shimoshikiryo | |
| 2005/0213015 A1 | 9/2005 | Shimoshikiryo | |
| 2006/0023137 A1 | 2/2006 | Kamada et al. | |
| 2006/0041805 A1 | 2/2006 | Song | |
| 2006/0256271 A1 | 11/2006 | Shimoshikiryo | |
| 2009/0085860 A1 * | 4/2009 | Huang et al. | 345/102 |
| 2010/0097366 A1 | 4/2010 | Kitayama et al. | |
| 2010/0118012 A1 | 5/2010 | Irie et al. | |
| 2011/0221971 A1 | 9/2011 | Shimoshikiryoh et al. | |
| 2011/0221972 A1 | 9/2011 | Kawabata et al. | |

* cited by examiner

FIG. 30

FIG. 36

LIQUID CRYSTAL DISPLAY DEVICE, METHOD FOR DRIVING LIQUID CRYSTAL DISPLAY DEVICE, AND TELEVISION RECEIVER

TECHNICAL FIELD

The present invention relates to driving (block inversion driving) in which a polarity of signal electric potentials supplied to a data signal line is inverted every plural horizontal scanning periods.

BACKGROUND ART

Liquid crystal display devices have excellent features such as high definition, low profile, light weight, and low power consumption. In recent years, a market scale of liquid crystal display devices has been rapidly increasing. In liquid crystal display devices, dot inversion driving in which a polarity of signal electric potentials supplied to a data signal line is inverted every 1 horizontal scanning period has been widely employed. However, in the dot inversion driving, polarity inversion frequency of the data signal line becomes high. This results in occurrence of problems such as reduction in pixel charging rate and increase in power consumption. In view of this, Patent Literature 1 for example proposes block inversion driving in which a polarity of signal electric potentials supplied to a data signal line is inverted every plural horizontal scanning periods. This block inversion driving allows an improvement in pixel charging rate and suppression of power consumption and heat generation, as compared with the dot inversion driving.

Patent Literature 1 discloses an arrangement in which a dummy scanning period is inserted immediately after polarity inversion in block inversion driving as shown in FIG. 36. According to the arrangement, a dummy scanning period (third horizontal scanning period in FIG. 36) for pre-charging and a horizontal scanning period (fourth horizontal scanning period in FIG. 36) for main charging (writing) are assigned to data (n+2) that comes immediately after the polarity inversion. This allows an increase in charging rate of a pixel corresponding to the data (n+2).

As a measure for improving viewing angle dependence of gamma characteristics (for example, holding down excess brightness and the like in a screen), Patent Literatures 2 and 3 for example disclose an arrangement in which a plurality of sub-pixels in a pixel are controlled to have different brightness so that a halftone is displayed by an area coverage modulation of these sub-pixels (multi-pixel mode).

CITATION LIST

Patent Literature 1
Japanese Patent Application Publication, Tokukai, No. 2001-51252 (Publication Date: Feb. 23, 2001)
Patent Literature 2
Japanese Patent Application Publication, Tokukai, No. 2004-62146 (Publication Date: Feb. 2, 2004)
Patent Literature 3
Japanese Patent Application Publication, Tokukai, No. 2006-39290 (Publication Date: Feb. 9, 2006)

SUMMARY OF INVENTION

Technical Problem

However, the inventors of the present invention found that the arrangement of FIG. 36 has the following problem. Specifically, before start of writing into a pixel corresponding to data (n+1), two scanning signal lines are active, and therefore load on a scanning signal line driving circuit is Lz. Also before start of writing into a pixel corresponding to data (n+3), two scanning signal lines are active, and therefore load on the scanning signal line driving circuit is Lz. Meanwhile, before start of writing (main charging) into the pixel corresponding to the data (n+2), only one scanning signal line is active, and therefore load on the scanning signal line driving circuit is Ly. In a case where there is variation in load applied to the scanning signal line driving circuit before writing as above, an electric potential written into the pixel corresponding to the data (n+2) differs from electric potentials written into the pixel corresponding to the data (n+1) and into the pixel corresponding to the data (n+3) even if the data (n+1), data (n+2), and data (n+3) are identical data. This may be viewed as stripe-shaped unevenness.

The present invention was attained in view of the above problem, and an object of the present invention is to reduce stripe-shaped unevenness and improve a display quality in a liquid crystal display device which carries out block inversion driving.

Solution to Problem

A present liquid crystal display device is a liquid crystal display device including: scanning signal lines provided in a display area; and a dummy scanning signal line or a plurality of dummy scanning signal lines provided in a non-display area, the scanning signal lines being divided into groups each of which includes a plurality of scanning signal lines, the groups being sequentially selected, signal electric potentials of an identical polarity being sequentially supplied to a data signal line while scanning signal lines belonging to a selected group are sequentially scanned horizontally, the polarity of the signal electric potentials being inverted when the selected group is changed from a preceding group to a succeeding group which is selected immediately after the preceding group, a dummy scanning period or a plurality of dummy scanning periods being inserted between a horizontal scanning period corresponding to last horizontal scanning in the preceding group and a horizontal scanning period corresponding to first horizontal scanning in the succeeding group, and the dummy scanning signal line or the plurality of dummy scanning signal lines being subjected to dummy scanning during the dummy scanning period or the plurality of dummy scanning periods.

The term "horizontal scanning" used herein means that a scanning signal line is activated during a corresponding horizontal scanning period. Activation of a scanning signal line during a horizontal scanning period that does not correspond to the scanning signal line for the purpose of pre-charging etc. is not referred to as "horizontal scanning". Similarly, the term "dummy scanning" used herein means that a dummy scanning signal line is activated during a corresponding dummy scanning period.

According to the arrangement, in a case where a dummy scanning period is inserted immediately after polarity inversion of electric potentials supplied to a data signal line, a fluctuation in load applied to a scanning signal line driving circuit during a horizontal scanning period can be made identical to a fluctuation in load applied to the scanning signal line driving circuit during a dummy scanning period. Accordingly, a status of load applied to the scanning signal line driving circuit at the time of start of scanning, and before and after start of the scanning of one scanning signal line can be made identical to a status of load applied to the scanning signal line driving circuit at the time of start of scanning, and before and after the scanning of another scanning signal line. This makes it possible to reduce a difference in charging rate between (i) pixels connected to scanning signal lines that are subjected to horizontal scanning before and after inversion of electric potentials and (ii) the other blocks. As a result, it is possible to suppress horizontal-striped unevenness which has been a problem in a case where block inversion driving is carried out. Note that the dummy scanning signal lines are provided in the non-display area, and therefore dummy scanning itself does not affect display.

The present liquid crystal display device may be arranged such that a dummy electric potential is supplied to the data signal line during the dummy scanning period or each of the plurality of dummy scanning periods. In this case, the present liquid crystal display device may be arranged such that a polarity of the dummy electric potential is identical to that of the signal electric potentials in the succeeding group.

The present liquid crystal display device may be arranged such that video data that correspond to respective horizontal scanning of the scanning signal lines are arranged in an order identical to that of the horizontal scanning, first through n-th dummy data are inserted between video data corresponding to the last horizontal scanning in the preceding group and video data corresponding to the first horizontal scanning in the succeeding group, the signal electric potentials correspond to the video data, respectively, and the dummy electric potential corresponds to the dummy data. In this case, the present liquid crystal display device may be arranged such that the dummy data is identical to the video data corresponding to the first horizontal scanning in the succeeding group.

The present liquid crystal display device may be arranged such that a time interval between start of a horizontal scanning period and start of horizontal scanning is equal to a time interval between start of a dummy scanning period and start of dummy scanning, and a time interval between end of horizontal scanning and end of a horizontal scanning period is equal to a time interval between end of dummy scanning and end of a dummy scanning period. The present liquid crystal display device may be arranged such that the horizontal scanning period is equal in length to the dummy scanning period or each of the plurality of dummy scanning periods.

The present liquid crystal display device may be arranged such that in a case where the plurality of dummy scanning signal lines are provided in the non-display area and where the plurality of dummy scanning periods are inserted between the horizontal scanning period corresponding to the last horizontal scanning in the preceding group and the horizontal scanning period corresponding to the first horizontal scanning in the succeeding group, different dummy scanning signal lines are subjected to dummy scanning during the plurality of dummy scanning periods. The present liquid crystal display device may be arranged such that an identical dummy scanning signal line is subjected to dummy scanning during the plurality of dummy scanning periods.

The present liquid crystal display device may be arranged such that each of the scanning signal lines is activated in synchronization with start of corresponding horizontal scanning, and is deactivated in synchronization with end of the corresponding horizontal scanning. In this case, the present liquid crystal display device may be arranged such that the dummy scanning signal line or each of the plurality of dummy scanning signal lines is activated in synchronization with start of corresponding dummy scanning, and is deactivated in synchronization with end of the corresponding dummy scanning.

The present liquid crystal display device may be arranged such that each of the scanning signal lines is activated in synchronization with start of horizontal scanning carried out immediately before corresponding horizontal scanning, and is deactivated in synchronization with end of the corresponding horizontal scanning. In this case, the present liquid crystal display device may be arranged such that the dummy scanning signal line or each of the plurality of dummy scanning signal lines is activated in synchronization with start of horizontal scanning carried out immediately before corresponding dummy scanning or start of dummy scanning carried out immediately before the corresponding dummy scanning, and is deactivated in synchronization with end of the corresponding dummy scanning.

The present liquid crystal display device may be arranged such that a width of a gate pulse for activating each of the scanning signal lines is equal to a single horizontal scanning period. The present liquid crystal display device may be arranged such that a width of a gate pulse for activating each of the scanning signal lines is two times as wide as a single horizontal scanning period.

The present liquid crystal display device may be arranged such that each pixel in the display area includes a plurality of sub-pixels. In this case, the present liquid crystal display device may be arranged so as to further include: pixel electrodes; and storage capacitor wires respectively provided corresponding to the pixel electrodes, a single pixel electrode being provided for each of the plurality of sub-pixels, and storage capacitor wire signals respectively supplied to the storage capacitor wires controlling brightness of the plurality of sub-pixels, respectively. The present liquid crystal display device may be arranged such that a storage capacitor wire signal supplied to a storage capacitor wire is not level-shifted during writing of a signal electric potential into a pixel electrode that forms capacitance with the storage capacitor wire, and is level-shifted to a positive side or a negative side relative to a reference electric potential in synchronization with or after end of the writing. In this case, the present liquid crystal display device may be arranged such that a storage capacitor wire signal supplied to a storage capacitor wire that forms capacitance with one of two pixel electrodes included in a pixel is level-shifted in a direction opposite to a direction in which a storage capacitor wire signal supplied to a storage capacitor wire that forms capacitance with the other one of the two pixel electrodes is level-shifted.

The present liquid crystal display device may be arranged such that the storage capacitor wire signal is level-shifted every predetermined period of time until one vertical scanning period elapses from the level-shift. The present liquid crystal display device may be arranged such that the storage capacitor wire signal maintains a same level until one vertical scanning period elapses from the level-shift.

The present liquid crystal display device may be arranged so as to further include a plurality of storage capacitor main wires to which different storage capacitor wire signals are supplied, each of the storage capacitor wires being connected to any one of the plurality of storage capacitor main wires.

The present liquid crystal display device may be arranged such that a single storage capacitor wire is provided per gap between two pixels that are adjacent in a direction in which the data signal line extends, and the single storage capacitor wire forms capacitance with a pixel electrode disposed in one of the two pixels and forms capacitance with a pixel electrode disposed in the other one of the two pixels.

The present liquid crystal display device may be arranged such that a timing adjustment scanning period is inserted between a predetermined horizontal scanning period and a horizontal scanning period or a dummy scanning period which comes next after the predetermined horizontal scanning period, and the dummy scanning signal line is subjected to timing adjustment scanning during the timing adjustment scanning period. In this case, the present liquid crystal display device may be arranged such that the dummy scanning period or the plurality of dummy scanning periods and the timing adjustment scanning period are inserted between a horizontal scanning period corresponding to last horizontal scanning in a next-to-last group and a horizontal scanning period corresponding to first horizontal scanning in a last group.

The present liquid crystal display device may be arranged such that one of the preceding group and the succeeding group includes only odd-numbered scanning signal lines, and the other one of the preceding group and the succeeding group includes only even-numbered scanning signal lines in a case where a predetermined scanning signal line in the display area is a first scanning signal line in counting.

The present liquid crystal display device may be arranged such that the predetermined scanning signal line and subsequent scanning signal lines in the display area are divided into blocks by borders parallel to the scanning signal lines, a group that is selected first is constituted by odd-numbered scanning signal lines included in a most upstream side block or constituted by even-numbered scanning signal lines included in the most upstream side block, the most upstream side block including the predetermined scanning signal line and being disposed at one end, a group that is selected last is constituted by odd-numbered scanning signal lines included in a most downstream side block or constituted by even-numbered scanning signal lines included in the most downstream side block, the most downstream side block being disposed at the other end, each of groups other than the group that is selected first and the group that is selected last is constituted by even-numbered scanning signal lines included in adjacent two blocks or constituted by odd-numbered scanning signal lines included in adjacent two blocks, and the groups are sequentially selected in an order from an upstream side to a downstream side.

The present liquid crystal display device may be arranged such that the predetermined scanning signal line and subsequent scanning signal lines in the display area are divided into blocks by borders parallel to the scanning signal lines, the preceding group includes odd-numbered scanning signal lines included in one of the blocks and the succeeding group includes even-numbered scanning signal lines included in the one of the blocks, or the preceding group includes even-numbered scanning signal lines included in one of the blocks and the succeeding group includes odd-numbered scanning signal lines included in the one of the blocks, and the groups are selected in an order from a group included in a most upstream side block to a group included in a most downstream block, the most upstream side block including the predetermined scanning signal line and being disposed at one end, and the most downstream block being disposed at the other end.

The present liquid crystal display device may be arranged such that a predetermined scanning signal line and subsequent scanning signal lines in the display area are divided into blocks by borders parallel to the scanning signal lines, scanning signal lines in each of the blocks constitute a group, and groups thus created are sequentially selected in an order from a group constituted by scanning signal lines in a most upstream side block to a group constituted by scanning signal lines in a most downstream side block, the most upstream side block including the predetermined scanning signal line and being disposed at one end, and the most downstream block being disposed at the other end.

A present liquid crystal display device includes a plurality of data signal lines; a plurality of scanning signal lines; a dummy scanning signal line provided in a non-display area; a data signal line driving circuit that supplies signal electric potentials of a first polarity to the plurality of data signal lines during a first period constituted by a plurality of successive horizontal scanning periods and that supplies signal electric potentials of a second polarity to the plurality of data signal lines during a second period constituted by a plurality of successive horizontal scanning periods, the second period coming next after the first period; and a scanning signal line driving circuit that activates at least one scanning signal line during each horizontal scanning period and that activates the dummy scanning signal line during a dummy scanning period inserted between the first period and the second period.

In this case, the present liquid crystal display device may be arranged such that the scanning signal line driving circuit activates at least one scanning signal line for a predetermined period of time during each horizontal scanning period, and then deactivates said at least one scanning signal line, and the scanning signal line driving circuit activates the dummy scanning signal line for a predetermined period of time during the dummy scanning period, and then deactivates the dummy scanning signal line. The present liquid crystal display device may be arranged such that the data signal line driving circuit supplies a dummy electric potential of the second polarity to the plurality of data signal lines during the dummy scanning period. The present liquid crystal display device may be arranged such that the scanning signal line driving circuit activates the dummy scanning signal line during a timing adjustment scanning period inserted between a predetermined horizontal scanning period and a horizontal scanning period or a dummy scanning period which comes next after the predetermined horizontal scanning period. The present liquid crystal display device may be arranged such that the scanning signal line driving circuit performs interlace scanning.

A method for driving the present liquid crystal display device which includes scanning signal lines disposed in a display area, and at least one dummy scanning signal line disposed in a non-display area, the scanning signal lines being divided into groups each of which includes a plurality of scanning signal lines, the groups being sequentially selected, and signal electric potentials of an identical polarity being sequentially supplied to a data signal line while scanning signal line belonging to a selected group are sequentially scanned horizontally, includes the steps of: inverting the polarity of the signal electric potentials when the selected group is changed from a preceding group to a succeeding group which is selected immediately after the preceding group, inserting a dummy scanning period between a horizontal scanning period corresponding to last horizontal scanning in the preceding group and a horizontal scanning period corresponding to first horizontal scanning in the succeeding group, and causing the at least one dummy scanning signal line to be subjected to dummy scanning during the dummy scanning period.

The present television receiver includes the liquid crystal display device and a tuner section which receives television broadcast.

Advantageous Effects of Invention

As described above, according to the present liquid crystal display device, in a case where a dummy scanning period is inserted immediately after inversion of a polarity of electric potentials supplied to a data signal line, a fluctuation in load applied to a scanning signal line driving circuit during a horizontal scanning period can be made identical to a fluctuation in load applied to the scanning signal line driving circuit during a dummy scanning period. Accordingly, a status of load applied to the scanning signal line driving circuit before start of scanning, at the time of start of scanning, and during the scanning of one scanning signal line can be made identical to a status of load applied to the scanning signal line driving circuit before start of scanning, at the time of start of scanning, and during the scanning of another scanning signal line. This makes it possible to reduce a difference in charging rate between (i) pixels connected to scanning signal lines that are subjected to horizontal scanning immediately after inversion of electric potentials and (ii) the other blocks, thereby suppressing horizontal-striped unevenness which has been a problem in a case where block inversion driving is carried out.

BRIEF DESCRIPTION OF DRAWINGS

FIG. 30 is a view schematically illustrating an example of how scanning signal lines are divided into groups.

Figure 36:
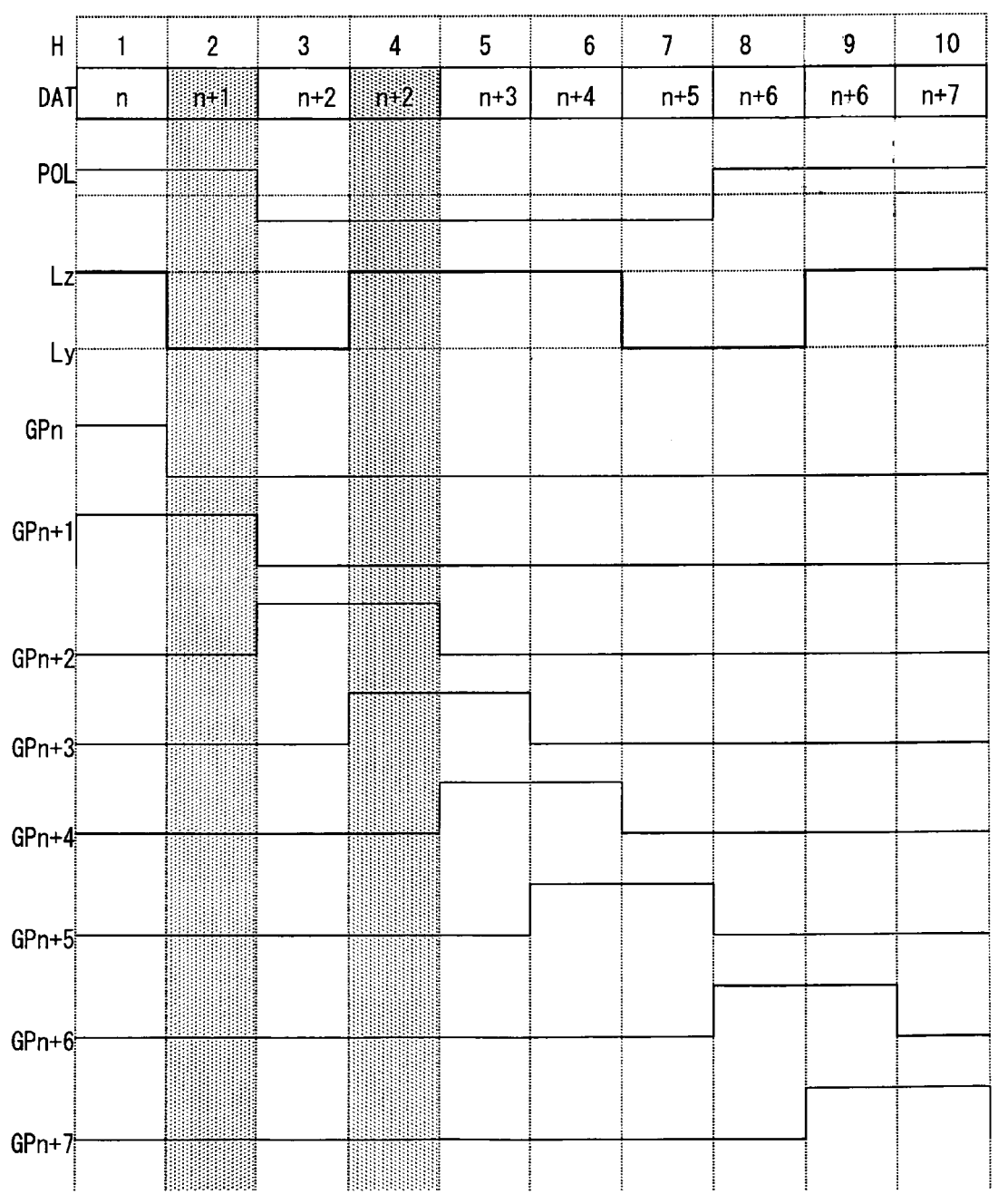

FIG. 36 is a timing chart showing exemplary driving of a conventional liquid crystal display device.

DESCRIPTION OF EMBODIMENTS

Figure 1:
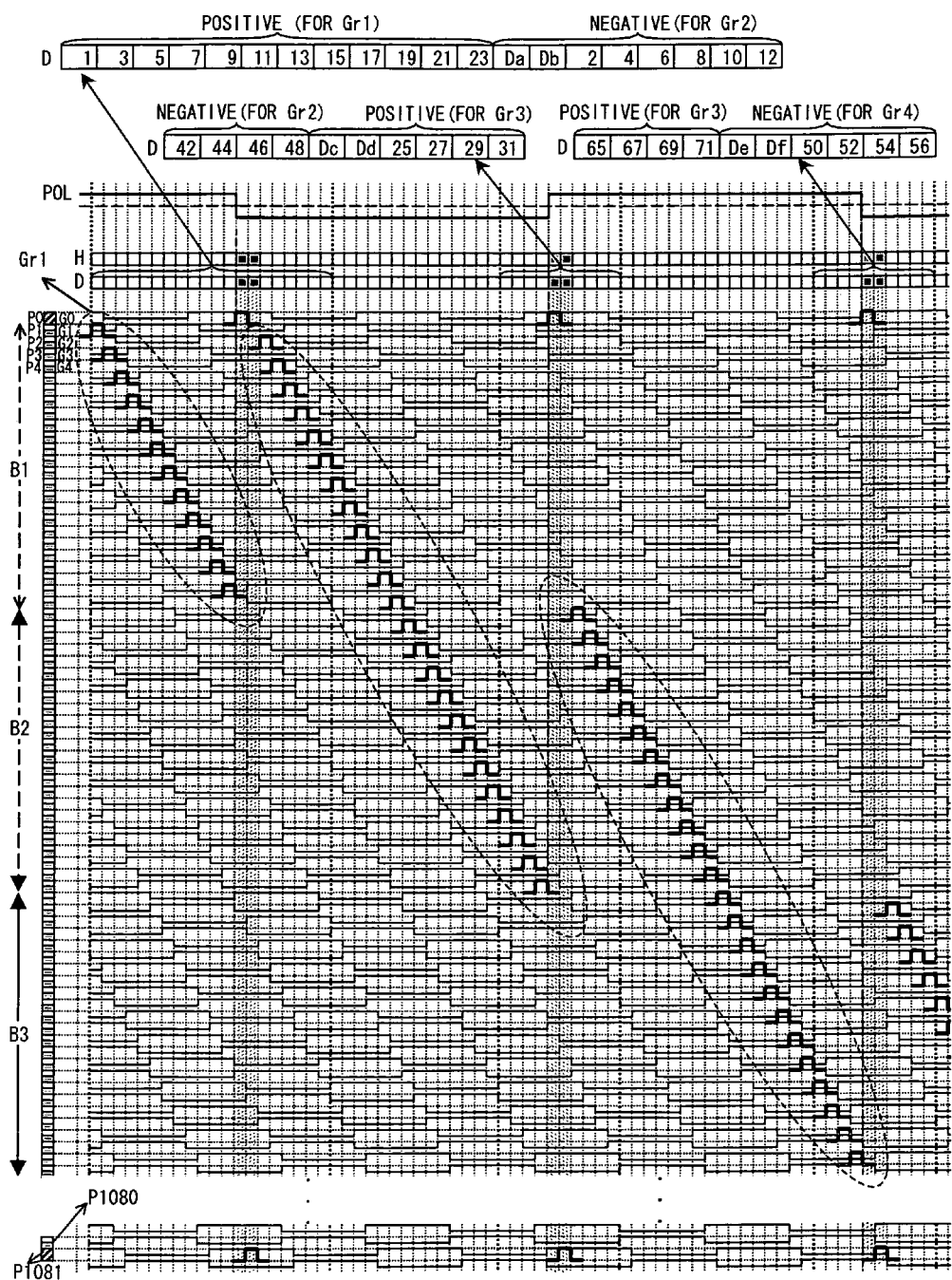
FIG. 1 is a timing chart showing an exemplary driving of a liquid crystal display device of Embodiment 1.

Embodiments of the present invention are described below with reference to FIGS. 1 through 35. FIG. 6 is a view schematically illustrating a display area of the present liquid crystal display device (e.g., normally black mode). As shown in FIG. 6, the display area of the present liquid crystal display device includes scanning signal lines (G1 through G1080), and storage capacitor wires (CS1 through CS1081) parallel to the scanning signal lines. A single pixel includes two sub-pixels aligned in a column direction (a direction in which the data signal lines extend), and a single pixel electrode is provided per sub-pixel. A single storage capacitor wire is provided per gap between two pixels adjacent in the column direction, and forms capacitance with one of pixel electrodes provided in one of the two pixels and forms capacitance with one of pixel electrodes provided in the other one of the two pixels. An upper end portion and a lower end portion of a panel of the present liquid crystal display device are non-display areas. In the upper end portion of the panel, a dummy scanning signal line G0, a dummy storage capacitor wire CS0, and a dummy pixel P0 are provided. In the lower end portion of the panel, a dummy scanning signal line G1081, a dummy storage capacitor wire CS1082, and a dummy pixel P1081 are provided. Each of the dummy pixels has two sub-pixels aligned in the column direction, and a single pixel electrode is provided per sub-pixel.

Specifically, the storage capacitor wires CS1 and CS1081 are provided on both ends of the pixel column, respectively, and a single storage capacitor wire CS(i+1) is provided corresponding to a gap between a pixel Pi (i is an integer in a range from 1 to 1079) and a pixel P(i+1). Note that the pixel Pi is an i-th pixel in the pixel column. Further, the pixel Pi (i is an integer in a range from 1 to 1080) has two pixel electrodes each of which is connected to a scanning signal line G1 and a data signal line SL1 via a transistor. One of the two pixel electrodes forms storage capacitance with a storage capacitor wire CSi, and the other one of the two pixel electrodes forms storage capacitance with the storage capacitor wire CS(i+1). For example, the storage capacitor wire CS1 is provided on one end (upstream side) of the pixel column, the storage capacitor wire CS2 is provided corresponding to a gap between a pixel P1 and a pixel P2, and the storage capacitor wire CS3 is provided corresponding to a gap between the pixel P2 and a pixel P3. The pixel P1 has two pixel electrodes each of which is connected to the scanning signal line G1 and the data signal line SL1 via a transistor, one of the two pixel electrodes forming storage capacitance with the storage capacitor wire CS1, and the other one of the two pixel electrodes forming storage capacitance with the storage capacitor wire CS2. Further, the pixel P2 has two pixel electrodes each of which is connected to the scanning signal line G2 and the data signal line SL1 via a transistor, one of the two pixel electrodes forming storage capacitance with the storage capacitor wire CS2, and the other one of the two pixel electrodes forming storage capacitance with the storage capacitor wire CS3.

Further, the dummy pixel P0 provided in the upper end portion (non-display area) of the panel has two pixel electrodes each of which is connected to the dummy scanning signal line G0 and the data signal line SL1 via a transistor, one of the two pixel electrodes forming storage capacitance with the storage capacitor wire CS0, and the other one of the two pixel electrodes forming storage capacitance with the storage capacitor wire CS1. Meanwhile, the dummy pixel P1081 provided in the lower end portion (non-display area) of the panel has two pixel electrodes each of which is connected to the dummy scanning signal line G1081 and the data signal line SL1 via a transistor, one of the two pixel electrodes forming storage capacitance with the storage capacitor wire CS1081, and the other one of the two pixel electrodes forming storage capacitance with the dummy storage capacitor wire CS1082.

Embodiment 1

Figure 2:
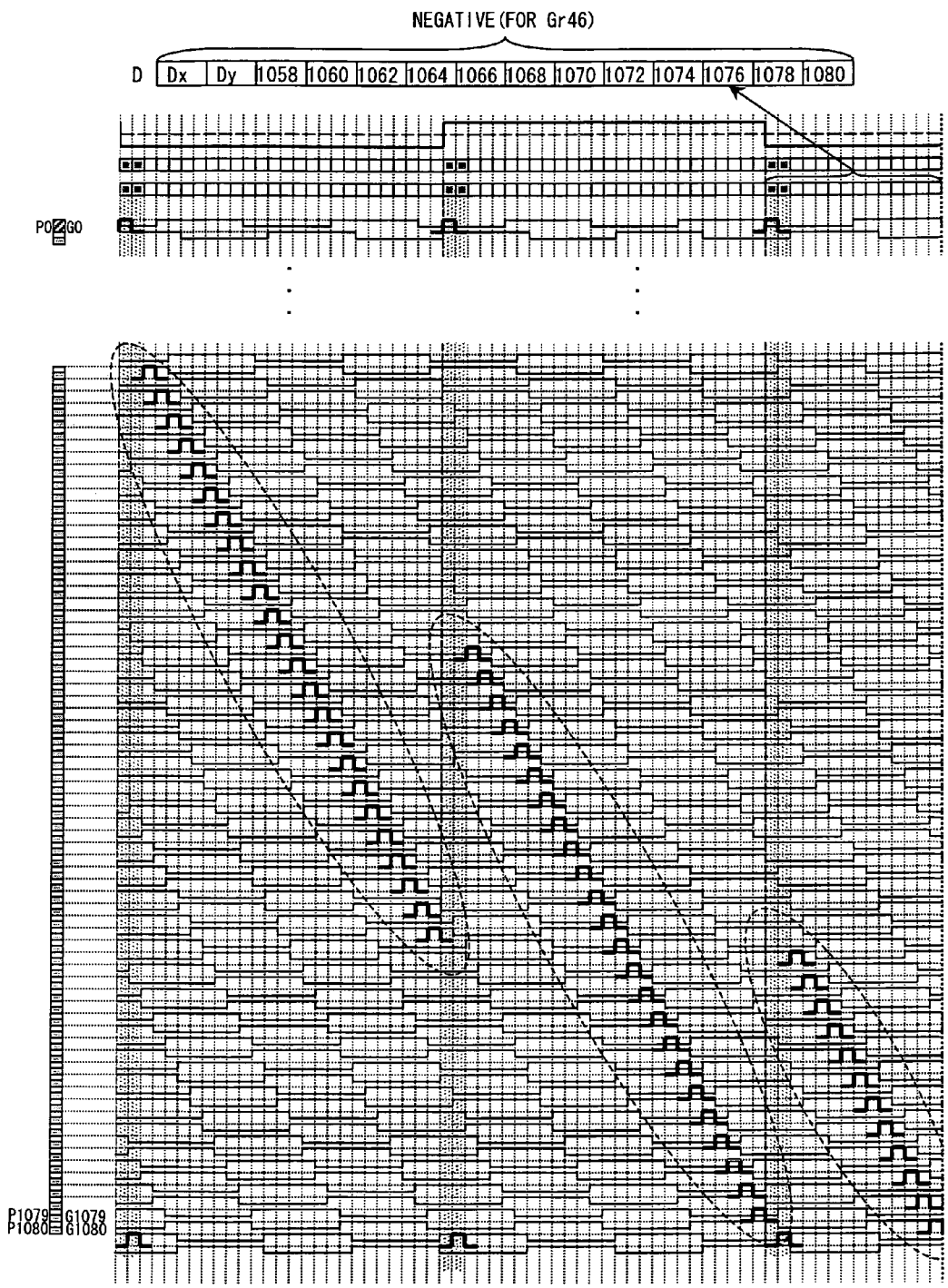
FIG. 2 is a continuation of the timing chart of FIG. 1.

In the present embodiment, the scanning signal lines are interlace-scanned while the data signal lines are subjected to block inversion driving, as shown in FIGS. 1 and 2. First, the scanning signal line G1 and the subsequent scanning signal lines in the display area are divided into 45 blocks (B1 through B45) by 44 borders parallel to the scanning signal lines. Each of the blocks includes 24 successive scanning signal lines. For example, the block B1, which is a most upstream side block, includes the scanning signal lines G1 through G24, the block B2 includes the scanning signal lines G25 through G48, the block B3 includes the scanning signal lines G49 through G72, and the block B45, which is a most downstream side block, includes the scanning signal lines G1057 through G1080.

Then, the scanning signal lines are divided into groups as follows. Specifically, a top group Gr1 is formed which includes 12 odd-numbered scanning signal lines (G1, G3, . . . G23) included in the block B1, which is the most upstream side block, a group Gr2 is formed which includes 24 even-numbered scanning signal lines (G2, G4, . . . G48) included in the block B1 and the subsequent block B2, and a group Gr3 is formed which includes 24 odd-numbered scanning signal lines (G25, G27, . . . G71) included in the second block B2 and the subsequent block B3. Similarly, a process of forming a group including 24 even-numbered scanning signal lines included in a block Bj (j is an odd number in a range from 3 to 43) and a subsequent block B(j+1) and a process of forming a group including 24 odd-numbered scanning signal lines included in a block B(j+1) and a subsequent block B(j+2) are repeated. Thus, groups Gr4 through Gr45 are formed. Lastly, a last group Gr46 is formed which includes 12 even-numbered scanning signal lines (G1058, G1060, . . . G1080) included in the block B45 which is the most downstream side block. The groups Gr1 through Gr46 are sequentially selected in an order from the group Gr1 to the group Gr46. While scanning signal lines included in a selected group are sequentially scanned horizontally, signal electric potentials of an identical polarity are sequentially supplied to a data signal line. Note that the data D1 through D1080 shown in FIGS. 1 and 2 are video data (digital data) corresponding to the pixels P1 through P1080 (see FIG. 3) connected to the scanning signal lines G1 through G1080, respectively, and the polarity inversion signal POL is a signal for controlling a polarity of signal electric potentials supplied to the data signal line SL1. Further, as shown in FIGS. 1 and 2, a polarity (positive or negative) of signal electric potentials supplied to a data signal line is inverted when a selected group is changed from a preceding group to a succeeding group that is selected immediately after the preceding group.

Specifically, the group Gr1 is first selected. While the scanning signal lines (G1, G3, . . . G23) which belong to the group Gr1 are sequentially scanned horizontally, signal electric potentials of a positive polarity that respectively correspond to the video data (D1, D3, . . . D23) are sequentially supplied to the data signal line SL1. Then, the group Gr2 is selected. While the scanning signal lines (G2, G4, . . . G48) which belong to the group Gr2 are sequentially scanned horizontally, signal electric potentials of a negative polarity that respectively correspond to the video data (D2, D4, . . . D48) are sequentially supplied to the data signal line SL1. Then, the group Gr3 is selected. While the scanning signal lines (G25, G27, . . . G71) which belong to the group Gr3 are sequentially scanned horizontally, signal electric potentials of a positive polarity that respectively correspond to the video data (D25, D27, . . . D71) are sequentially supplied to the data signal line SL1. Here, it is assumed that a period in which a signal electric potential corresponding to single video data is supplied (outputted) to a data signal line is a horizontal scanning period (H).

Further, first and second dummy data are inserted between video data corresponding to last horizontal scanning in the preceding group and video data corresponding to first horizontal scanning in the succeeding group, and first and second dummy scanning periods are inserted between a horizontal scanning period corresponding to last horizontal scanning in the preceding group and a horizontal scanning period corresponding to first horizontal scanning in the succeeding group.

During the first dummy scanning period, the dummy scanning signal line G0 is subjected to dummy scanning so as to made active for a predetermined period of time. Then, the dummy scanning signal line G0 is deactivated. During the first dummy scanning period, a dummy electric potential which corresponds to the first dummy data and which has an identical polarity to a polarity of signal electric potentials in the succeeding group is supplied to a data signal line. The first dummy data is identical to video data corresponding to the first horizontal scanning in the succeeding group. Further, during the second dummy scanning period, the dummy scanning signal line G1081 is subjected to dummy scanning so as to made active for a predetermined period of time. Then, the dummy scanning signal line G1081 is deactivated. During the second dummy scanning period, a dummy electric potential which corresponds to the second dummy data and which has an identical polarity to that of the signal electric potentials in the succeeding group is supplied to the data signal line. The second dummy data is identical to video data corresponding to the first horizontal scanning in the succeeding group.

Here, timing of horizontal scanning in each horizontal scanning period is identical to timing of dummy scanning in each dummy scanning period. Specifically, start (start of output of a signal electric potential) and end (end of output of the signal electric potential) of a horizontal scanning period coincide with start (start of writing of the signal electric potential) and end (end of writing of the signal electric potential) of corresponding horizontal scanning, respectively. Further, start (start of output of a dummy electric potential) and end (end of output of the dummy electric potential) of a dummy scanning period coincide with start (start of writing of the dummy electric potential) and end (end of writing of the dummy electric potential) of corresponding dummy scanning, respectively.

Further, each of gate pulses GP1 through GP1080 respectively supplied to scanning signal lines G1 through G1080 and gate pulses GP0 and GP1081 respectively supplied to the dummy scanning signal line G0 and G1081 has a width equal to 1 horizontal scanning period (1H). Accordingly, each scanning signal line is activated at the same time as start of corresponding horizontal scanning, and each dummy scanning signal line also is activated at the same time as start of corresponding dummy scanning.

Figure 4:
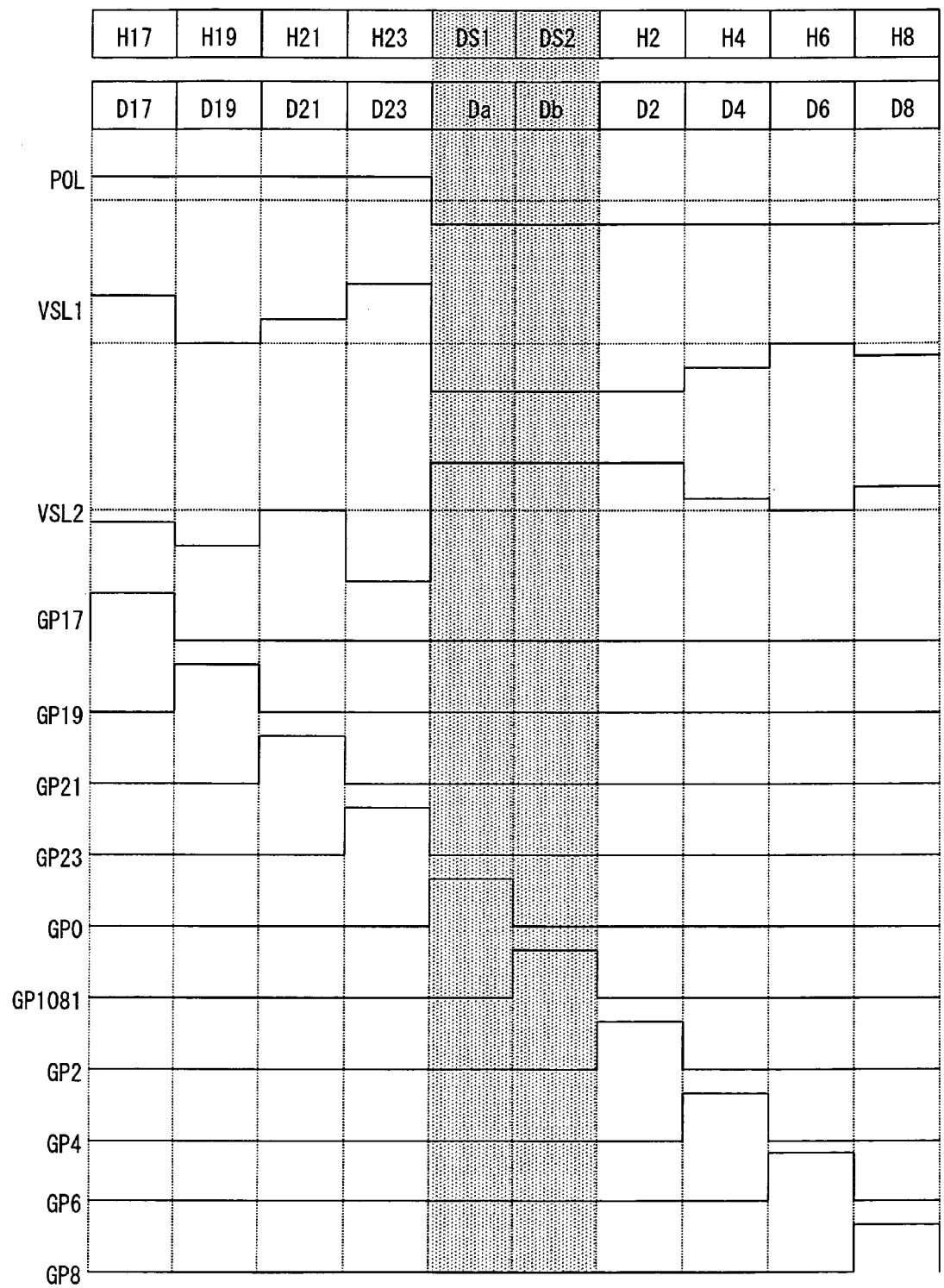
FIG. 4 is a timing chart showing in more detail the exemplary driving shown in FIGS. 1 and 2.

For example, as shown in FIGS. 1 and 4, first dummy data Da and second dummy data Db are inserted between video data D23 corresponding to the last horizontal scanning (horizontal scanning of G23) in the group Gr1 and video data D2 corresponding to first horizontal scanning (horizontal scanning of G2) in the group Gr2, and first dummy scanning period DS1 and second dummy scanning period DS2 are inserted between a horizontal scanning period H23 corresponding to the last horizontal scanning in the group Gr1 and a horizontal scanning period H2 corresponding to the first horizontal scanning in the group Gr2.

The gate pulse GP23 supplied to the scanning signal line G23 is activated at the same time as start of the horizontal scanning period H23, and the gate pulse GP23 is deactivated at the same time as end of the horizontal scanning period H23. During the horizontal scanning period H23, a signal electric potential which corresponds to the video data D23 (video data corresponding to a pixel connected to the scanning signal line G23) and which has the same polarity (positive polarity) as signal electric potentials in the group Gr1 is supplied to the data signal line SL1.

Next, the gate pulse G0 supplied to the dummy scanning signal line G0 is activated at the same time as start of the first dummy scanning period DS1, and the gate pulse G0 is deactivated at the same time as end of the first dummy scanning period DS1. During the first dummy scanning period DS1, a dummy electric potential which corresponds to the first dummy data Da and which has the same polarity (negative polarity) as signal electric potentials in the group Gr2 is supplied to the data signal line SL1. The first dummy data Da is identical to the video data D2 (data of a next frame) corresponding to horizontal scanning of the scanning signal line G2 that is carried out immediately after the dummy scanning.

Next, the gate pulse G1081 supplied to the dummy scanning signal line G1081 is activated at the same time as start of the second dummy scanning period DS2, and the gate pulse G1081 is deactivated at the same time as end of the second dummy scanning period DS2. During the second dummy scanning period DS2, a dummy electric potential which corresponds to the second dummy data Db and which has the same polarity (negative polarity) as the signal electric potentials in the group Gr2 is supplied to the data signal line SL1.

The second dummy data Db is identical to the video data D2 (data of a next frame) corresponding to the horizontal scanning of the scanning signal line G2 that is carried out immediately after the dummy scanning.

Next, the gate pulse GP2 supplied to the scanning signal line G2 is activated at the same time as start of the horizontal scanning period H2, and the gate pulse GP2 is deactivated at the same time as end of the horizontal scanning period H2. During the horizontal scanning period H2, a signal electric potential which corresponds to the video data D2 (video data corresponding to a pixel connected to the scanning signal line G2) and which has the same polarity (negative polarity) as the signal electric potentials in the group Gr2 is supplied to the data signal line SL1. Accordingly, as shown in FIG. 4, an identical electric potential is supplied to the data signal line SL1 throughout the first dummy scanning period DS1, second dummy scanning period DS2, and horizontal scanning period H2.

Figure 3:
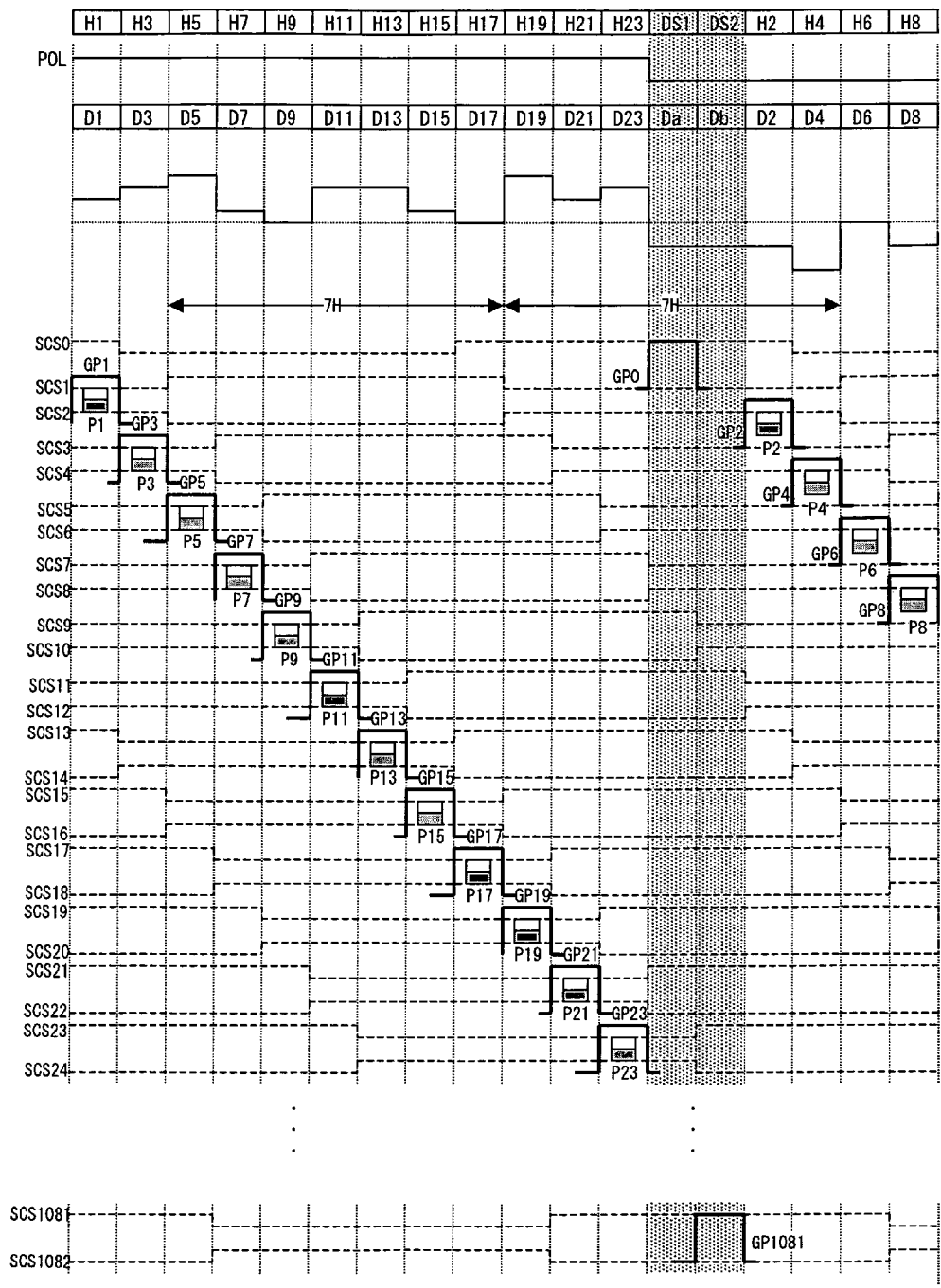
FIG. 3 is a timing chart showing in more detail the exemplary driving shown in FIGS. 1 and 2.

Next, with reference to FIGS. 1 through 4 and FIGS. 7 and 8, the following describes a storage capacitor wire signal SCSi supplied to a storage capacitor wire Csi (i is an integer in a range from 1 to 1081) and storage capacitor wire signals SCS0 and SCS1082 respectively supplied to the dummy storage capacitor wires CS0 and CS1082. As shown in FIGS. 1 through 3, each of the storage capacitor wire signals SCS0 through SCS1082 has any one of waveforms of 14 phases (first phase represented by the storage capacitor wire signal SCS1, second phase represented by the storage capacitor wire signal SCS2, third phase represented by the storage capacitor wire signal SCS3, fourth phase represented by the storage capacitor wire signal SCS4, fifth phase represented by the storage capacitor wire signal SCS5, sixth phase represented by the storage capacitor wire signal SCS6, seventh phase represented by the storage capacitor wire signal SCS7, eighth phase represented by the storage capacitor wire signal SCS8, ninth phase represented by the storage capacitor wire signal SCS9, tenth phase represented by the storage capacitor wire signal SCS0, eleventh phase represented by the storage capacitor wire signal SCS11, twelfth phase represented by the storage capacitor wire signal SCS12, thirteenth phase represented by the storage capacitor wire signal SCS13, fourteenth phase represented by the storage capacitor wire signal SCS14).

Each of the phases has an identical cycle (a 14H cycle constituted by a first section in which a High level continues for 7H and a second section in which a Low level continues for 7H). The second phase represented by the storage capacitor wire signal SCS2 is behind the first phase represented by the storage capacitor wire signal SCS1 by half a cycle (7H). One of any two successive odd-numbered phases is behind the other one which is followed by the one by 1H, and one of any two successive even-numbered phases is behind the other one which is followed by the one by 1H. For example, the third phase represented by the storage capacitor wire signal SCS3 is behind the first phase represented by SCS1 by 1H, and the fourth phase represented by the storage capacitor wire signal SCS4 is behind the second phase represented by SCS2 by 1H.

A storage capacitor wire signal SCS(28$j$+1) ($j$ is an integer in a range from 0 to 38) and a storage capacitor wire signal SCS(28$k$+16) (k is an integer in a range from 0 to 38) have the first phase, and a storage capacitor wire signal SCS(28$j$+2) ($j$ is an integer in a range from 0 to 38) and a storage capacitor wire signal SCS(28$k$+15) (k is an integer in a range from 0 to 38) have the second phase. Further, a storage capacitor wire signal SCS(28$j$+3) (hereinafter, j is an integer in a range from 0 to 38), a storage capacitor wire signal SCS($28k$+18) (hereinafter, k is an integer in a range from 0 to 37), and the storage capacitor wire signal SCS1082 have the third phase, a storage capacitor wire signal SCS($28j$+4) and a storage capacitor wire signal SCS($28k$+17) have the fourth phase, a storage capacitor wire signal SCS($28j$+5) and a storage capacitor wire signal SCS($28k$+20) have the fifth phase, a storage capacitor wire signal SCS($28j$+6) and a storage capacitor wire signal SCS($28k$+19) have the sixth phase, a storage capacitor wire signal SCS($28j$+7) and a storage capacitor wire signal SCS($28k$+22) have the seventh phase, a storage capacitor wire signal SCS($28j$+8) and a storage capacitor wire signal SCS($28k$+21) have the eighth phase, a storage capacitor wire signal SCS($28j$+9) and a storage capacitor wire signal SCS($28k$+24) have the ninth phase, a storage capacitor wire signal SCS($28j$+10) and a storage capacitor wire signal SCS($28k$+23) have the tenth phase, a storage capacitor wire signal SCS($28j$+11) and a storage capacitor wire signal SCS($28k$+26) have the eleventh phase, a storage capacitor wire signal SCS($28j$+12) and a storage capacitor wire signal SCS($28k$+25) have the twelfth phase, the storage capacitor wire signal SCS0, a storage capacitor wire signal SCS($28j$+13), and a storage capacitor wire signal SCS($28k$+28) have the thirteenth phase, and a storage capacitor wire signal SCS($28j$+14) and a storage capacitor wire signal SCS ($28k$+27) have the fourteenth phase. The storage capacitor wire signal SCS0 is set to have the thirteenth phase, and the storage capacitor wire signal SCS1082 is set to have the third phase. Note, however, that each of the storage capacitor wire signal SCS0 and the storage capacitor wire signal SCS1082 may have any phase since the storage capacitor wire signal SCS0 and the storage capacitor wire signal SCS1082 do not affect display.

Figure 7:
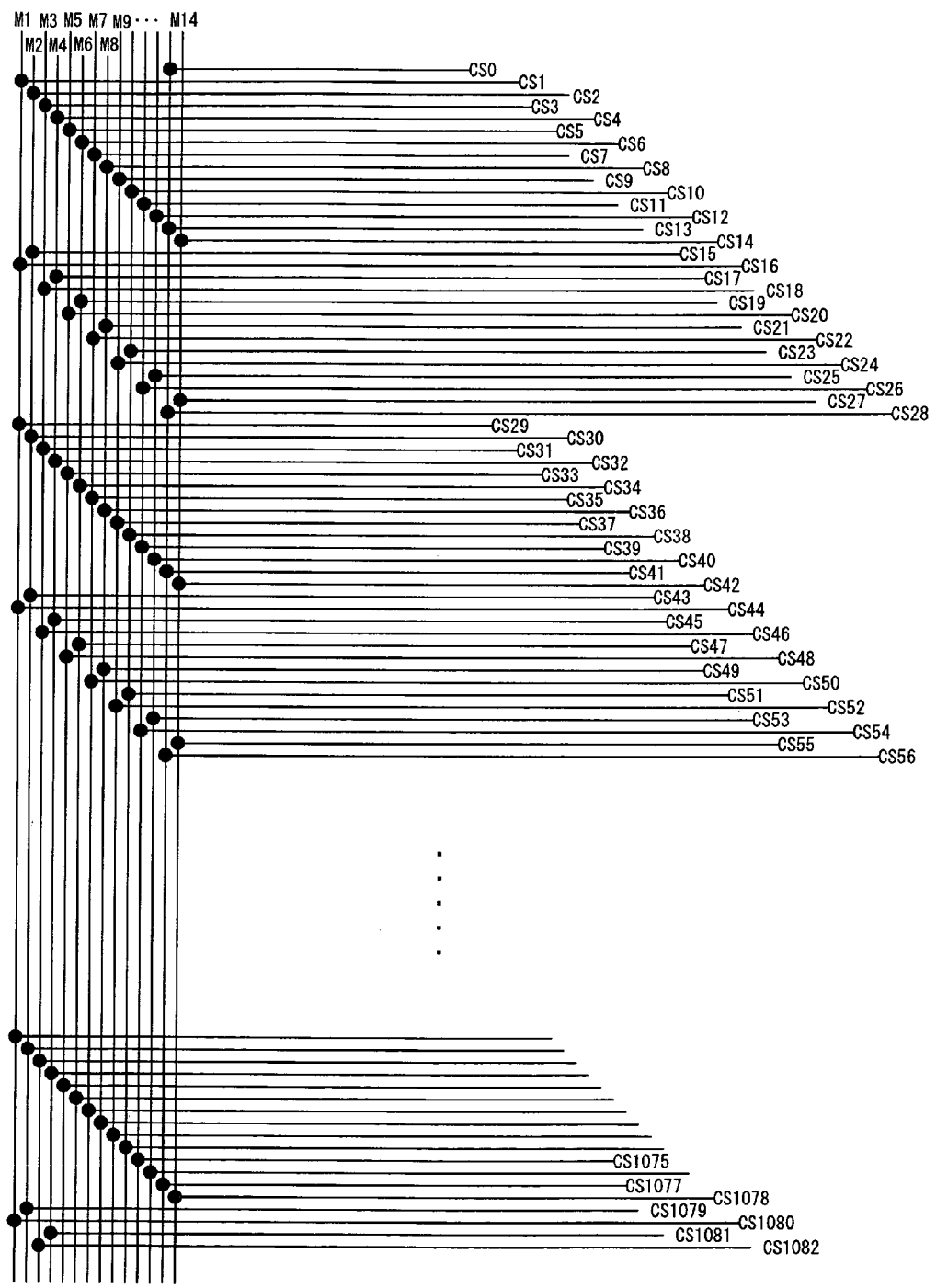
FIG. 7 is a view schematically illustrating how storage capacitor wires are connected to storage capacitor main wires in Embodiment 1.

As shown in FIG. 7, the storage capacitor wire signals of the first through fourteenth phases are supplied to storage capacitor main wires M1 through M14, respectively. A storage capacitor wire CS($28j$+1) (j is an integer in a range from 0 to 38) and a storage capacitor wire CS($28k$+16) (k is an integer in a range from 0 to 38) are connected to the storage capacitor main wire M1, and a storage capacitor wire CS($28j$+2) (j is an integer in a range from 0 to 38) and a storage capacitor wire CS($28k$+15) (k is an integer in a range from 0 to 38) are connected to the storage capacitor main wire M2. Further, a storage capacitor wire CS($28j$+3) (hereinafter, j is an integer in a range from 0 to 38), a storage capacitor wire CS($28k$+18) (hereinafter, k is an integer in a range from 0 to 37), and the dummy storage capacitor wire CS1082 are connected to the storage capacitor main wire M3, a storage capacitor wire CS($28j$+4) and a storage capacitor wire CS($28k$+17) are connected to the storage capacitor main wire M4, a storage capacitor wire CS($28j$+5) and a storage capacitor wire CS($28k$+20) are connected to the storage capacitor main wire M5, a storage capacitor wire CS($28j$+6) and a storage capacitor wire CS($28k$+19) are connected to the storage capacitor main wire M6, a storage capacitor wire CS($28j$+7) and a storage capacitor wire CS ($28k$+22) are connected to the storage capacitor main wire M7, a storage capacitor wire CS($28j$+8) and a storage capacitor wire CS($28k$+21) are connected to the storage capacitor main wire M8, a storage capacitor wire CS($28j$+9) and a storage capacitor wire CS($28k$+24) are connected to the storage capacitor main wire M9, a storage capacitor wire CS($28j$+10) and a storage capacitor wire CS($28k$+23) are connected to the storage capacitor main wire M10, a storage capacitor wire CS($28j$+11) and a storage capacitor wire CS($28k$+26) are connected to the storage capacitor main wire M11, a storage capacitor wire CS($28j$+12) and a storage capacitor wire CS($28k$+25) are connected to the storage capacitor main wire M12, the dummy storage capacitor wire CS0, a storage capacitor wire CS($28j$+13), and a storage capacitor wire CS($28k$+28) are connected to the storage capacitor main wire M13, and a storage capacitor wire CS($28j$+14) and a storage capacitor wire CS($28k$+27) are connected to the storage capacitor main wire M14.

Figure 8:
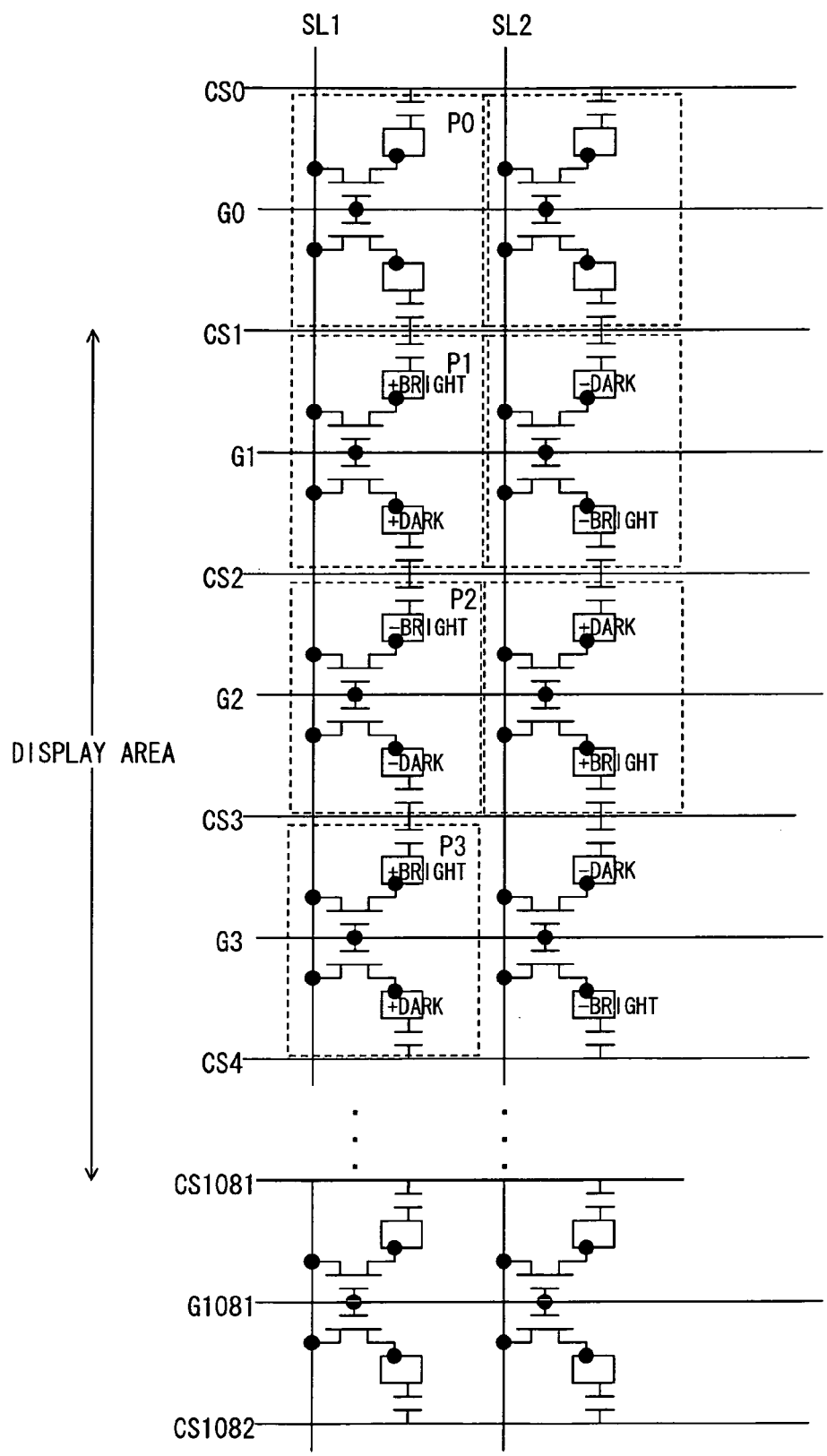
FIG. 8 is a view schematically illustrating a polarity distribution of written electric potentials in Embodiment 1.

The waveforms of the storage capacitor wire signals SCS0 through SCS1082 are as described above. In the present liquid crystal display device, as shown in FIG. 3, the storage capacitor wire signal SCS1 (first phase) has "L" level during the horizontal scanning period H1 corresponding to the scanning signal line G1, and is level-shifted from "L" level to "H" level after the end of the horizontal scanning period H1 (in FIG. 3 for example, at a timing when 1H elapses after the end of H1), and the storage capacitor wire signal SCS2 (second phase) has "H" level during the horizontal scanning period H1 corresponding to the scanning signal line G1, and is level-shifted from "H" level to "L" level after the end of the horizontal scanning period H1 (in FIG. 3 for example, at a timing when 1H elapses after the end of H1). One of the two sub-pixels of the pixel P1 includes a pixel electrode that forms storage capacitance with the storage capacitor wire CS1, and the other one of the two sub-pixels includes a pixel electrode that forms storage capacitance with the storage capacitor wire CS2. A positive signal electric potential is supplied to the two pixel electrodes during the horizontal scanning period H1, but as the storage capacitor wire signal SCS1 is level-shifted from "L" level to "H" level, an electric potential of the pixel electrode that forms the storage capacitance with the storage capacitor wire CS1 increases, and as the storage capacitor wire signal SCS2 is level-shifted from "H" level to "L" level, an electric potential of the pixel electrode that forms the storage capacitance with the storage capacitor wire CS2 declines. Here, the storage capacitor wire signal SCS1 has an effective electric potential Ve1 higher than a reference electric potential Vo (intermediate electric potential between "L" level and "H" level (e.g., common electrode electric potential Vcom)) until 1 vertical scanning period elapses from the level-shift, and the storage capacitor wire signal SCS2 has an effective electric potential Ve2 lower than the reference electric potential Vo until 1 vertical scanning period elapses from the level-shift. Thus, the sub-pixel including the pixel electrode that forms storage capacitance with the storage capacitor wire CS1 becomes a "bright sub-pixel", and the sub-pixel including the pixel electrode that forms storage capacitance with the storage capacitor wire CS2 becomes a "dark sub-pixel", as shown in FIG. 8. A halftone can be displayed by these bright and dark sub-pixels. Note that it is desirable that the following be satisfied:

(the effective electric potential $Ve1$)−(the reference electric potential $Vo$)=(the reference electric potential $Vo$)−(the effective electric potential $Ve2$).

Since the storage capacitor wire signals SCS1 and SCS2 (first and second phases) are set as above, the storage capacitor wire signal SCS2 (second phase) has "H" level during the horizontal scanning period H2 corresponding to the scanning signal line G2, and is level-shifted from "H" level to "L" level at a timing when 1H elapses after the end of the horizontal scanning period H2, and the storage capacitor wire signal SCS3 (third phase) has "L" level during the horizontal scanning period H2 corresponding to the scanning signal line G2, and is level-shifted from "L" level to "H" level at a timing when 2H elapses after the end of the horizontal scanning period H2.

One of the two sub-pixels of the pixel P2 includes a pixel electrode that forms storage capacitance with the storage capacitor wire CS2, and the other one of the two sub-pixels includes a pixel electrode that forms storage capacitance with the storage capacitor wire CS3. A negative signal electric potential is supplied to the two pixel electrodes during the horizontal scanning period H2, but as the storage capacitor wire signal SCS2 is level-shifted from "H" level to "L" level, an electric potential of the pixel electrode that forms the storage capacitance with the storage capacitor wire CS2 declines, and as the storage capacitor wire signal SCS3 is level-shifted from "L" level to "H" level, an electric potential of the pixel electrode that forms the storage capacitance with the storage capacitor wire CS3 increases. Here, the storage capacitor wire signal SCS2 has an effective electric potential lower than a reference electric potential until 1 vertical scanning period elapses from the level-shift, and the storage capacitor wire signal SCS3 has an effective electric potential higher than the reference electric potential until 1 vertical scanning period elapses from the level-shift. Thus, the sub-pixel including the pixel electrode that forms storage capacitance with the storage capacitor wire CS2 becomes a "bright sub-pixel", and the sub-pixel including the pixel electrode that forms storage capacitance with the storage capacitor wire CS3 becomes a "dark sub-pixel", as shown in FIG. 8. A halftone can be displayed by these bright and dark sub-pixels.

Since the storage capacitor wire signals SCS1 and SCS2 (first and second phases) are set as above, the storage capacitor wire signal SCS3 (third phase) has "L" level during the horizontal scanning period H3 corresponding to the scanning signal line G3, and is level-shifted from "L" level to "H" level at a timing when 1H elapses after the end of the horizontal scanning period H3, and the storage capacitor wire signal SCS4 (fourth phase) has "H" level during the horizontal scanning period H3 corresponding to the scanning signal line G3, and is level-shifted from "H" level to "L" level at a timing when 1H elapses after the end of the horizontal scanning period H3.

One of the two sub-pixels of the pixel P3 includes a pixel electrode that forms storage capacitance with the storage capacitor wire CS3, and the other one of the two sub-pixels includes a pixel electrode that forms storage capacitance with the storage capacitor wire CS4. A positive signal electric potential is supplied to the two pixel electrodes during the horizontal scanning period H3, but as the storage capacitor wire signal SCS3 is level-shifted from "L" level to "H" level, an electric potential of the pixel electrode that forms the storage capacitance with the storage capacitor wire CS3 increases, and as the storage capacitor wire signal SCS4 is level-shifted from "H" level to "L" level, an electric potential of the pixel electrode that forms the storage capacitance with the storage capacitor wire CS4 declines. Here, the storage capacitor wire signal SCS3 has an effective electric potential higher than a reference electric potential until 1 vertical scanning period elapses from the level-shift, and the storage capacitor wire signal SCS4 has an effective electric potential lower than the reference electric potential until 1 vertical scanning period elapses from the level-shift. Thus, the sub-pixel including the pixel electrode that forms storage capacitance with the storage capacitor wire CS3 becomes a "bright sub-pixel", and the sub-pixel including the pixel electrode that forms storage capacitance with the storage capacitor wire CS4 becomes a "dark sub-pixel", as shown in FIG. 8. A halftone can be displayed by these bright and dark sub-pixels.

According to the present liquid crystal display device, two sub-pixels included in a single pixel become "bright sub-pixel" and "dark sub-pixel" as shown in FIG. 8, and a halftone can be displayed by the "bright sub-pixel" and "dark sub-pixel". This allows an improvement in viewing angle characteristics. Further, in a single pixel column, bright sub-pixels and dark sub-pixels can be alternately disposed (checkered pattern). This allows smooth display with less roughness.

Further, a polarity distribution of electric potentials written into pixels exhibits dot-inversion in a column direction (direction in which the data signal lines extend), as shown in FIG. 8. This can suppress flickering. Further, it is possible to suppress power consumption and heat generation of the drivers and to increase charging rate of the pixels as compared to a case where the data signal lines are subjected to dot inversion (1H inversion) driving. Further, immediately after inversion of a polarity of signal electric potentials supplied to a data signal line, a dummy electric potential having the same polarity as that obtained after the inversion is supplied to the data signal line throughout the first and second dummy scanning periods. This makes it possible to reduce a difference in charging rate between (i) pixels respectively connected to the second scanning signal line in an odd-numbered block and the first scanning signal line in an even-numbered block and (ii) the other pixels. Consequently, it is possible to suppress horizontal-striped unevenness that can be observed in the vicinity of borders between the blocks in a case where block inversion driving is carried out.

A noteworthy point is that since a single dummy scanning signal line is activated for a predetermined period of time during each of the first and second dummy scanning period, and is then deactivated, a status of load applied to a scanning signal line driving circuit before start of scanning, at the start of the scanning, and during the scanning of one scanning signal line can be made identical to a status of load applied to the scanning signal line driving circuit before start of scanning, at the start of the scanning, and during the scanning of another scanning signal line.

Figure 5:
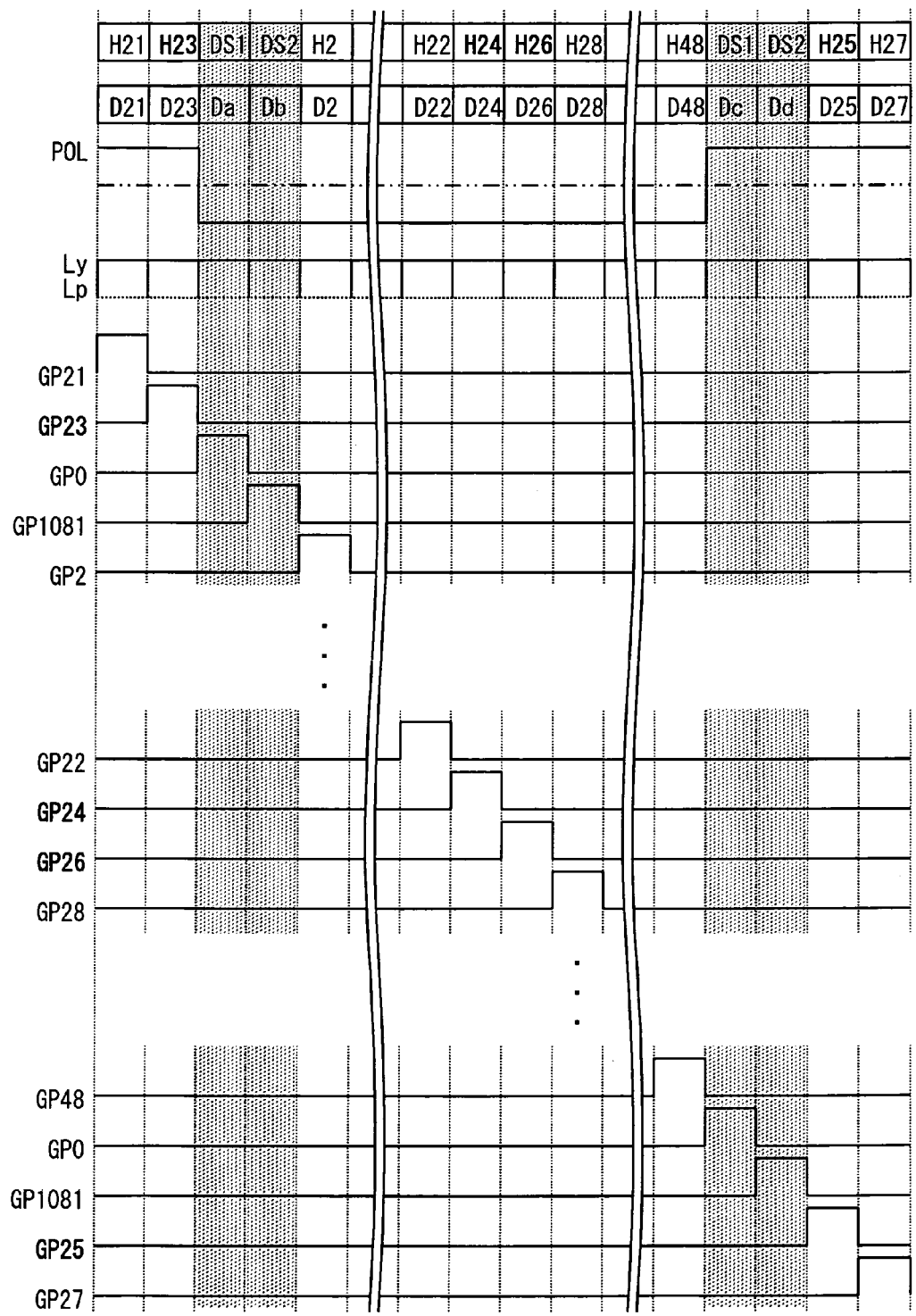
FIG. 5 is a timing chart showing a fluctuation in load applied to a scanning signal line driving circuit in the exemplary driving shown in FIGS. 1 and 2.
Figure 6:
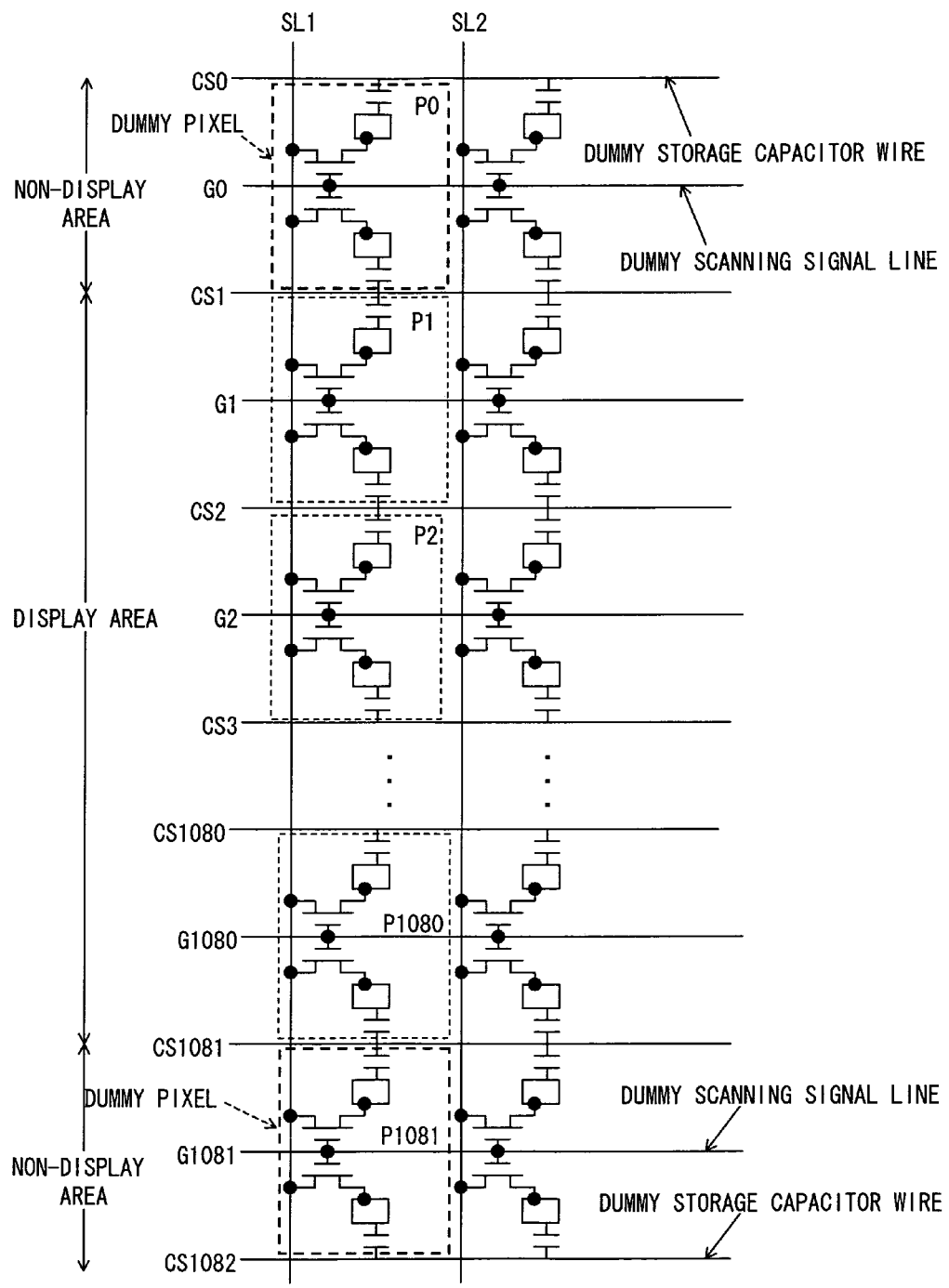
FIG. 6 is a view schematically illustrating a configuration of the present liquid crystal display device.

Next, with reference to FIG. 5, the following discusses (i) a status of load applied to the scanning signal line driving circuit before start of scanning, at the time of start of scanning, and during the scanning of the scanning signal line G24, (ii) a status of load applied to the scanning signal line driving circuit before start of scanning, at the time of start of scanning, and during the scanning of the scanning signal line G25, and (iii) a status of load applied to the scanning signal line driving circuit before start of scanning, at the time of start of scanning, and during the scanning of the scanning signal line G26, the scanning signal lines G24, G25, and G26 being located in the vicinity of a border between the blocks B1 and B2. In FIG. 5, Lp represents load applied to the scanning signal line driving circuit when a single scanning signal line or a single dummy scanning signal line is activated and another scanning signal line or another dummy scanning signal line is deactivated at the same time, and Ly represents load applied to the scanning signal line driving circuit while a single scanning signal line or a single dummy scanning signal line is being active.

Before start of scanning of the scanning signal line G24, a single scanning signal line, more specifically, the scanning signal line G22 is active. Accordingly, load on the scanning signal line driving circuit is Ly. At the time of the start of the scanning of the scanning signal line G24, a single scanning signal line, more specifically, the scanning signal line G24 is activated, and at the same time, another scanning signal line, more specifically, the scanning signal line G22 is deactivated. Accordingly, load on the scanning signal line driving circuit is Lp. During the scanning of the scanning signal line G24, a single scanning signal line, more specifically, the scanning signal line G24 is active. Accordingly, load on the scanning signal line driving circuit is Ly.

Before start of scanning of the scanning signal line G25, a single dummy scanning signal line, more specifically, the dummy scanning signal line G1081 is active. Accordingly, load on the scanning signal line driving circuit is Ly. At the time of the start of the scanning of the scanning signal line G25, a single scanning signal line, more specifically, the scanning signal line G25 is activated, and at the same time, another dummy scanning signal line, more specifically, the dummy scanning signal line G1081 is deactivated. Accordingly, load on the scanning signal line driving circuit is Lp. During the scanning of the scanning signal line G25, a single scanning signal line, more specifically, the scanning signal line G25 is active. Accordingly, load on the scanning signal line driving circuit is Ly.

Before start of scanning of the scanning signal line G26, a single scanning signal line, more specifically, the scanning signal line G24 is active. Accordingly, load on the scanning signal line driving circuit is Ly. At the time of the start of the scanning of the scanning signal line G26, a single scanning signal line, more specifically, the scanning signal line G26 is activated, and at the same time, another scanning signal line, more specifically, the scanning signal line G24 is deactivated. Accordingly, load on the scanning signal line driving circuit is Lp. During the scanning of the scanning signal line G26, a single scanning signal line, more specifically, the scanning signal line G26 is active. Accordingly, load on the scanning signal line driving circuit is Ly.

In this manner, in the present liquid crystal display device, in a case where dummy scanning periods are inserted immediately after inversion of a polarity of electric potentials of a data signal line, a fluctuation in load applied to the scanning signal line driving circuit during a horizontal scanning period can be made identical to a fluctuation in load applied to the scanning signal line driving circuit during a dummy scanning period. Accordingly, a status of load applied to the scanning signal line driving circuit at the time of start of scanning, and before and after the start of scanning of one scanning signal line can be made identical to a status of load applied to the scanning signal line driving circuit at the time of start of scanning, and before and after the start of scanning of another scanning signal line. This makes it possible to reduce a difference in charging rate between (i) pixels connected to scanning signal lines (the second scanning signal line in an odd-numbered block and the first scanning signal line in an even-numbered block) which are subjected to horizontal scanning immediately after inversion of a polarity of electric potentials and (ii) the other pixels. As a result, it is possible to suppress horizontal-striped unevenness in the vicinity of borders between the blocks.

Figure 14:
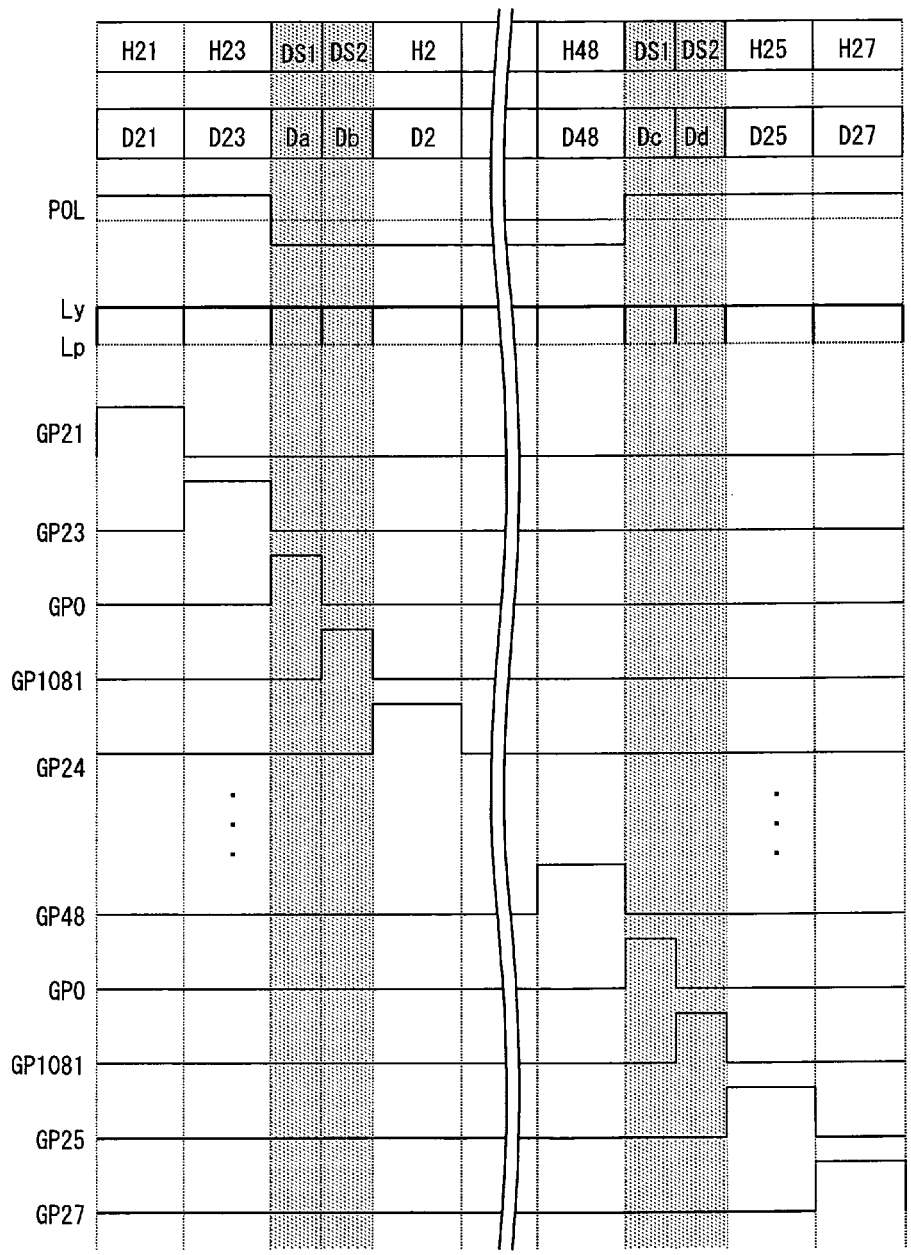
FIG. 14 is a timing chart showing a fluctuation in load applied to the scanning signal line driving circuit in another exemplary driving of the present liquid crystal display device.

Further, in the present liquid crystal display device, load on the scanning signal line driving circuit is almost always kept at Ly during a vertical scanning period. That is, there is almost no fluctuation in, load on the scanning signal line. This makes the suppression of the horizontal-striped unevenness more effective. Further, as shown in FIG. 5, timings at which the load becomes Lp are periodical. This makes the suppression of the horizontal-striped unevenness further more effective. Another arrangement is of course possible in which timings at which (periods in which) the load becomes Ly and timings at which the load becomes Lp are not periodical as shown in FIG. 14.

In the present liquid crystal display device, it is preferable that signal electric potentials respectively supplied to adjacent two data signal lines during an identical horizontal scanning period or identical dummy scanning period have different polarities. For example, as shown in FIG. 4, signal electric potentials of a negative polarity are supplied to the data signal line SL2 during a period in which signal electric potentials of a positive polarity are supplied to the data signal line SL1, whereas signal electric potentials of a positive polarity are supplied to the data signal line SL2 during a period in which signal electric potentials of a negative polarity are supplied to the data signal line SL1. With the arrangement, a polarity distribution of electric potentials written into the pixels exhibits dot inversion in a row direction (direction in which the scanning signal lines extend) as shown in FIG. 8. This makes it possible to further suppress flickering.

Further, in the arrangement shown in FIGS. 1 and 4, the first and second dummy data Da and Db are identical to the video data D2 (video data of a next frame) corresponding to horizontal scanning of the scanning signal line G2 that is carried out immediately after dummy scanning. However, the present embodiment is not limited to this. For example, the first and second dummy data Da and Db may be determined based on video data (video data of a current frame) corresponding to horizontal scanning of the scanning signal line G2 that is carried out immediately before the dummy scanning and on the video data D2 (video data of a next frame) corresponding to horizontal scanning of the scanning signal line G2 that is carried out immediately after the dummy scanning. Alternatively, the first and second dummy data Da and Db may be predetermined (identical) video data.

In the arrangement of FIGS. 1, 2, and 4, each dummy scanning period is equal in length to 1 horizontal scanning period. However, the present embodiment is not limited to this. Each dummy scanning period may be shorter or longer than 1 horizontal scanning period. For example, in FIG. 14, each dummy scanning period is shorter than 1 horizontal scanning period. Also in FIG. 14, timing of horizontal scanning in each horizontal scanning period is identical to timing of dummy scanning in each dummy scanning period.

Figure 9:
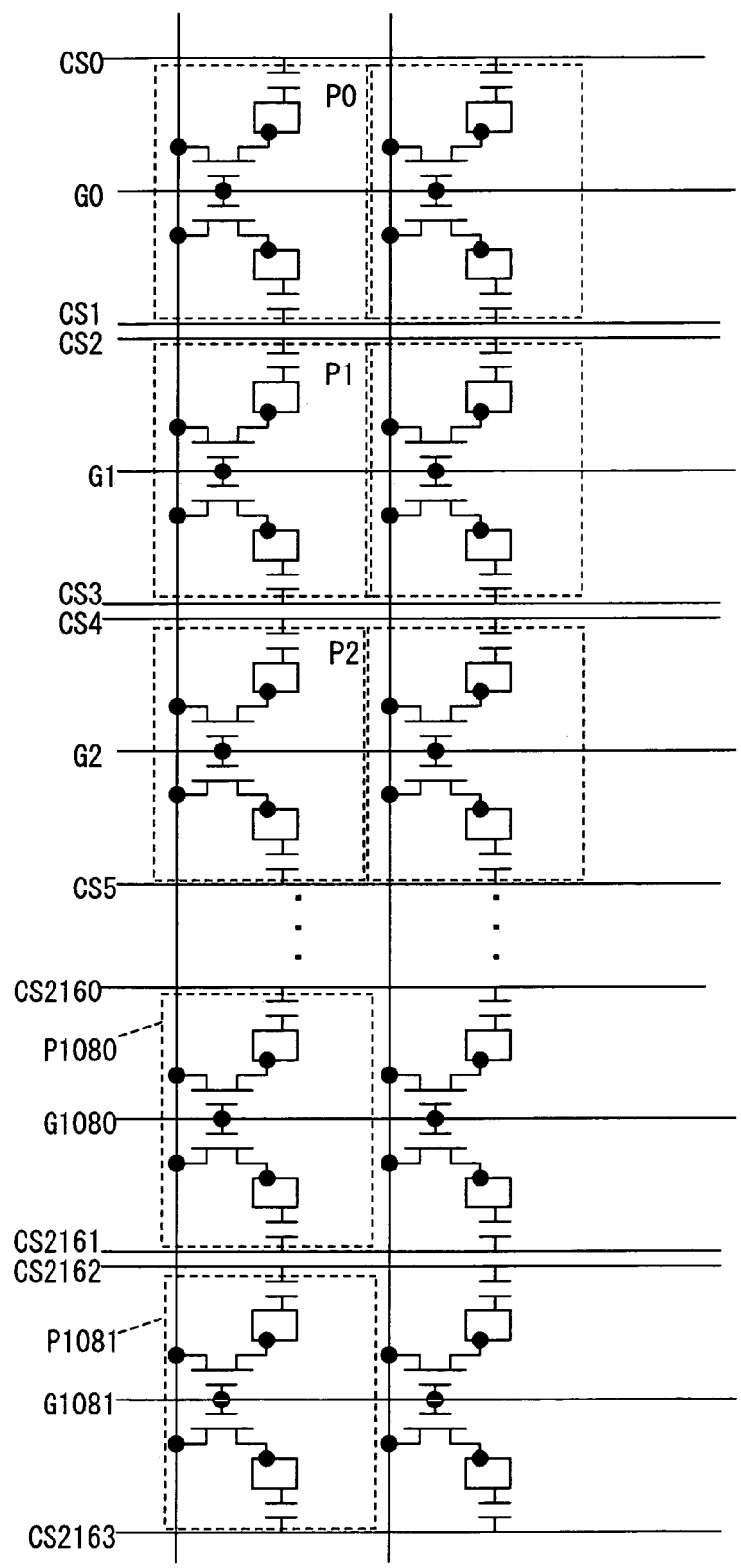
FIG. 9 is a view schematically illustrating another configuration of the present liquid crystal display device.

In the present embodiment, it is also possible that (i) two storage capacitor wires are provided corresponding to a single pixel as shown in FIG. 9, and (ii) storage capacitor wire signals SCS0 through SCS2163 (see FIG. 10), each of which is level-shifted once in a single vertical scanning period, are supplied to storage capacitor wires CS1 through CS2160 and dummy storage capacitor wires CS0, CS1, CS2162, and CS2163. For example, the storage capacitor wire signal SCS1 has "L" level during the horizontal scanning period H1 (polarity of signal electric potentials is positive) corresponding to the scanning signal line G1, is level-shifted from "L" level to "H" level at a timing when 1H elapses from end of the horizontal scanning period H1, and then keeps "H" level for 1 vertical scanning period. Meanwhile, the storage capacitor wire signal SCS2 has "H" level during the horizontal scanning period H1 corresponding to the scanning signal line G1, is level-shifted from "H" level to "L" level at a timing when 1H elapses from end of the horizontal scanning period H1, and then keeps "L" level for 1 vertical scanning period.

The storage capacitor wire signal SCS3 has "H" level during the horizontal scanning period H2 (polarity of signal electric potentials is negative) corresponding to the scanning signal line G2, is level-shifted from "H" level to "L" level at a timing when 1H elapses from end of the horizontal scanning period H2, and then keeps "L" level for 1 vertical scanning period. Meanwhile, the storage capacitor wire signal SCS4 has "L" level during the horizontal scanning period H2 corresponding to the scanning signal line G2, is level-shifted from "L" level to "H" level at a timing when 1H elapses from end of the horizontal scanning period H2, and then keeps "H" level for 1 vertical scanning period.

The storage capacitor wire signal SCS5 has "L" level during the horizontal scanning period H3 (polarity of signal electric potentials is positive) corresponding to the scanning signal line G3, is level-shifted from "L" level to "H" level at a timing when 1H elapses from end of the horizontal scanning period H3, and then keeps "H" level for 1 vertical scanning period. Meanwhile, the storage capacitor wire signal SCS6 has "H" level during the horizontal scanning period H3 corresponding to the scanning signal line G3, is level-shifted from "H" level to "L" level at a timing when 1H elapses from end of the horizontal scanning period H3, and then keeps "L" level for 1 vertical scanning period.

Figure 10:
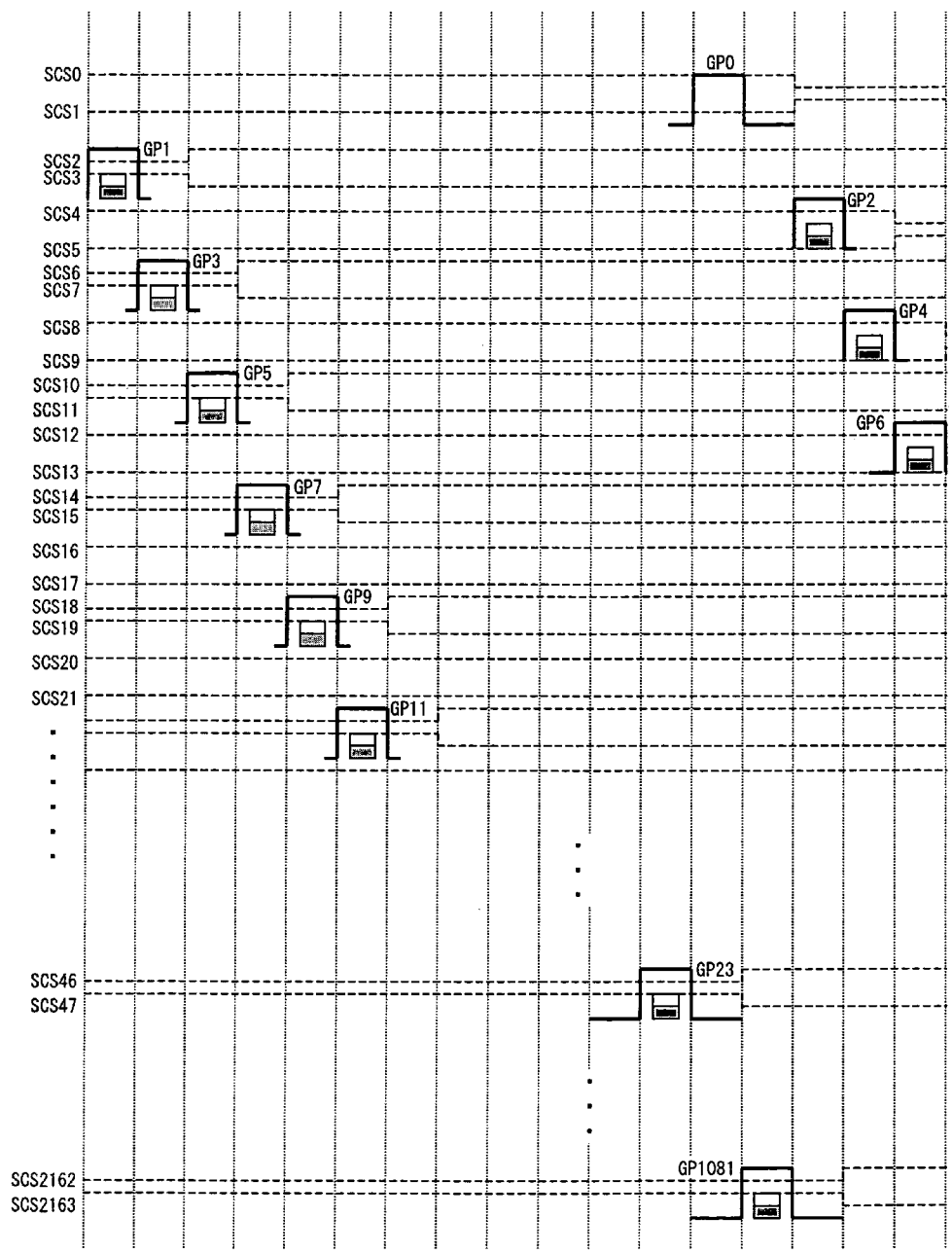
FIG. 10 is a timing chart showing an exemplary driving of the liquid crystal display device of FIG. 9.

Also according to this arrangement, two sub-pixels in a single pixel becomes "bright sub-pixel" and "dark sub-pixel" as shown in FIG. 10, and a halftone can be displayed by the "bright sub-pixel" and "dark sub-pixel". This allows an improvement in viewing angle characteristics. Further, in a single pixel column, bright sub-pixels and dark sub-pixels can be alternately disposed (checkered pattern). This allows smooth display with less roughness.

Figure 11:
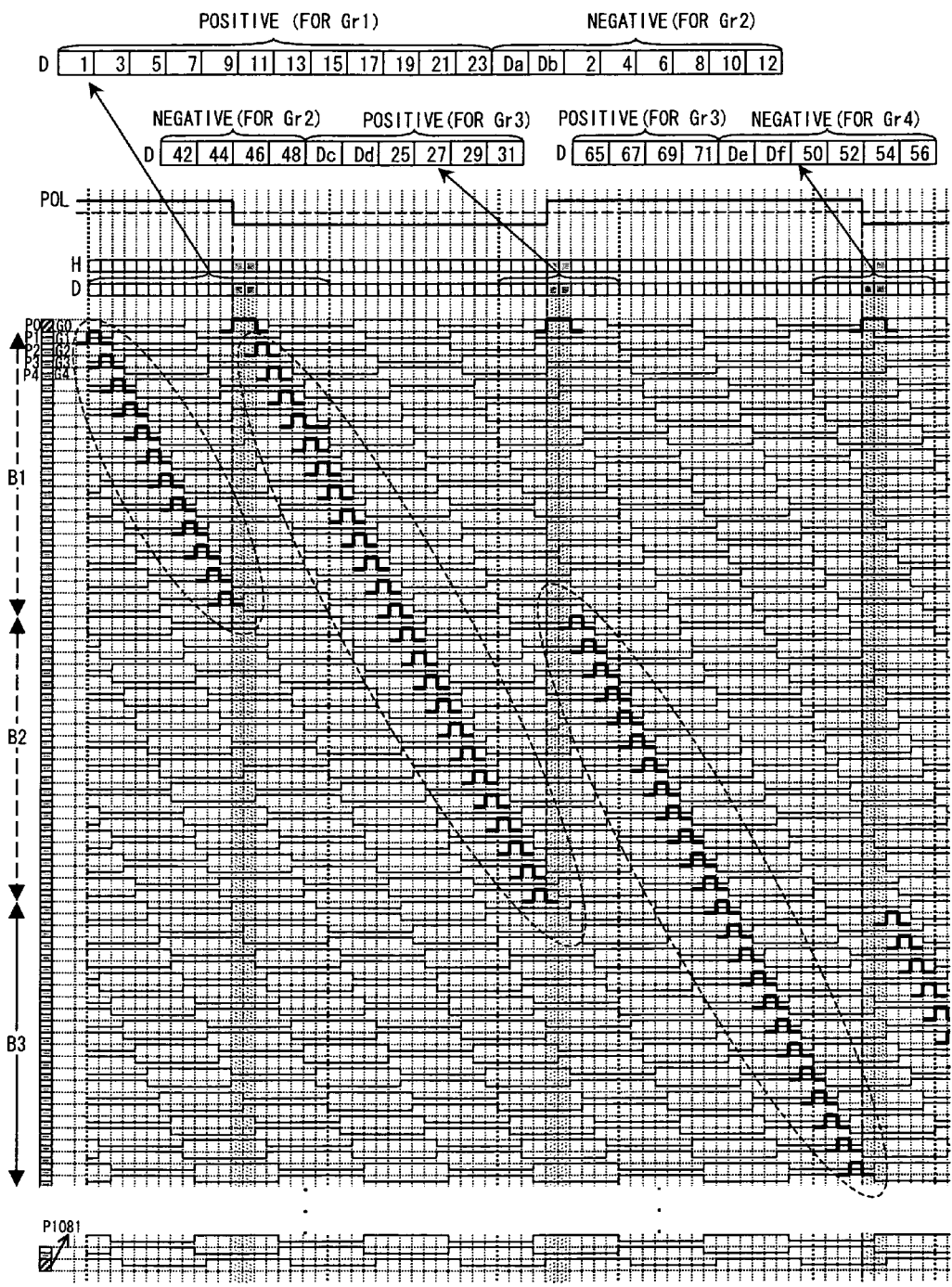
FIG. 11 is a timing chart showing another exemplary driving of the present liquid crystal display device.
Figure 12:
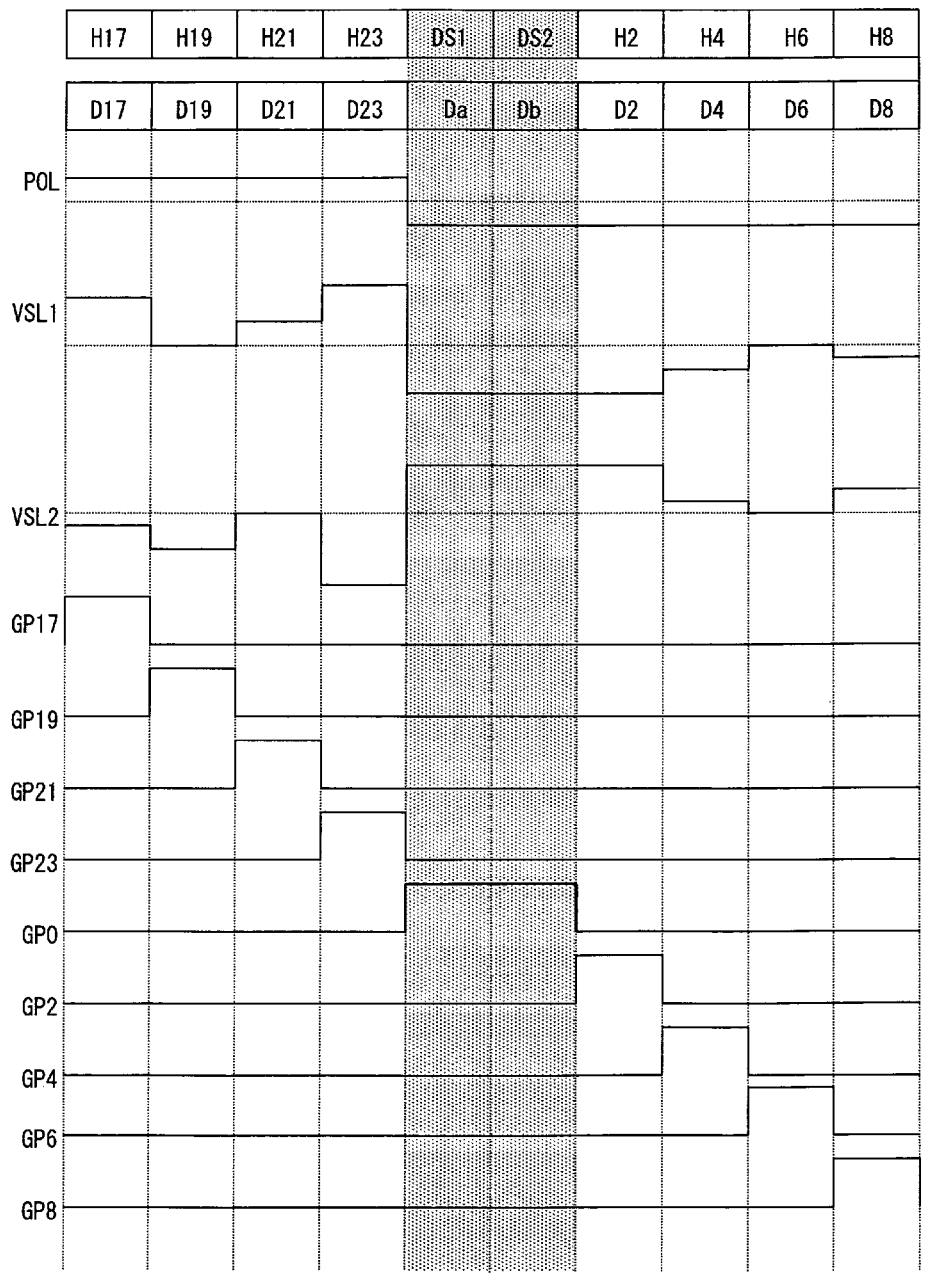
FIG. 12 is a timing chart showing in more detail the exemplary driving shown in FIG. 11.

In the arrangement of FIGS. 1, 2, and 4, the dummy scanning signal line G0 is subjected to dummy scanning during the first dummy scanning period, and another dummy scanning signal line, i.e., the dummy scanning signal line G1081 is subjected to dummy scanning during the second dummy scanning period. However, the present embodiment is not limited to this. For example, the dummy scanning signal line G0 may be subjected to dummy scanning throughout the first and second dummy scanning periods as shown in FIGS. 11 and 12. That is, the scanning signal line G0 is activated at the time of start of the first dummy scanning period and deactivated at the time of end of the second dummy scanning period. Note that gate pulses GP1 through GP1080 respectively supplied to the scanning signal lines G1 through G1080 and storage capacitor wire signals SCS0 through SCS1082 are identical to those shown in FIGS. 1 and 3.

In this arrangement, the gate pulse G0 supplied to the dummy scanning signal line G0 is activated at the same time as start of the first dummy scanning period DS1, and is deactivated at the same time as end of the second dummy scanning period DS2. During the first dummy scanning period DS1, a dummy electric potential which corresponds to the first dummy data Da and which has the same polarity (negative polarity) as the signal electric potentials in the group Gr2 is supplied to the data signal line SL1. During the second dummy scanning period DS2, a dummy electric potential which corresponds to the second dummy data Db and which has the same polarity (negative polarity) as the signal electric potentials in the group Gr2 is supplied to the data signal line SL1 ((the first dummy data Da)=(the second dummy data Db)=(the video data D2) is satisfied here).

Figure 13:
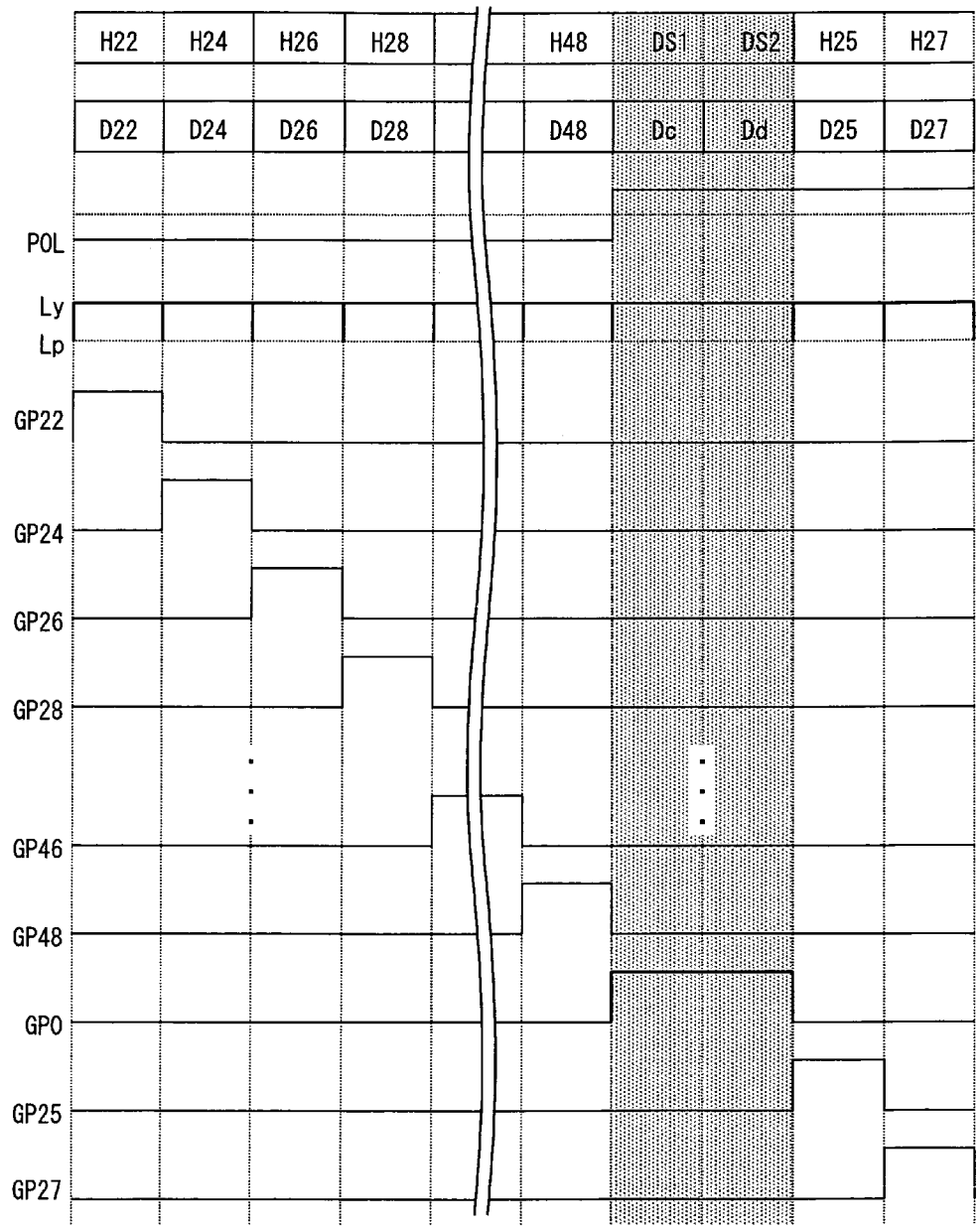
FIG. 13 is a timing chart showing a fluctuation in load applied to the scanning signal line driving circuit in the exemplary driving shown in FIG. 11.

Also in the arrangement shown in FIGS. 11 and 12, a status of load applied to the scanning signal line driving circuit before start of scanning, at the time of start of scanning, and during the scanning of one scanning signal line can be made identical to a status of load applied to the scanning signal line driving circuit before start of scanning, at the time of start of scanning, and during the scanning of another scanning signal line, as shown in FIG. 13. In FIG. 13, Lp represents load applied to the scanning signal line driving circuit when a single scanning signal line or a single dummy scanning signal line is activated and another scanning signal line or another dummy scanning signal line is deactivated at the same time, and Ly represents load applied to the scanning signal line driving circuit while a single scanning signal line or a single dummy scanning signal line is being active. Accordingly, it is possible to reduce a difference in charging rate between (i) pixels respectively connected to the second scanning signal line of an odd-numbered block and the first scanning signal line of an even-numbered block and (ii) the other pixels, thereby suppressing horizontal-striped unevenness occurring in the vicinity of borders of the blocks.

Figure 15:
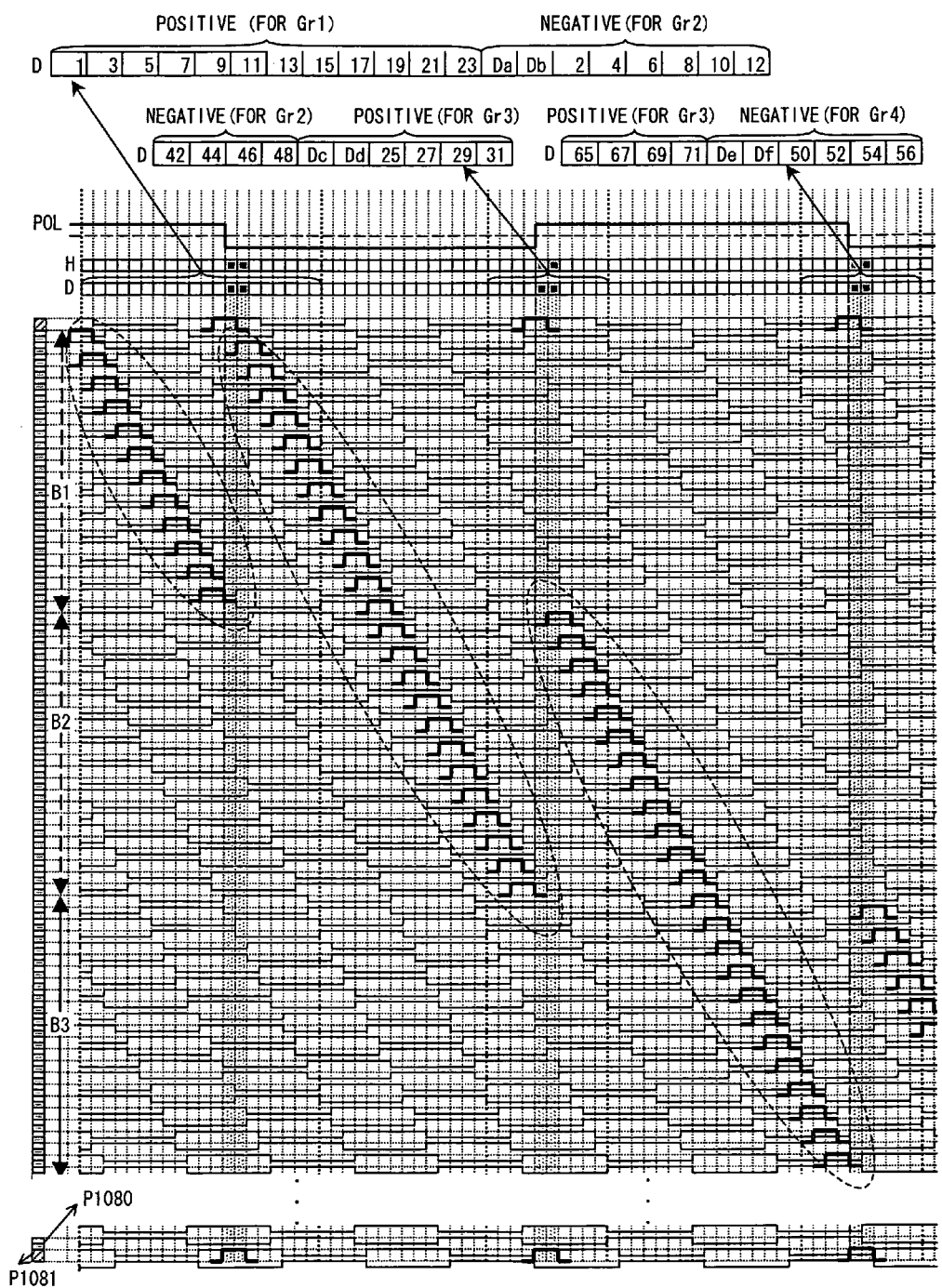
FIG. 15 is a timing chart showing still another exemplary driving of the present liquid crystal display device.
Figure 16:
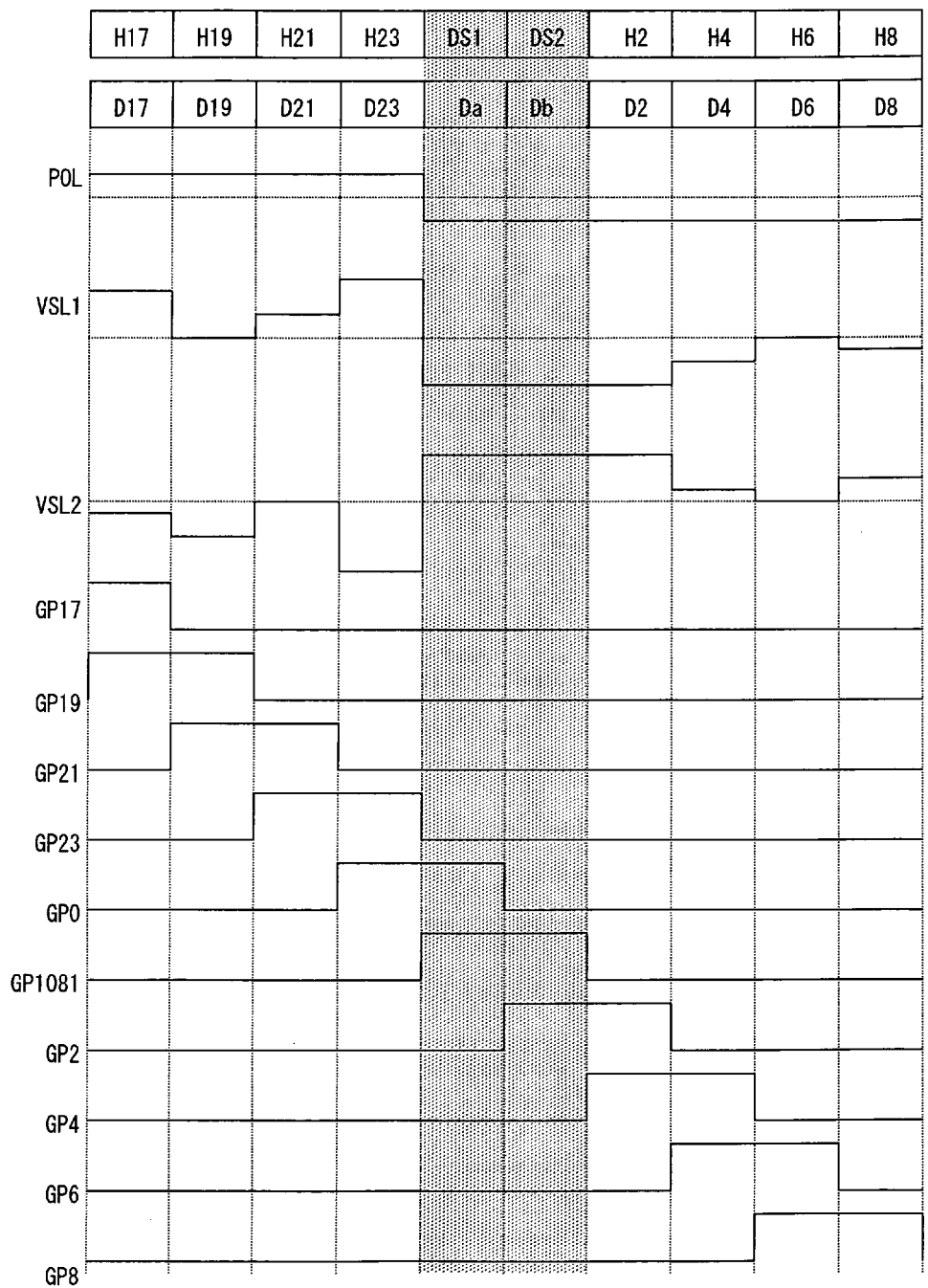
FIG. 16 is a timing chart showing in more detail the exemplary driving shown in FIG. 15.

The present liquid crystal display device may be arranged such that (i) the gate pulses GP0 through GP1081 are pulses each having a width that is two times as wide as a single horizontal scanning period (width equal to 2H), (ii) each scanning signal line is activated in synchronization with start of horizontal scanning or dummy scanning carried out immediately before horizontal scanning corresponding to the scanning signal line, and is deactivated in synchronization with end of the horizontal scanning corresponding to the scanning signal line, and (iii) each dummy scanning period is activated in synchronization with start of horizontal scanning or dummy scanning carried out immediately before dummy scanning corresponding to the dummy scanning signal line, and is deactivated in synchronization with end of the dummy scanning corresponding to the dummy scanning signal line, as shown in FIGS. 15 and 16. Also in this arrangement, timing of horizontal scanning in each horizontal scanning period is identical to timing of dummy scanning in each dummy scanning period. Specifically, start (start of output of a signal electric potential) and end (end of output of the signal electric potential) of a horizontal scanning period coincide with start (start of writing of the signal electric potential) and end (end of writing of the signal electric potential) of corresponding horizontal scanning, respectively. Further, start (start of output of a dummy electric potential) and end (end of output of the dummy electric potential) of a dummy scanning period coincide with start (start of writing of the dummy electric potential) and end (end of writing of the dummy electric potential) of corresponding dummy scanning, respectively. Note that the storage capacitor wire signals SCS0 through SCS1082 are identical to those shown in FIGS. 1 through 3.

Here, the gate pulse GP23 supplied to the scanning signal line G23 is activated at the same time as start of horizontal scanning carried out immediately before horizontal scanning corresponding to the scanning signal line G23, i.e., at the same time as start of the horizontal scanning period H21. The gate pulse GP23 is active during two horizontal scanning periods, i.e., the horizontal scanning period H21 and the horizontal scanning period H23. Then, the gate pulse GP23 is deactivated at the same time as end of the horizontal scanning period H23. During the horizontal scanning period H21, a signal electric potential which corresponds to the video data D21 (video data corresponding to a pixel connected to the scanning signal line G21) and which has the same polarity (positive polarity) as signal electric potentials in the group Gr1 is supplied to the data signal line SL1. During the horizontal scanning period H23, a signal electric potential which corresponds to the video data D23 (video data corresponding to a pixel connected to the scanning signal line G23) and which has the same polarity (positive polarity) as the signal electric potentials in the group Gr1 is supplied to the data signal line SL1. That is, pre-charging is carried out during the horizontal scanning period H21, and main charging (writing of positive signal electric potentials corresponding to the video data D23) is carried out in horizontal scanning of the horizontal scanning period H23.

The gate pulse GP0 supplied to the scanning signal line G0 is activated at the same time as start of horizontal scanning carried out immediately before dummy scanning corresponding to the scanning signal line G0, i.e., at the same time as start of the horizontal scanning period H23. The gate pulse GP0 is active during two horizontal scanning periods, i.e., the horizontal scanning period H23 and the first dummy scanning period DS1. Then, the gate pulse GP0 is deactivated at the same time as end of the first dummy scanning period DS1.

The gate pulse GP1081 supplied to the scanning signal line G1081 is activated at the same time as start of dummy scanning carried out immediately before dummy scanning corresponding to the dummy scanning signal line G1080, i.e., at the same time as start of the first dummy scanning period DS1. The gate pulse GP1081 is active during two horizontal scanning periods, i.e., the first dummy scanning period DS1 and the second dummy scanning period DS2. Then, the gate pulse GP1081 is deactivated at the same time as end of the second dummy scanning period DS2.

The gate pulse GP2 supplied to the scanning signal line G2 is activated at the same time as start of dummy scanning carried out immediately before horizontal scanning corresponding to the scanning signal line G2, i.e., at the same time as start of the second dummy scanning period DS2. The gate pulse GP2 is active during two horizontal scanning periods, i.e., the second dummy scanning period DS2 and the horizontal scanning period H2. Then, the gate pulse GP2 is deactivated at the same time as end of the horizontal scanning period H2.

During the second dummy scanning period DS2, a signal electric potential which corresponds to the second dummy data Db and which has the same polarity (negative polarity) as the signal electric potentials in the group Gr2 is supplied to the data signal line SL1. During the horizontal scanning period H2, a signal electric potential which corresponds to the video data D2 (video data corresponding to a pixel connected to the scanning signal line G2) and which has the same polarity (positive polarity) as the signal electric potentials in the group Gr2 is supplied to the data signal line SL1. That is, pre-charging is carried out during the dummy scanning period DS2, and main charging (writing of a positive signal electric potential corresponding to the video data D2) is carried out in horizontal scanning of the horizontal scanning period H2.

Figure 17:
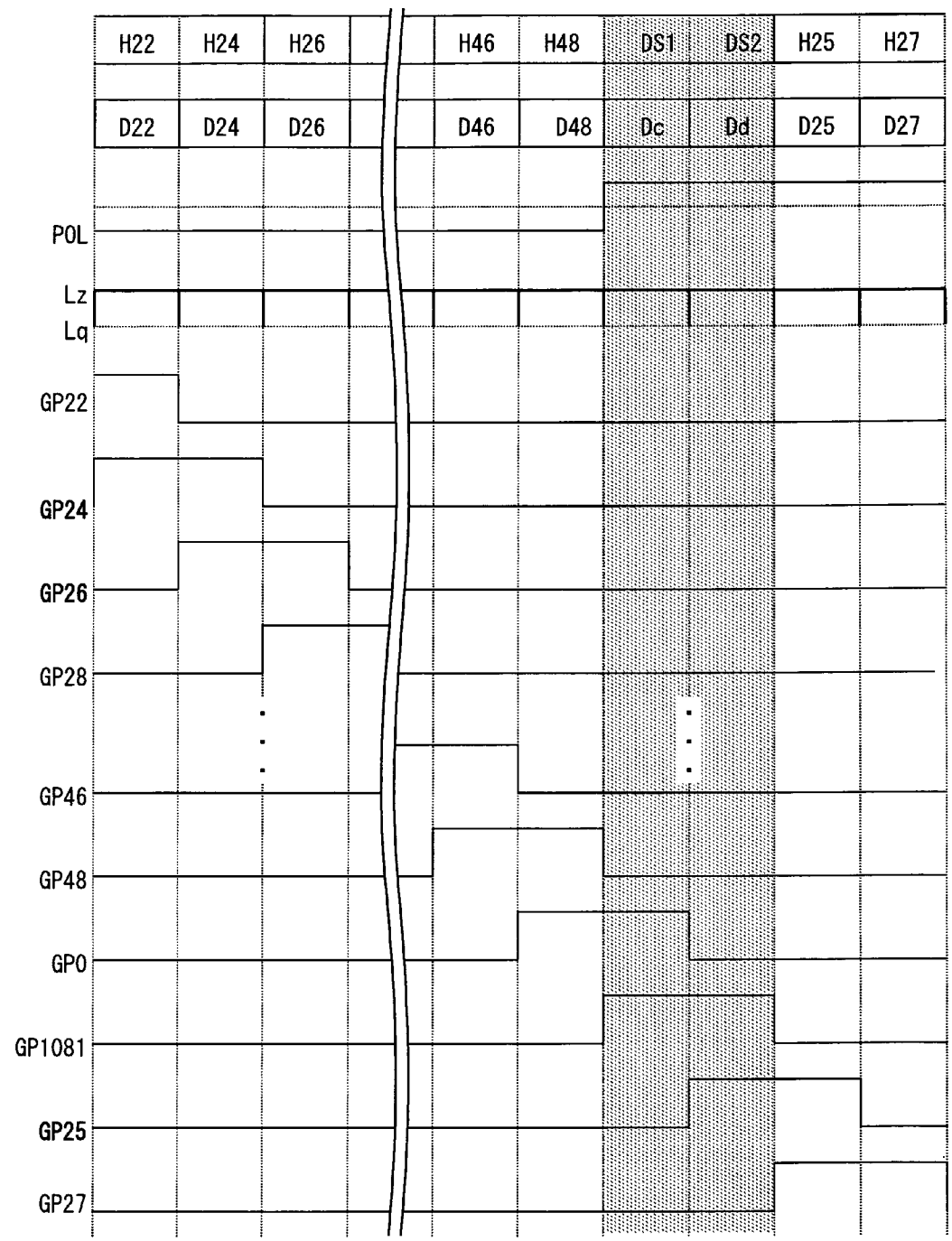
FIG. 17 is a timing chart showing a fluctuation in load applied to the scanning signal line driving circuit in the exemplary driving shown in FIG. 15.

Next, with reference to FIG. 17, the following discusses (i) a status of load applied to the scanning signal line driving circuit before start of scanning, at the time of start of scanning, and during the scanning of the scanning signal line G24, (ii) a status of load applied to the scanning signal line driving circuit before start of scanning, at the time of start of scanning, and during the scanning of the scanning signal line G25, and (iii) a status of load applied to the scanning signal line driving circuit before start of scanning, at the time of start of scanning, and during the scanning of the scanning signal line G26, the scanning signal lines G24, G25, and G26 being located in the vicinity of a border between the blocks B1 and B2. In FIG. 17, Lq represents load applied to the scanning signal line driving circuit when (i) a single scanning signal line or a single dummy scanning signal line is active, (ii) another scanning signal line or another dummy scanning signal line is activated, and (iii) at the same time, still another scanning signal line or still another dummy scanning signal line is deactivated, and Lz represents load applied to the scanning signal line driving circuit while (i) a single scanning signal line or a single dummy scanning signal line is being active and (ii) another scanning signal line or another dummy scanning signal line is being active.

Before start of scanning of the scanning signal line G24, a single scanning signal line, more specifically, the scanning signal line G22 and another scanning signal line, more specifically, the scanning signal line G24 are active. Accordingly, load applied to the scanning signal line driving circuit is Lz.

At the time of start of scanning of the scanning signal line G24, a single scanning signal line, more specifically, the scanning signal line G24 is active, another scanning signal line, more specifically, the scanning signal line G26 is activated, and at the same time, still another scanning signal line, more specifically, the scanning signal line G22 is deactivated. Accordingly, load applied to the scanning signal line driving circuit is Lq. During the scanning of the scanning signal line G24, a single scanning signal line, more specifically, the scanning signal line G24 and another scanning signal line, more specifically, the scanning signal line G26 are active. Accordingly, load applied to the scanning signal line driving circuit is Lz.

Before start of scanning of the scanning signal line G25, a single dummy scanning signal line, more specifically, the dummy scanning signal line G0 and another dummy scanning signal line, more specifically, the dummy scanning signal line G1081 are active. Accordingly, load applied to the scanning signal line driving circuit is Lz. At the time of start of scanning of the scanning signal line G25, a single dummy scanning signal line, more specifically, the dummy scanning signal line G1081 is active, another scanning signal line, more specifically, the scanning signal line G25 is activated, and at the same time, still another scanning signal line, more specifically, the scanning signal line G0 is deactivated. Accordingly, load applied to the scanning signal line driving circuit is Lq. During the scanning of the scanning signal line G25, a single scanning signal line, more specifically, the scanning signal line G25 and a single dummy scanning signal line, more specifically, the dummy scanning signal line G1081 are active. Accordingly, load applied to the scanning signal line driving circuit is Lz.

Before start of scanning of the scanning signal line G26, a single scanning signal line, more specifically, the scanning signal line G24 and another scanning signal line, more specifically, the scanning signal line G26 are active. Accordingly, load applied to the scanning signal line driving circuit is Lz. At the time of start of scanning of the scanning signal line G26, a single scanning signal line, more specifically, the scanning signal line G26 is active, another scanning signal line, more specifically, the scanning signal line G28 is activated, and at the same time, still another scanning signal line, more specifically, the scanning signal line G24 is deactivated. Accordingly, load applied to the scanning signal line driving circuit is Lq. During the scanning of the scanning signal line G26, a single scanning signal line, more specifically, the scanning signal line G26 and another scanning signal line, more specifically, the scanning signal line G28 are active. Accordingly, load applied to the scanning signal line driving circuit is Lz.

As described above, also in the arrangement of FIGS. 15 and 16, a status of load applied to the scanning signal line driving circuit before start of scanning, at the time of start of scanning, and during the scanning of one scanning signal line can be made identical to a status of load applied to the scanning signal line driving circuit before start of scanning, at the time of start of scanning, and during the scanning of another scanning signal line. This makes it possible to reduce a difference in charging rate between (i) pixels respectively connected to the second scanning signal line in an odd-numbered block and the first scanning signal line in an even-numbered block and (ii) the other blocks, thereby suppressing horizontal-striped unevenness occurring in the vicinity of borders between the blocks.

Further, according to this arrangement, load on the scanning signal line driving circuit is almost always kept at Lz during a vertical scanning period. That is, there is almost no fluctuation in load on the scanning signal line driving circuit. This makes the suppression of the horizontal-striped unevenness more effective. Further, as shown in FIG. 17, timings at which the load becomes Lq are periodical. This makes the suppression of the horizontal-striped unevenness further more effective.

Further, according to this arrangement, each pixel is precharged for a single horizontal scanning period. This can increase a charging rate of each pixel. In the arrangement of FIGS. 15 and 16, each dummy scanning period has a length equal to that of 1 horizontal scanning period. However, the present embodiment is not limited to this. Each dummy scanning period may be shorter or longer than 1 horizontal scanning period.

Embodiment 2

Figure 24:
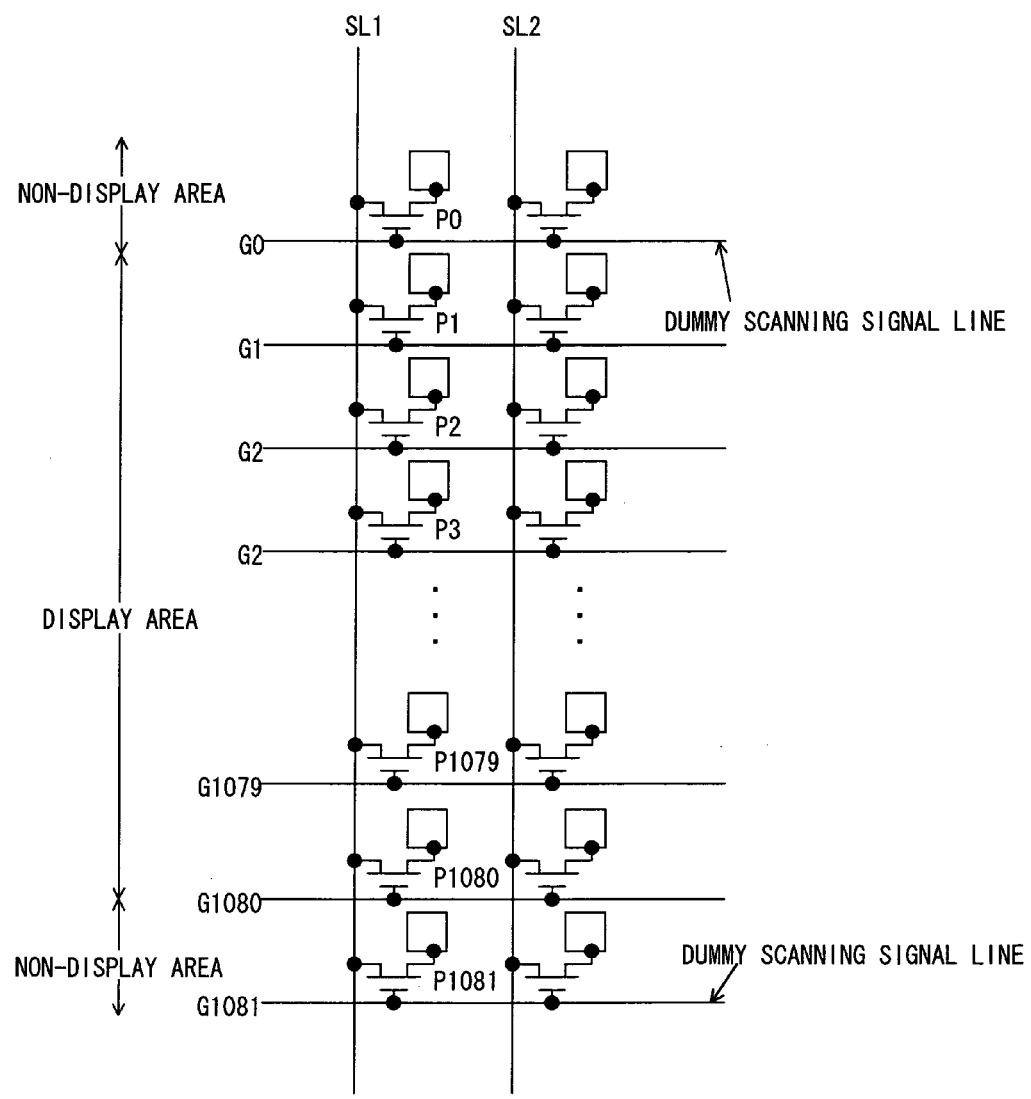
FIG. 24 is a view schematically illustrating another configuration of the present liquid crystal display device.
Figure 25:
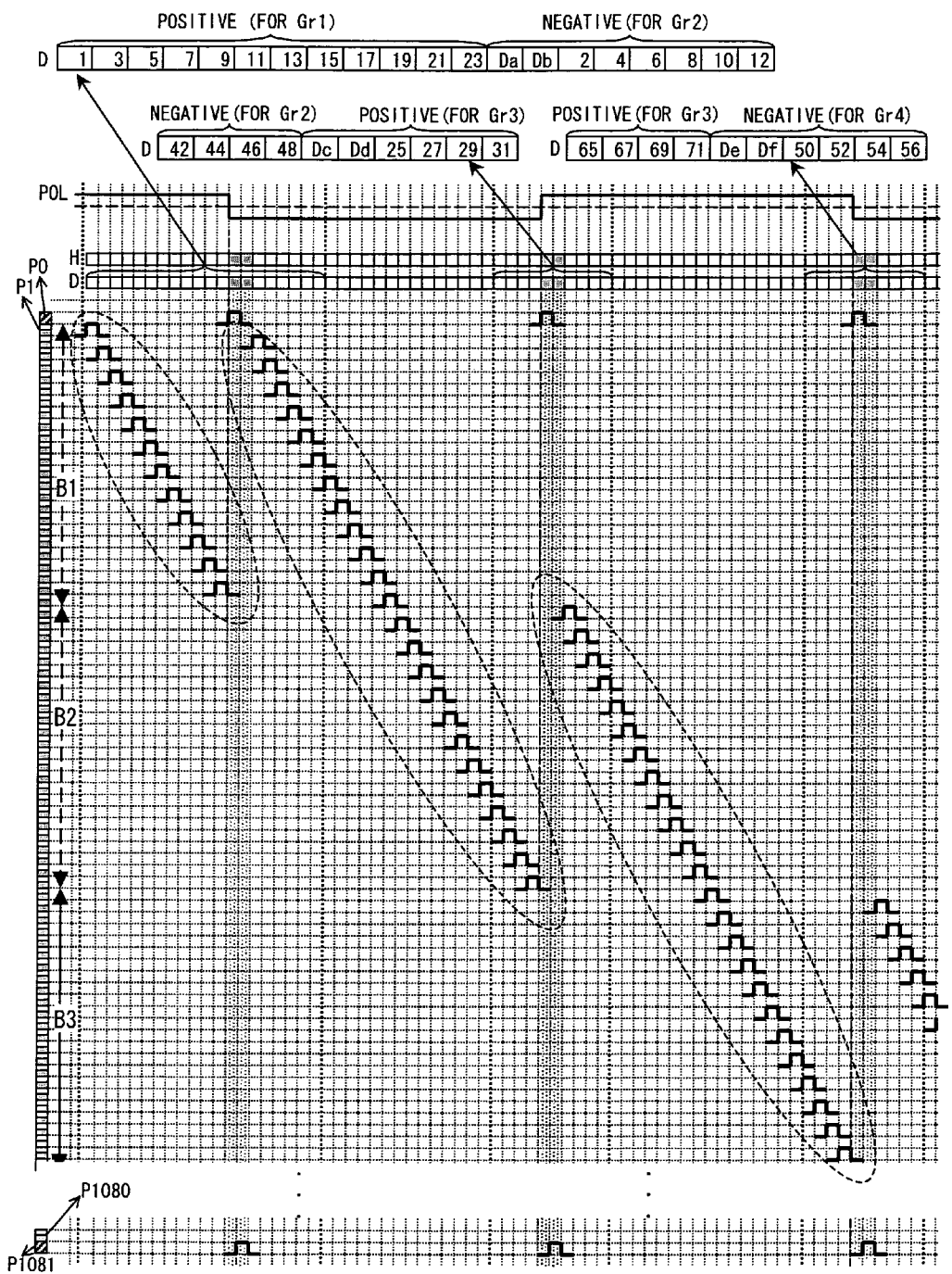
FIG. 25 is a timing chart showing an exemplary driving of the liquid crystal display device of FIG. 24.

In the present embodiment, the scanning signal lines are sequentially scanned while the data signal lines are subjected to block inversion driving, as shown in FIGS. 24 and 25. First, the scanning signal line G1 and the subsequent scanning signal lines in the display area are divided into 90 blocks (B1 through B90) by 89 borders parallel to the scanning signal lines. Each of the blocks includes 12 successive scanning signal lines. For example, the block B1, which is a most upstream side block, includes the scanning signal lines G1 through G12, the block B2 includes the scanning signal lines G13 through G24, the block B3 includes the scanning signal lines G25 through G36, and the block B90, which is a most downstream side block, includes the scanning signal lines G1069 through G1080.

Then, the scanning signal lines are divided into groups as follows. Specifically, a top group Gr1 is formed which includes the 12 scanning signal lines (G1, G2, . . . G12) included in the block B1 which is the most upstream side block, and a group Gr2 is formed which includes the 12 scanning signal lines (G13, G14, . . . G24) included in the block B2 which follows the block B1. Similarly, groups Gr3 through Gr90 are formed each of which includes 12 scanning signal lines included in a corresponding block. The groups Gr1 through Gr90 are sequentially selected in an order from the group Gr1 to the group Gr90. While scanning signal lines included in a selected group are sequentially scanned horizontally, signal electric potentials of the same polarity are sequentially supplied to a data signal line. Further, a polarity (positive or negative) of signal electric potentials supplied to a data signal line is inverted when a selected group is changed from a preceding group to a succeeding group that is selected immediately after the preceding group, as indicated by the polarity inverting signal POL of FIGS. 24 and 25.

Specifically, the group Gr1 is first selected. While the scanning signal lines (G1, G2, . . . G12) belonging to the group Gr1 are sequentially scanned horizontally, positive signal electric potentials corresponding to the video data (D1, D2, . . . D12) are sequentially supplied to the data signal line SL1. Next, the group Gr2 is selected. While the scanning signal lines (G13, G14, . . . G24) belonging to the group Gr2 are sequentially scanned horizontally, negative signal electric potentials corresponding to the video data (D13, D14, . . . D24) are sequentially supplied to the data signal line SL1. Next, the group Gr3 is selected. While the scanning signal lines (G25, G26, . . . G48) belonging to the group Gr3 are sequentially scanned horizontally, positive signal electric potentials corresponding to the video data (D25, D26, . . . D48) are sequentially supplied to the data signal line SL1. Here, it is assumed that a period in which a signal electric potential corresponding to single video data is supplied (outputted) to a data signal line is a horizontal scanning period (H).

Further, first and second dummy data are inserted between video data corresponding to the last horizontal scanning in the preceding group and video data corresponding to the first horizontal scanning in the succeeding group, and first and second dummy scanning periods are inserted between a horizontal scanning period corresponding to the last horizontal scanning in the preceding group and a horizontal scanning period corresponding to the first horizontal scanning in the succeeding group.

During the first dummy scanning period, the dummy scanning signal line G0 is subjected to dummy scanning so as to be made active for a predetermined period of time. Then, the dummy scanning signal line G0 is deactivated. During the first dummy scanning period, a dummy electric potential which corresponds to the first dummy data and which has the same polarity as signal electric potentials in the succeeding group is supplied to a data signal line. The first dummy data is identical to video data corresponding to the first horizontal scanning in the succeeding group. Further, during the second dummy scanning period, the dummy scanning signal line G1081 is subjected to dummy scanning so as to be made active for a predetermined period of time. Then, the dummy scanning signal line G1081 is deactivated. During the second dummy scanning period, a dummy electric potential which corresponds to the second dummy data and which has the same polarity as the signal electric potentials in the succeeding group is supplied to the data signal line. The second dummy data is identical to video data corresponding to the first horizontal scanning in the succeeding group.

Here, timing of horizontal scanning in each horizontal scanning period is identical to timing of dummy scanning in each dummy scanning period. Specifically, start (start of output of a signal electric potential) and end (end of output of the signal electric potential) of a horizontal scanning period coincide with start (start of writing of the signal electric potential) and end (end of writing of the signal electric potential) of corresponding horizontal scanning, respectively. Further, start (start of output of a dummy electric potential) and end (end of output of the dummy electric potential) of a dummy scanning period coincide with start (start of writing of the dummy electric potential) and end (end of writing of the dummy electric potential) of corresponding dummy scanning, respectively.

Further, each of gate pulses GP1 through GP1080 respectively supplied to the scanning signal lines G1 through G1080 and gate pulses GP0 and GP1081 respectively supplied to the dummy scanning signal lines G0 and G1081 has width equal to 1 horizontal scanning period (1H). Each scanning signal line is activated at the same time as start of corresponding horizontal scanning, and each dummy scanning signal line also is activated at the same time as start of corresponding dummy scanning.

Figure 18:
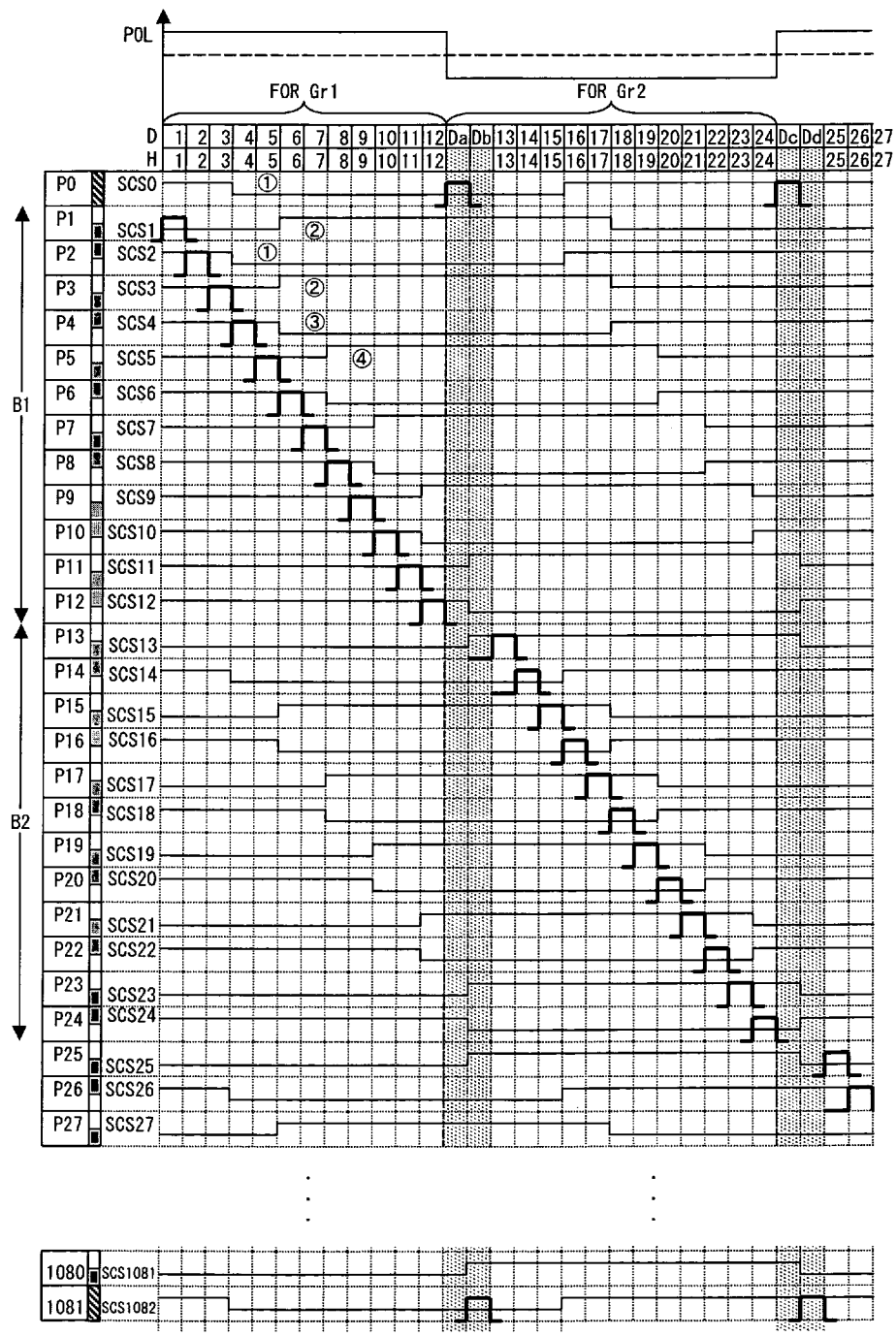
FIG. 18 is a timing chart showing an exemplary driving of a liquid crystal display device of Embodiment 2.
Figure 19:
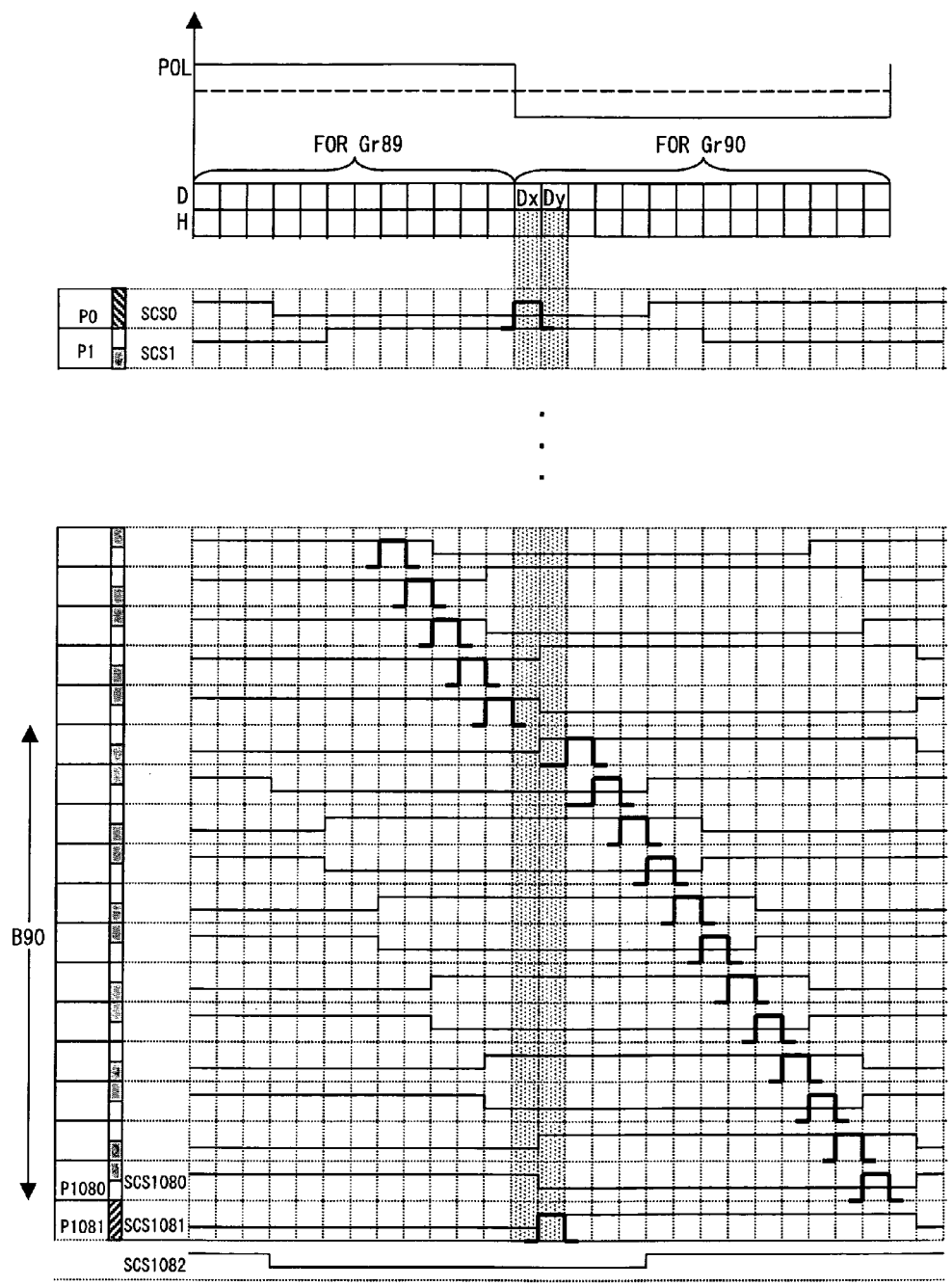
FIG. 19 is a continuation of the timing chart of FIG. 18.

For example, as shown in FIGS. 18 and 19, first dummy data Da and second dummy data Db are inserted between video data D12 corresponding to the last horizontal scanning (horizontal scanning of G12) in the group Gr1 and video data D13 corresponding to the first horizontal scanning (horizontal scanning of G13) in the group Gr2, and first dummy scanning period DS1 and second dummy scanning period DS2 are inserted between a horizontal scanning period H12 corresponding to the last horizontal scanning in the group Gr1 and a horizontal scanning period H13 corresponding to the first horizontal scanning in the group Gr2.

Here, the gate pulse GP12 supplied to the scanning signal line G12 is activated at the same time as start of the horizontal scanning period H12, and the gate pulse GP12 is deactivated at the same time as end of the horizontal scanning period H12. During the horizontal scanning period H12, a signal electric potential which corresponds to the video data D12 (video data corresponding to a pixel connected to the scanning signal line G12) and which has the same polarity (positive polarity) as the signal electric potentials in the group Gr1 is supplied to the data signal line SL1.

Next, the gate pulse G0 supplied to the dummy scanning signal line G0 is activated at the same time as start of the first dummy scanning period DS1, and the gate pulse G0 is deactivated at the same time as end of the first dummy scanning period DS1. During the first dummy scanning period DS1, a dummy electric potential which corresponds to the first dummy data Da and which has the same polarity (negative polarity) as the signal electric potentials in the group Gr2 is supplied to the data signal line SL1. The first dummy data Da is identical to the video data D13 (data of a next frame) corresponding to horizontal scanning of the scanning signal line G2 that is carried out immediately after the dummy scanning.

Next, the gate pulse G1081 supplied to the dummy scanning signal line G1081 is activated at the same time as start of the second dummy scanning period DS2, and the gate pulse G1081 is deactivated at the same time as end of the second dummy scanning period DS2. During the second dummy scanning period DS2, a dummy electric potential which corresponds to the second dummy data Db and which has the same polarity (negative polarity) as the signal electric potentials in the group Gr2 is supplied to the data signal line SL1. The second dummy data Db is identical to the video data D13 (data of a next frame) corresponding to horizontal scanning of the scanning signal line G2 that is carried out immediately after the dummy scanning.

Figure 20:
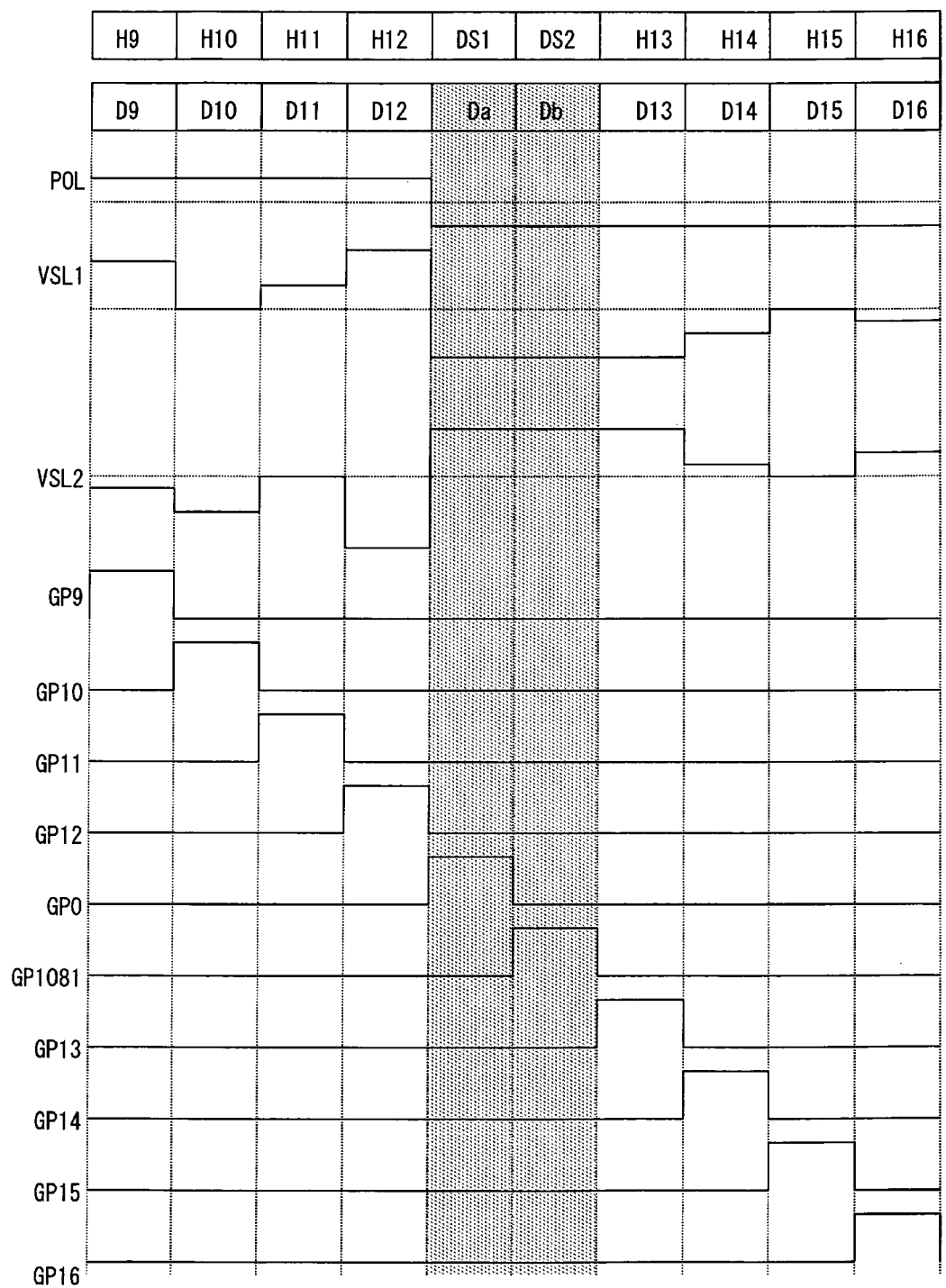
FIG. 20 is a timing chart showing in more detail the exemplary driving shown in FIGS. 18 and 19.

Next, the gate pulse GP13 supplied to the scanning signal line G13 is activated at the same time as start of the horizontal scanning period H13, and the gate pulse GP13 is deactivated at the same time as end of the horizontal scanning period H13. During the horizontal scanning period H13, a signal electric potential which corresponds to the video data D13 (video data corresponding to a pixel connected to the scanning signal line G13) and which has the same polarity (negative polarity) as the signal electric potentials in the group Gr2 is supplied to the data signal line SL1. That is, as shown in FIG. 20, an identical signal electric potential is supplied to the data signal line SL1 throughout the first dummy scanning period DS1, second dummy scanning period DS2, and horizontal scanning period H13.

Figure 22:
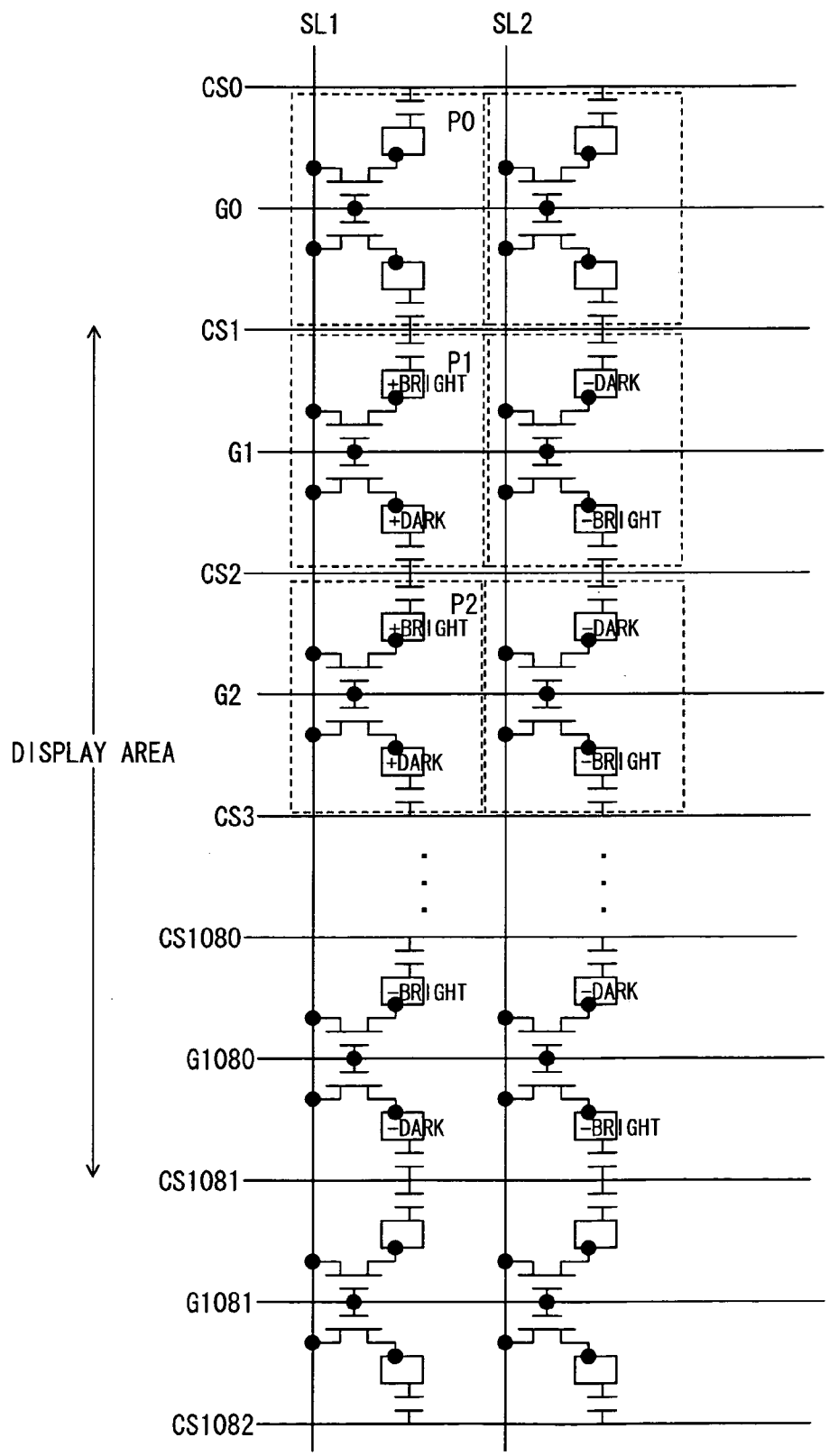
FIG. 22 is a view schematically illustrating a polarity distribution of written electric potentials in Embodiment 1.

In the present embodiment in which the scanning signal lines are sequentially scanned while the data signal lines are subjected to block inversion driving, a polarity distribution of electric potentials written into the pixels is as shown in FIG. 22.

Next, with reference to FIGS. 18 and 19, the following describes a storage capacitor wire signal SCSi supplied to a storage capacitor wire CSi (i is an integer in a range from 1 to 1081) and storage capacitor wire signals SCS0 and SCS1082 respectively supplied to the dummy storage capacitor wires CS0 and CS1082. As shown in FIGS. 18 and 19, each of the storage capacitor wire signals SCS0 through SCS1082 has any one of waveforms of 11 phases (first phase represented by the storage capacitor wire signal SCS2, second phase represented by the storage capacitor wire signals SCS1 and SCS3, third phase represented by the storage capacitor wire signal SCS4, fourth phase represented by the storage capacitor wire signal SCS5, fifth phase represented by the storage capacitor wire signal SCS6, sixth phase represented by the storage capacitor wire signal SCS7, seventh phase represented by the storage capacitor wire signal SCS8, eighth phase represented by the storage capacitor wire signal SCS9, ninth phase represented by the storage capacitor wire signal SCS10, tenth phase represented by the storage capacitor wire signal SCS11, eleventh phase represented by the storage capacitor wire signal SCS12).

These phases have an identical cycle (28H cycle constituted by a first section in which a High level continues for 14H and a second section in which a Low level continues for 14H). The second phase represented by the storage capacitor wire signal SCS1 is behind the first phase represented by the storage capacitor wire signal SCS2 by 16H. One of any two successive odd-numbered phases is behind the other one which is followed by the one by 2H, and one of any two successive even-numbered phases is behind the other one which is followed by the one by 2H. For example, the third phase represented by the storage capacitor wire signal SCS4 is behind the first phase represented by the storage capacitor wire signal SCS2 by 2H, and the fourth phase represented by the storage capacitor wire signal SCS5 is behind the second phase represented by the storage capacitor wire signal SCS3 by 2H.

A storage capacitor wire signal SCS($12j$+2) (j is an integer in a range from 0 to 89), the storage capacitor wire signal SCS0, and the storage capacitor wire signal SCS1082 have the first phase, the storage capacitor wire signal SCS1 and a storage capacitor wire signal SCS($12j$+3) have the second phase, a storage capacitor wire signal SCS($12j$+4) has the third phase, a storage capacitor wire signal SCS($12j$+5) has the fourth phase, a storage capacitor wire signal SCS($12j$+6) has the fifth phase, a storage capacitor wire signal SCS($12j$+7) has the sixth phase, a storage capacitor wire signal SCS($12j$+8) has the seventh phase, a storage capacitor wire signal SCS($12j$+9) has the eighth phase, and a storage capacitor wire signal SCS($12j$+10) has the ninth phase. Further, a storage capacitor wire signal SCS($12j$+11) (j is an integer in a range from 0 to 89) and a storage capacitor wire signal SCS($12k$+13) (k is an integer in a range from 0 to 89) have the tenth phase. Further, a storage capacitor wire signal SCS($12j$+12) (j is an integer in a range from 0 to 89) has the eleventh phase.

Figure 21:
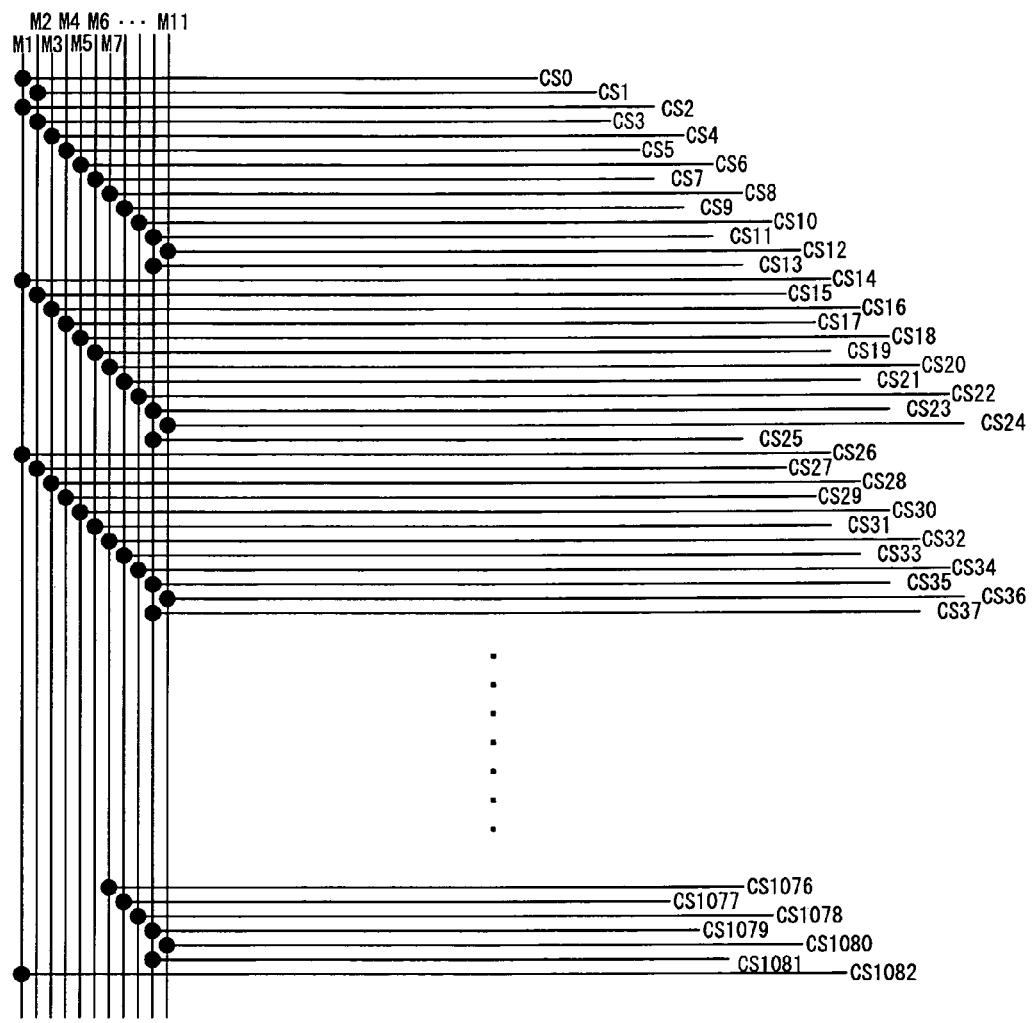
FIG. 21 is a view schematically illustrating how storage capacitor wires are connected to storage capacitor main wires in Embodiment 2.

As shown in FIG. 21, the storage capacitor wire signals of the first through eleventh phases are supplied to storage capacitor main wires M1 through M11, respectively. A storage capacitor wire SCS0, a storage capacitor wire SCS1082, and a storage capacitor wire SCS($12j$+2) (j is an integer in a range from 0 to 89) are connected to the storage capacitor main wire M1, the storage capacitor wire CS1 and a storage capacitor wire CS($12j$+3) are connected to the storage capacitor main wire M2, a storage capacitor wire CS($12j$+4) is connected to the storage capacitor main wire M3, a storage capacitor wire CS($12j$+5) is connected to the storage capacitor main wire M4, a storage capacitor wire CS($12j$+6) is connected to the storage capacitor main wire M5, a storage capacitor wire CS($12j$+7) is connected to the storage capacitor main wire M6, a storage capacitor wire CS($12j$+8) is connected to the storage capacitor main wire M7, a storage capacitor wire CS($12j$+9) is connected to the storage capacitor main wire M8, and a storage capacitor wire CS($12j$+10) is connected to the storage capacitor main wire M9. Further, a storage capacitor wire CS($12j$+11) (j is an integer in a range from 0 to 89) and a storage capacitor wire CS($12k$+13) (k is an integer in a range from 0 to 89) are connected to the storage capacitor main wire M10. Further, a storage capacitor wire CS($12j$+12) (j is an integer in a range from 0 to 89) is connected to the storage capacitor main wire M11.

The waveforms of the storage capacitor wire signals SCS0 through SCS1082 are as described above. In the present liquid crystal display device, as shown in FIG. 18, the storage capacitor wire signal SCS1 (second phase) has "L" level during the horizontal scanning period H1 corresponding to the scanning signal line G1, and is level-shifted from "L" level to "H" level at a timing when 4H elapses after the end of the horizontal scanning period H1, and the storage capacitor wire signal SCS2 (first phase) has "H" level during the horizontal scanning period H1 corresponding to the scanning signal line G1, and is level-shifted from "H" level to "L" level at a timing when 2H elapses after the end of the horizontal scanning period H1.

One of the two sub-pixels of the pixel P1 includes a pixel electrode that forms storage capacitance with the storage capacitor wire CS1, and the other one of the two sub-pixels includes a pixel electrode that forms storage capacitance with the storage capacitor wire CS2. A positive signal electric potential is supplied to the two pixel electrodes during the horizontal scanning period H1, but as the storage capacitor wire signal SCS1 is level-shifted from "L" level to "H" level, an electric potential of the pixel electrode that forms the storage capacitance with the storage capacitor wire CS1 increases, and as the storage capacitor wire signal SCS2 is level-shifted from "H" level to "L" level, an electric potential of the pixel electrode that forms the storage capacitance with the storage capacitor wire CS2 declines. Here, the storage capacitor wire signal SCS1 has an effective electric potential higher than a reference electric potential until 1 vertical scanning period elapses from the level-shift, and the storage capacitor wire signal SCS2 has an effective electric potential lower than the reference electric potential until 1 vertical scanning period elapses from the level-shift. Thus, the sub-pixel including the pixel electrode that forms storage capacitance with the storage capacitor wire CS1 becomes a "bright sub-pixel", and the sub-pixel including the pixel electrode that forms storage capacitance with the storage capacitor wire CS2 becomes a "dark sub-pixel", as shown in FIG. 18. A halftone can be displayed by these bright and dark sub-pixels.

Since the storage capacitor wire signals SCS1 and SCS2 (first and second phases) are set as above, the storage capacitor wire signal SCS2 (first phase) has "H" level during the horizontal scanning period H2 corresponding to the scanning signal line G2, and is level-shifted from "H" level to "L" level at a timing when 1H elapses after the end of the horizontal scanning period H2, and the storage capacitor wire signal SCS3 (second phase) has "L" level during the horizontal scanning period H2 corresponding to the scanning signal line G2, and is level-shifted from "L" level to "H" level at a timing when 3H elapses after the end of the horizontal scanning period H2.

One of the two sub-pixels of the pixel P2 includes a pixel electrode that forms storage capacitance with the storage capacitor wire CS2, and the other one of the two sub-pixels includes a pixel electrode that forms storage capacitance with the storage capacitor wire CS3. A positive signal electric potential is supplied to the two pixel electrodes during the horizontal scanning period H1, but as the storage capacitor wire signal SCS2 is level-shifted from "H" level to "L" level, an electric potential of the pixel electrode that forms the storage capacitance with the storage capacitor wire CS2 declines, and as the storage capacitor wire signal SCS3 is level-shifted from "L" level to "H" level, an electric potential of the pixel electrode that forms the storage capacitance with the storage capacitor wire CS3 increases. Here, the storage capacitor wire signal SCS2 has an effective electric potential lower than a reference electric potential until 1 vertical scanning period elapses from the level-shift, and the storage capacitor wire signal SCS3 has an effective electric potential higher than the reference electric potential until 1 vertical scanning period elapses from the level-shift. Thus, the sub-pixel including the pixel electrode that forms storage capacitance with the storage capacitor wire CS2 becomes a "dark sub-pixel", and the sub-pixel including the pixel electrode that forms storage capacitance with the storage capacitor wire CS3 becomes a "bright sub-pixel", as shown in FIG. 18. A halftone can be displayed by these bright and dark sub-pixels.

Since the storage capacitor wire signals SCS1 and SCS2 (first and second phases) are set as above, the storage capacitor wire signal SCS13 (tenth phase) has "H" level during the horizontal scanning period H13 corresponding to the scanning signal line G13, and is level-shifted from "H" level to "L" level at a timing when 12H elapses after the end of the horizontal scanning period H13, and the storage capacitor wire signal SCS14 (first phase) has "L" level during the horizontal scanning period H13 corresponding to the scanning signal line G13, and is level-shifted from "L" level to "H" level at a timing when 2H elapses after the end of the horizontal scanning period H13.

One of two sub-pixels of the pixel P13 includes a pixel electrode that forms storage capacitance with the storage capacitor wire CS13, and the other one of the two sub-pixels includes a pixel electrode that forms storage capacitance with the storage capacitor wire CS14. A negative signal electric potential is supplied to the two pixel electrodes during the horizontal scanning period H13, but as the storage capacitor wire signal SCS13 is level-shifted from "H" level to "L" level, an electric potential of the pixel electrode that forms the storage capacitance with the storage capacitor wire CS13 declines, and as the storage capacitor wire signal SCS14 is level-shifted from "L" level to "H" level, an electric potential of the pixel electrode that forms the storage capacitance with the storage capacitor wire CS14 increases. Here, the storage capacitor wire signal SCS13 has an effective electric potential lower than a reference electric potential until 1 vertical scanning period elapses from the level-shift, and the storage capacitor wire signal SCS14 has an effective electric potential higher than the reference electric potential until 1 vertical scanning period elapses from the level-shift. Thus, the sub-pixel including the pixel electrode that forms storage capacitance with the storage capacitor wire CS13 becomes a "bright sub-pixel", and the sub-pixel including the pixel electrode that forms storage capacitance with the storage capacitor wire CS14 becomes a "dark sub-pixel". A halftone can be displayed by these bright and dark sub-pixels.

According to the present liquid crystal display device, two sub-pixels included in a single pixel are "bright sub-pixel" and "dark sub-pixel" as shown in FIGS. 18 and 19, and a halftone can be displayed by the "bright sub-pixel" and "dark sub-pixel". This allows an improvement in viewing angle characteristics. Further, in a single pixel column, a set of bright sub-pixel, dark sub-pixel, dark sub-pixel, and bright sub-pixel is repeatedly disposed. This allows display with less roughness.

According to the present liquid crystal display device, it is possible to suppress power consumption and heat generation of the drivers and to increase charging rate of the pixels as compared to a case where the data signal lines are subjected to dot inversion (1H inversion) driving. Further, immediately after inversion of a polarity of signal electric potentials supplied to a data signal line, a dummy electric potential having the same polarity as that obtained after the inversion is supplied to the data signal line throughout the first and second dummy scanning periods. This makes it possible to reduce a difference in charging rate between (i) pixels respectively connected to the second scanning signal line in an odd-numbered block and the first scanning signal line in an even-numbered block and (ii) the other pixels. Consequently, it is possible to suppress horizontal-striped unevenness that can be observed in the vicinity of borders between the blocks in a case where block inversion driving is carried out.

A noteworthy point is that since a single dummy scanning signal line is activated for a predetermined period of time during each of the first and second dummy scanning period, and is then deactivated, a status of load applied to a scanning signal line driving circuit before start of scanning, at the start of the scanning, and during the scanning of one scanning signal line can be made identical to a status of load applied to the scanning signal line driving circuit before start of scanning, at the start of the scanning, and during the scanning of another scanning signal line.

Figure 23:
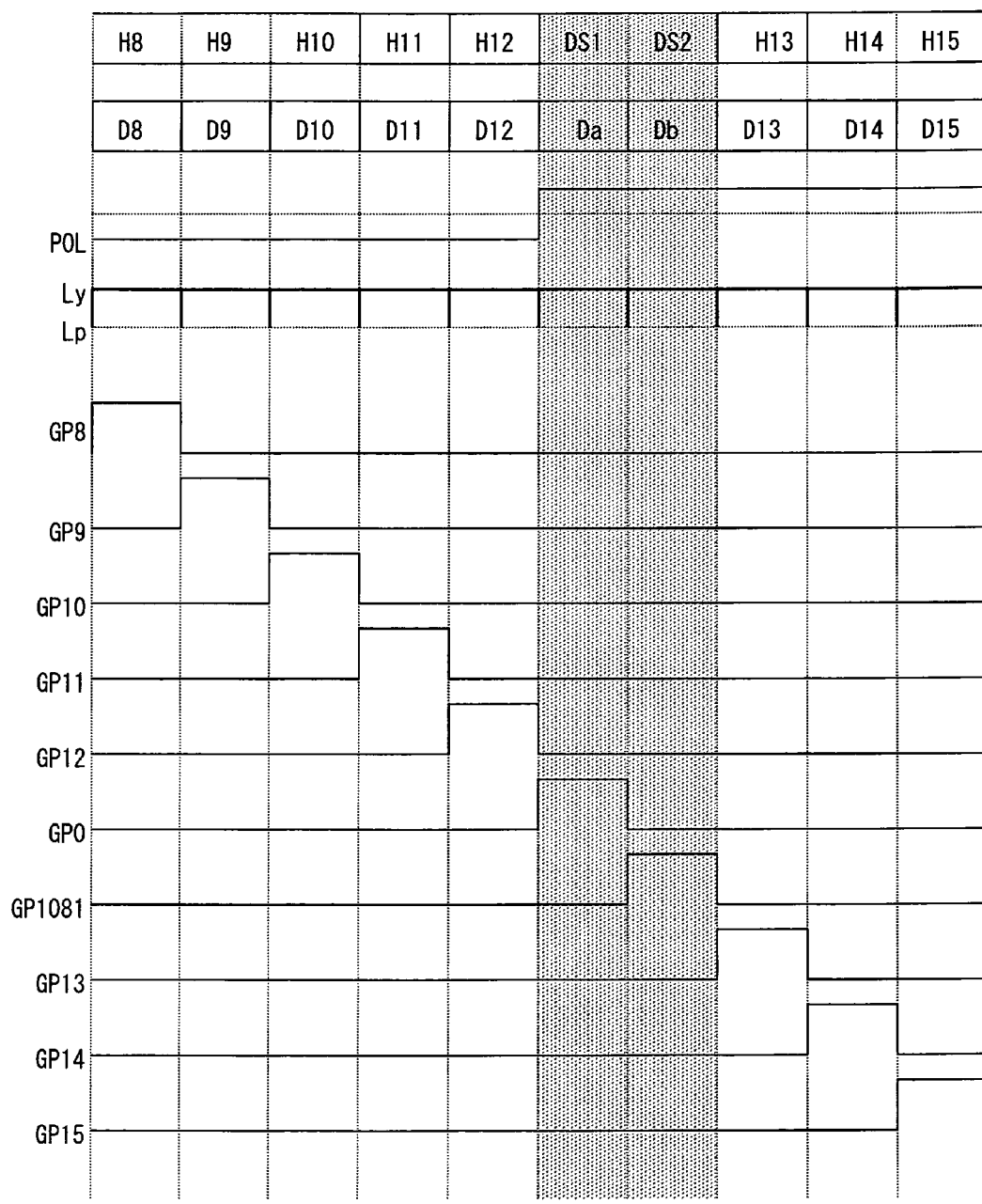
FIG. 23 is a timing chart showing a fluctuation in load applied to a scanning signal line driving circuit in the exemplary driving shown in FIGS. 18 and 19.

Next, with reference to FIG. 23, the following discusses (i) a status of load applied to the scanning signal line driving circuit before start of scanning, at the time of start of scanning, and during the scanning of the scanning signal line G12, (ii) a status of load applied to the scanning signal line driving circuit before start of scanning, at the time of start of scanning, and during the scanning of the scanning signal line G13, and (iii) a status of load applied to the scanning signal line driving circuit before start of scanning, at the time of start of scanning, and during the scanning of the scanning signal line G14, the scanning signal lines G12, G13, and G14 being located in the vicinity of a border between the blocks B1 and B2. In FIG. 23, Lp represents load applied to the scanning signal line driving circuit when (i) a single scanning signal line or a single dummy scanning signal line is activated, and (ii) at the same time, another scanning signal line or another dummy scanning signal line is deactivated, and Ly represents load applied to the scanning signal line driving circuit while a single scanning signal line or a single dummy scanning signal line is being active.

Before start of scanning of the scanning signal line G12, a single scanning signal line, more specifically, the scanning signal line G11 is active. Accordingly, load on the scanning signal line driving circuit is Ly. At the time of the start of the scanning of the scanning signal line G12, a single scanning signal line, more specifically, the scanning signal line G12 is activated, and at the same time, another scanning signal line, more specifically, the scanning signal line G11 is deactivated. Accordingly, load on the scanning signal line driving circuit is Lp. During the scanning of the scanning signal line G12, a single scanning signal line, more specifically, the scanning signal line G12 is active. Accordingly, load on the scanning signal line driving circuit is Ly.

Before start of scanning of the scanning signal line G13, a single dummy scanning signal line, more specifically, the dummy scanning signal line G1081 is active. Accordingly, load on the scanning signal line driving circuit is Ly. At the time of the start of the scanning of the scanning signal line G13, a single scanning signal line, more specifically, the scanning signal line G13 is activated, and at the same time, another dummy scanning signal line, more specifically, the dummy scanning signal line G1081 is deactivated. Accordingly, load on the scanning signal line driving circuit is Lp. During the scanning of the scanning signal line G13, a single scanning signal line, more specifically, the scanning signal line G13 is active. Accordingly, load on the scanning signal line driving circuit is Ly.

Before start of scanning of the scanning signal line G14, a single scanning signal line, more specifically, the scanning signal line G13 is active. Accordingly, load on the scanning signal line driving circuit is Ly. At the time of the start of the scanning of the scanning signal line G14, a single scanning signal line, more specifically, the scanning signal line G14 is activated, and at the same time, another scanning signal line, more specifically, the scanning signal line G13 is deactivated. Accordingly, load on the scanning signal line driving circuit is Lp. During the scanning of the scanning signal line G14, a single scanning signal line, more specifically, the scanning signal line G14 is active. Accordingly, load on the scanning signal line driving circuit is Ly.

As described above, in the present liquid crystal display device, a status of load applied to a scanning signal line driving circuit before start of scanning, at the start of the scanning, and during the scanning of one scanning signal line can be made identical to a status of load applied to the scanning signal line driving circuit before start of scanning, at the start of the scanning, and during the scanning of another scanning signal line. This makes it possible to reduce a difference in charging rate between (i) pixels respectively connected to the top scanning signal lines in the blocks and (ii) the other blocks, thereby suppressing horizontal-striped unevenness occurring in the vicinity of borders between the blocks.

Further, in the present liquid crystal display device, load on the scanning signal line driving circuit is almost always kept at Ly during a vertical scanning period. That is, there is almost no fluctuation in load on the scanning signal line driving circuit. This makes the suppression of the horizontal-striped unevenness more effective. Further, as shown in FIG. 23, timings at which the load becomes Lp are periodical. This makes the suppression of the horizontal-striped unevenness further more effective. Another arrangement is also possible in which timings at which (periods in which) the load becomes Ly and timings at which the load becomes Lp are not periodical.

Figure 26:
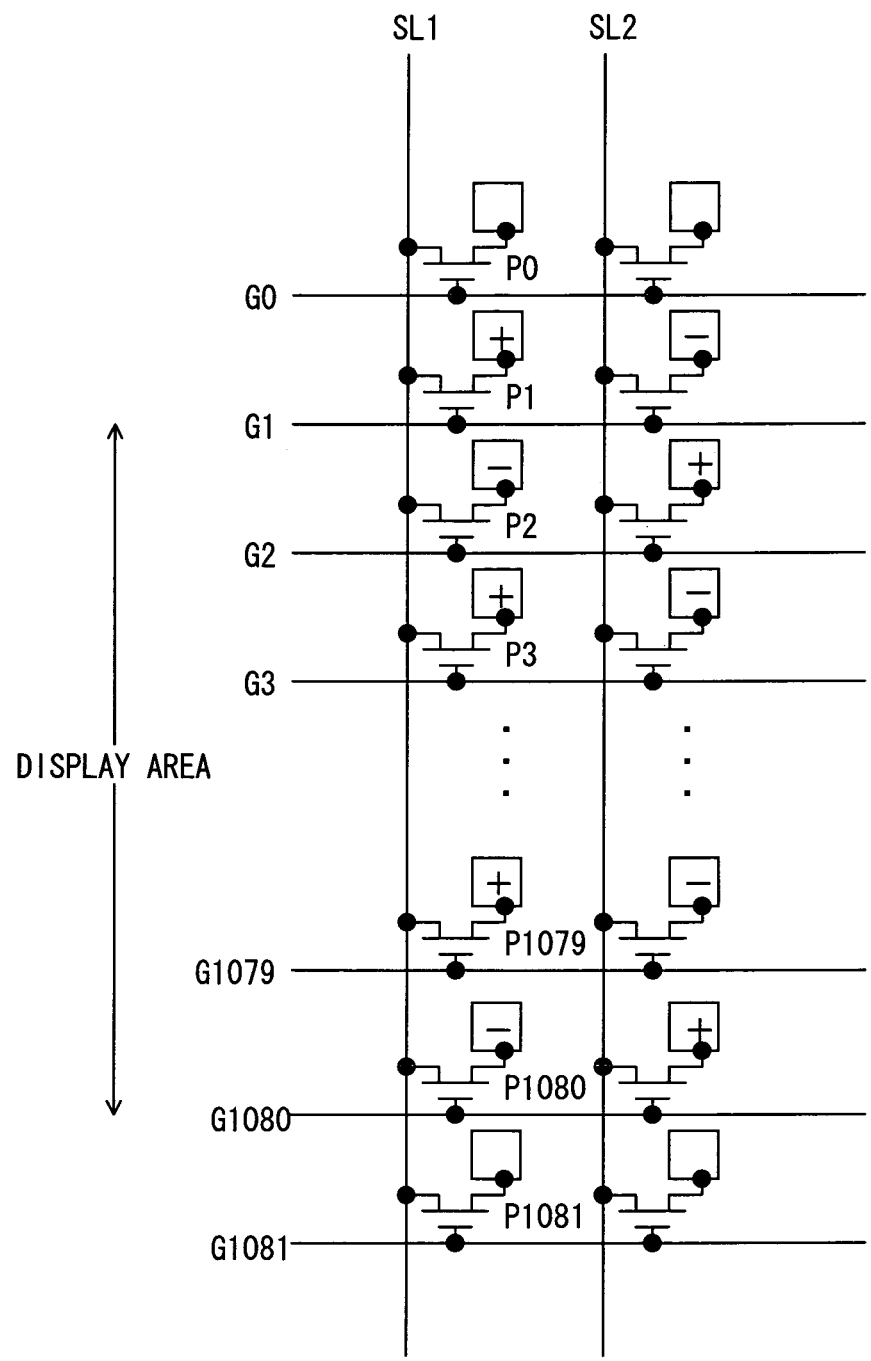
FIG. 26 is a view schematically illustrating a polarity distribution of written electric potentials in the exemplary driving of FIG. 25.

Embodiment 1 has dealt with a case where the scanning signal lines are interlace-scanned while the data signal lines are subjected to block inversion driving in the liquid crystal display device (multi-pixel mode) of FIG. 6, and Embodiment 2 has dealt with a case where the scanning signal lines are sequentially scanned while the data signal lines are subjected to block inversion driving in the liquid crystal display device of FIG. 6. However, the present invention is not limited to these. For example, it is also possible that scanning signal lines are interlace-scanned while data signal lines are subjected to block inversion driving as shown in FIG. 25 in a liquid crystal display device (non-multi-pixel mode) of FIG. 24. In this case, display as shown in FIG. 26 is achieved. Further, it is also possible that the scanning signal lines are sequentially scanned while the data signal lines are subjected to block inversion driving in the liquid crystal display device (non-multi-pixel mode) of FIG. 24.

Embodiment 3

Figure 27:
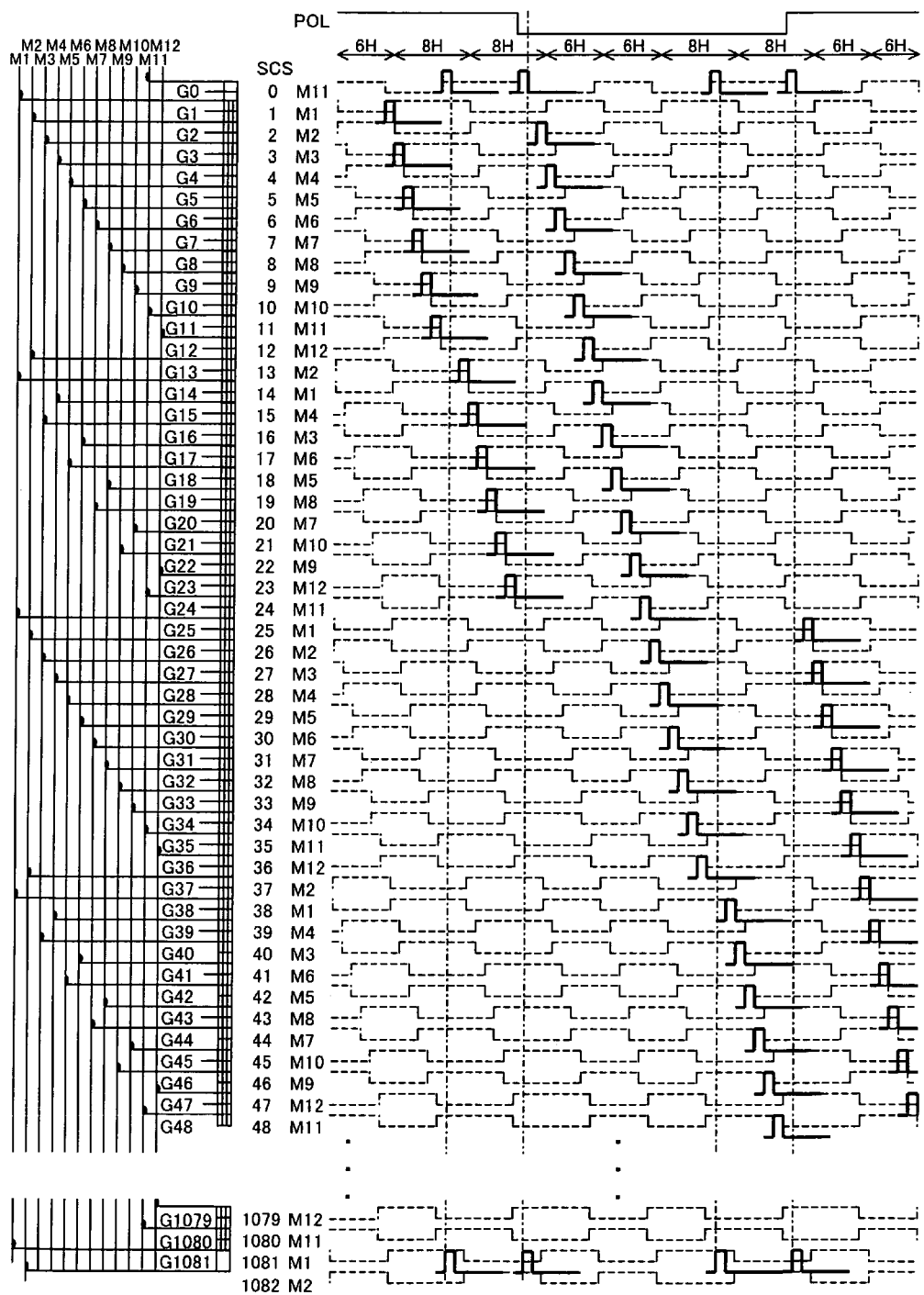
FIG. 27 is a timing chart showing an exemplary driving of a liquid crystal display device of Embodiment 3.

The liquid crystal display device shown in FIG. 6 may be driven as shown in FIG. 27. Specifically, each of storage capacitor wire signals SCS0 through SCS1082 has any one of waveforms of 12 phases (first through twelfth phases represented by the storage capacitor wire signals SCS1 through SCS12, respectively).

An odd-numbered phase has a basic waveform that is repeated and that is constituted by a first section in which a Low level continues for 6H, a second section in which a High level continues for 8H, a third section in which a Low level continues for 8H, and a fourth section in which a High level continues for 6H. An even-numbered phase has a basic waveform that is repeated and that is constituted by a first section in which a High level continues for 6H, a second section in which a Low level continues for 8H, a third section in which a High level continues for 8H, and a fourth section in which a Low level continues for 6H. Note that the second phase represented by the storage capacitor wire signal SCS2 is identical to one obtained by inverting the first phase represented by the storage capacitor wire signal SCS1. Note also that one of any two successive odd-numbered phases is behind the other one which is followed by the one by 1H, and one of any two successive even-numbered phases is behind the other one which is followed by the one by 1H. For example, the third phase represented by the storage capacitor wire signal SCS3 is behind the first phase represented by the storage capacitor wire signal SCS1 by 1H, and the fourth phase represented by the storage capacitor wire signal SCS4 is behind the second phase represented by the storage capacitor wire signal SCS2 by 1H.

A storage capacitor wire signal SCS($24j$+1) (j is an integer in a range from 0 to 45) and a storage capacitor wire signal SCS($24k$+14) (k is an integer in a range from 0 to 44) have the first phase. A storage capacitor wire signal SCS($24j$+2) (j is an integer in a range from 0 to 45), a storage capacitor wire signal SCS($24k$+13) (k is an integer in a range from 0 to 44), and the storage capacitor wire signal SCS1082 have the second phase, a storage capacitor wire signal SCS($24j$+3) and a storage capacitor wire signal SCS($24k$+16) have the third phase, a storage capacitor wire signal SCS($24j$+4) and a storage capacitor wire signal SCS($24k$+15) have the fourth phase, a storage capacitor wire signal SCS($24j$+5) and a storage capacitor wire signal SCS($24k$+18) have the fifth phase, a storage capacitor wire signal SCS($24j$+6) and a storage capacitor wire signal SCS($24k$+17) have the sixth phase, a storage capacitor wire signal SCS($24j$+7) and a storage capacitor wire signal SCS($24k$+20) have the seventh phase, a storage capacitor wire signal SCS($24j$+8) and a storage capacitor wire signal SCS($24k$+19) have the eighth phase, a storage capacitor wire signal SCS($24j$+9) and a storage capacitor wire signal SCS($24k$+22) have the ninth phase, a storage capacitor wire signal SCS($24j$+10) and a storage capacitor wire signal SCS($24k$+21) have the tenth phase, a storage capacitor wire signal SCS($24j$+11), a storage capacitor wire signal SCS($24k$+24), and the storage capacitor wire signal SCS0 have the eleventh phase, and a storage capacitor wire signal SCS($24j$+12) and a storage capacitor wire signal SCS($24k$+23) have the twelfth phase. Note that the storage capacitor wire signals of the first through twelfth phases are supplied to storage capacitor main wires M1 through M12, respectively as shown in FIG. 27.

Further, in the present embodiment, timing adjustment scanning periods are inserted in addition to dummy scanning periods. Specifically, first and second dummy data are inserted between video data corresponding to the last horizontal scanning in a preceding group and video data corresponding to the first horizontal scanning in a succeeding group which is selected immediately after the preceding group, and first and second dummy scanning periods are inserted between a horizontal scanning period corresponding to the last horizontal scanning in the preceding group and a horizontal scanning period corresponding to the first horizontal scanning in the succeeding group. In addition, first and second timing adjustment data are inserted between video data corresponding to horizontal scanning of a scanning signal line G($25m$+11) (m is an integer in a range from 0 to 42) and video data corresponding to horizontal scanning of a scanning signal line G($25m$+13), and two timing adjustment scanning periods (first and second timing adjustment scanning periods) are inserted between a horizontal scanning period corresponding to horizontal scanning of the scanning signal line G($25m$+11) and a horizontal scanning period corresponding to horizontal scanning of the scanning signal line G($25m$+13). Note that the first timing adjustment data is, for example, identical to the video data corresponding to horizontal scanning of the scanning signal line G($25m$+13), and the second timing adjustment data is, for example, identical to video data corresponding to horizontal scanning of a scanning signal line G($25m$+15).

During the first dummy scanning period, the dummy scanning signal line G0 is subjected to dummy scanning so as to be made active for a predetermined period of time. Then, the dummy scanning signal line G0 is deactivated. During the first dummy scanning period, a dummy electric potential which corresponds to the first dummy data and which has the same polarity as signal electric potentials in the succeeding group is supplied to a data signal line. Further, during the second dummy scanning period, the dummy scanning signal line G1081 is subjected to dummy scanning so as to be made active for a predetermined period of time. Then, the dummy scanning signal line G1081 is deactivated. During the second dummy scanning period, a dummy electric potential which corresponds to the second dummy data and which has the same polarity as the signal electric potentials in the succeeding group is supplied to the data signal line. Here, timing of horizontal scanning in each horizontal scanning period is identical to dummy scanning in each dummy scanning period.

Meanwhile, during the first timing adjustment scanning period, the dummy scanning signal line G0 is subjected to timing adjustment scanning so as to be made active for a predetermined period of time. Then, the dummy scanning signal line G0 is deactivated. During the first timing adjustment scanning period, an electric potential corresponding to the first timing adjustment data is supplied to the data signal line. Further, during the second timing adjustment scanning period, the dummy scanning signal line G1081 is subjected to timing adjustment scanning so as to be made active for a predetermined period of time. Then, the dummy scanning signal line G1081 is deactivated. During the second timing adjustment scanning period, an electric potential corresponding to the second timing adjustment data is supplied to the data signal line. Here, timing of horizontal scanning in each horizontal scanning period is identical to timing adjustment scanning in each timing adjustment scanning period.

As shown in FIG. 27, the storage capacitor wire signal SCS1 (first phase) has "L" level (the first section) during the horizontal scanning period H1 corresponding to the scanning signal line G1, and is level-shifted from "L" level to "H" level (start of the second section) in synchronization with end of the horizontal scanning period H1, and the storage capacitor wire signal SCS2 (second phase) has "H" level (the first section) during the horizontal scanning period H1 corresponding to the scanning signal line G1, and is level-shifted from "H" level to "L" level (start of the second section) in synchronization with end of the horizontal scanning period H1.

According to the driving of FIG. 27, similar effects to those of FIGS. 1 and 2 can be obtained although the number of phases of the storage capacitor wire signals (the number of storage capacitor main wires) is smaller (12 phases (12 storage capacitor main wires)) as compared to the driving of FIGS. 1 and 2.

Figure 28:
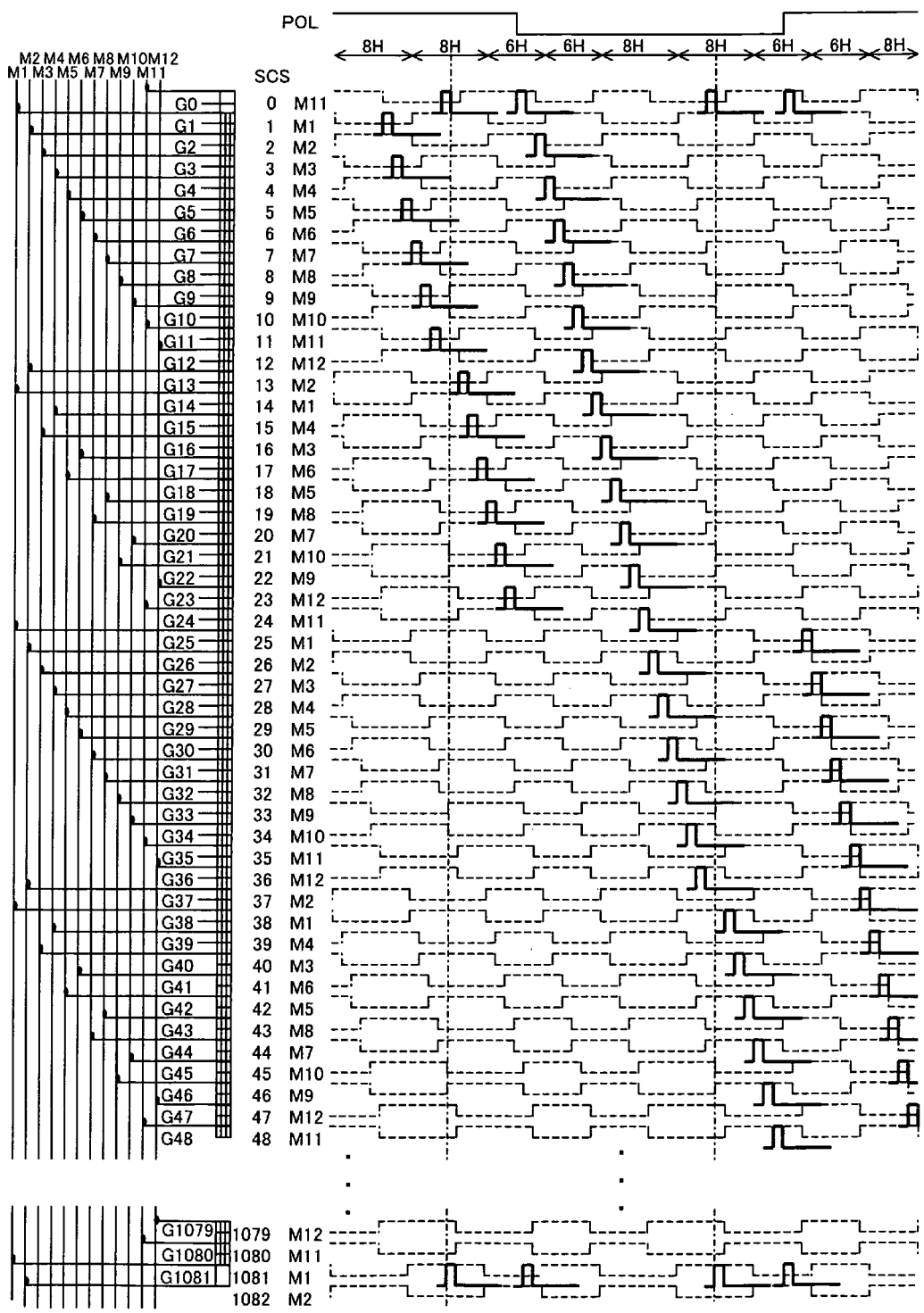
FIG. 28 is a timing chart showing another exemplary driving of the liquid crystal display device of Embodiment 3.

Note that modification of the driving of FIG. 27 is also possible, as shown in FIG. 28. According to the modification of FIG. 28, an odd-numbered phase has a basic waveform that is repeated and that is constituted by a first section in which a Low level continues for 8H, a second section in which a High level continues for 8H, a third section in which a Low level continues for 6H, and a fourth section in which a High level continues for 6H, and an even-numbered phase has a basic waveform that is repeated and that is constituted by a first section in which a High level continues for 8H, a second section in which a Low level continues for 8H, a third section in which a High level continues for 6H, and a fourth section in which a Low level continues for 6H.

In this case, as shown in FIG. 28, the storage capacitor wire signal SCS1 (first phase) has "L" level (the first section) during the horizontal scanning period H1 corresponding to the scanning signal line G1, and is level-shifted from "L" level to "H" level (start of the second section) at a timing when 2H elapses from end of the horizontal scanning period H1, and the storage capacitor wire signal SCS2 (second phase) has "H" level (the first section) during the horizontal scanning period H1 corresponding to the scanning signal line G1, and is level-shifted from "H" level to "L" level (start of the second section) at a timing when 2H elapses from end of the horizontal scanning period H1.

Figure 29:
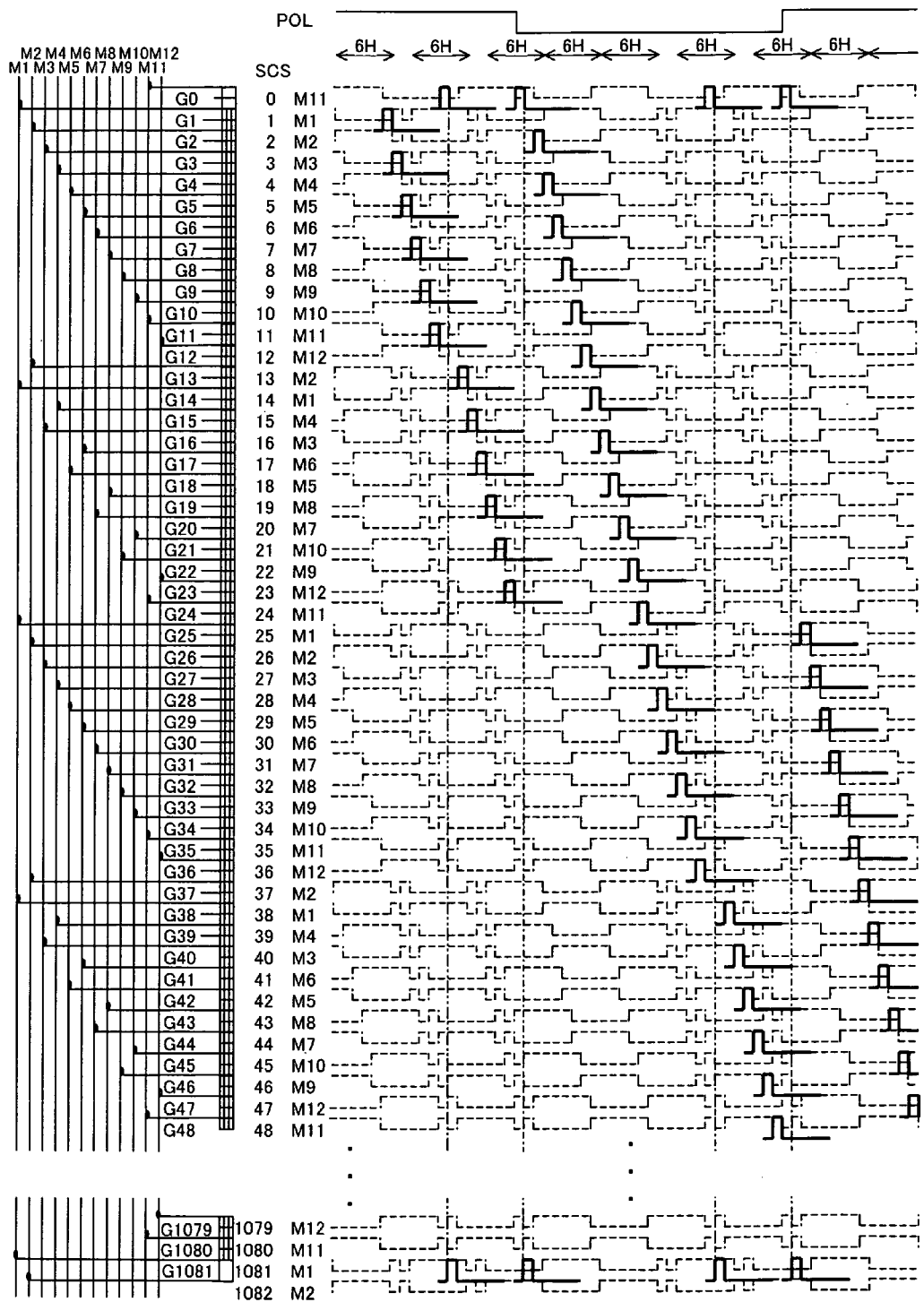
FIG. 29 is a timing chart showing still another exemplary driving of the liquid crystal display device of Embodiment 3.

Note that modification of the driving of FIG. 27 is also possible, as shown in FIG. 29. According to the modification of FIG. 29, an odd-numbered phase has a basic waveform that is repeated and that is constituted by a first section in which a Low level continues for 6H, a second section in which a High level continues for 1H, a third section in which a Low level continues for 1H, a fourth section in which a High level continues for 6H, a fifth section in which a Low level continues for 1H, a sixth section in which a High level continues for 1H, a seventh section in which a Low level continues for 6H, and a eighth section in which a High level continues for 6H, and an even-numbered phase has a basic waveform that is repeated and that is constituted by a first section in which a High level continues for 6H, a second section in which a Low level continues for 1H, a third section in which a High level continues for 1H, a fourth section in which a Low level continues for 6H, a fifth section in which a High level continues for 1H, a sixth section in which a Low level continues for 1H, a seventh section in which a High level continues for 6H, and a eighth section in which a Low level continues for 6H.

In this case, as shown in FIG. 29, the storage capacitor wire signal SCS1 (first phase) has "L" level (the first section) during the horizontal scanning period H1 corresponding to the scanning signal line G1, and is level-shifted from "L" level to "H" level (start of the second section) in synchronization with end of the horizontal scanning period H1, and the storage capacitor wire signal SCS2 (second phase) has "H" level (the first section) during the horizontal scanning period H1 corresponding to the scanning signal line G1, and is level-shifted from "H" level to "L" level (start of the second section) in synchronization with end of the horizontal scanning period H1.

Figure 30:
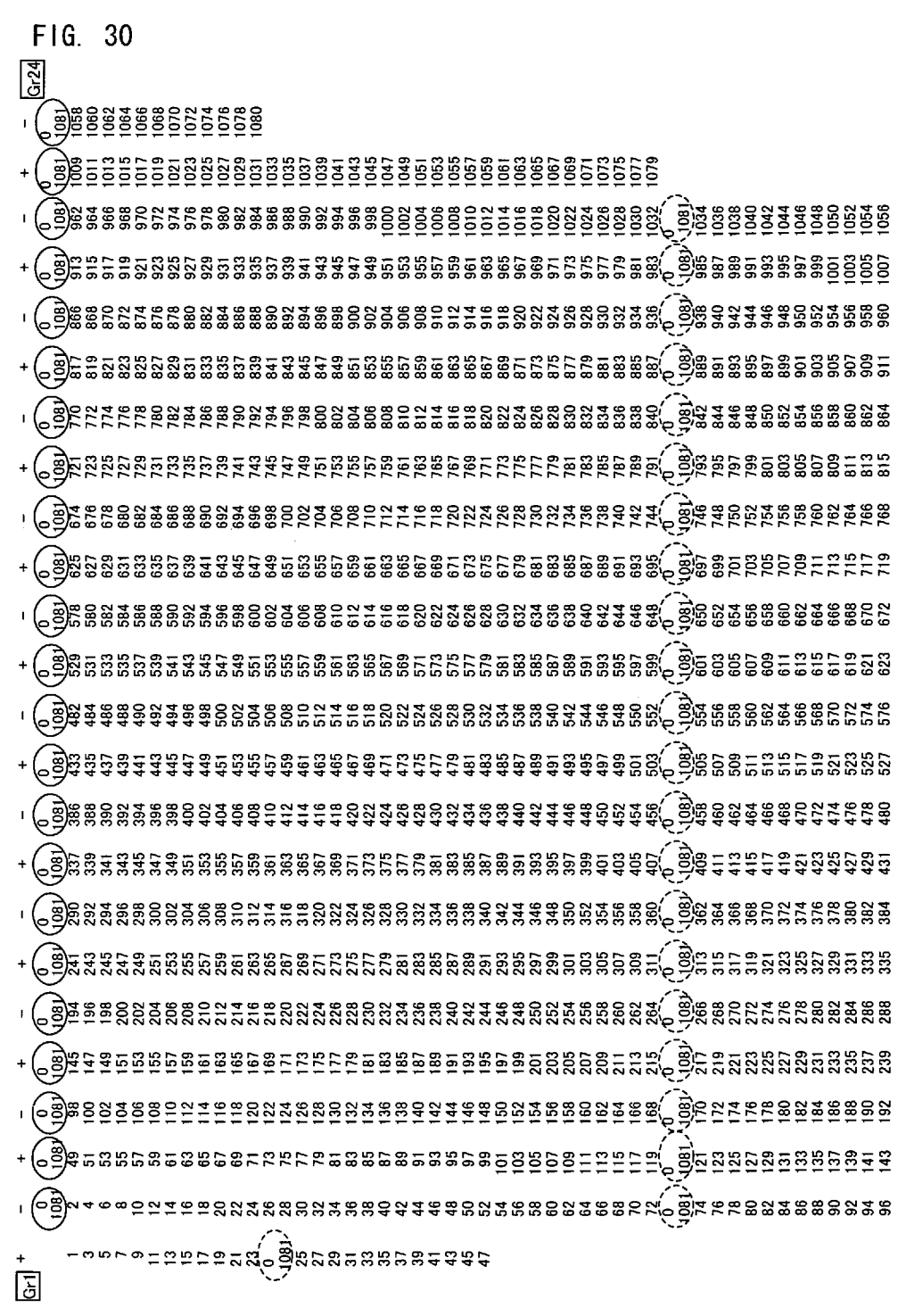

In the present liquid crystal display device, the scanning signal lines may be divided into groups in a manner such that a group G1 (first group) is formed which includes 24 successive odd-numbered scanning signal lines starting from the scanning signal line G1, a group G2 (second group) is formed which includes 48 successive even-numbered scanning signal lines starting from the scanning signal line G2, a group G3 (third group) is formed which includes 48 successive odd-numbered scanning signal lines starting from the scanning signal line G49, groups G4 through G22 are formed in the same way as the groups G2 and G3, a group G23 (last group but one) is formed which includes successive odd-numbered scanning signal lines starting from the scanning signal line G1009, and a group G24 (last group) is formed which includes 12 successive even-numbered scanning signal lines starting from the scanning signal line G1058, as shown in FIG. 30.

In FIG. 30, first and second dummy scanning periods are inserted between a horizontal scanning period corresponding to the last horizontal scanning in a preceding group and a horizontal scanning period corresponding to the first horizontal scanning in a succeeding group that is selected immediately after the preceding group. During the first dummy scanning period, the dummy scanning signal line G0 is subjected to dummy scanning so as to be made active for a predetermined period of time. Then, the dummy scanning signal line G0 is deactivated. During the second dummy scanning period, the dummy scanning signal line G1081 is subjected to dummy scanning so as to be made active for a predetermined period of time. Then, the dummy scanning signal line G1081 is deactivated.

Further, two timing adjustment scanning periods (first and second timing adjustment scanning periods) are inserted between a horizontal scanning period corresponding to a scanning signal line G($96j+23$) (j is an integer in a range from 0 to 10) and a horizontal scanning period corresponding to a scanning signal line G($96j+25$). During the first timing adjustment scanning period, the dummy scanning signal line G0 is subjected to timing adjustment scanning so as to be made active for a predetermined period of time. Then, the dummy scanning signal line G0 is deactivated. During the second timing adjustment scanning period, the dummy scanning signal line G1081 is subjected to timing adjustment scanning so as to be made active for a predetermined period of time. Then, the dummy scanning signal line G1081 is deactivated. Further, two timing adjustment scanning periods (first and second timing adjustment scanning periods) are inserted between a horizontal scanning period corresponding to a scanning signal line G($96k+72$) (k is an integer in a range from 0 to 10) and a horizontal scanning period corresponding to a scanning signal line G($96k+74$). During the first timing adjustment scanning period, the dummy scanning signal line G0 is subjected to timing adjustment scanning so as to be made active for a predetermined period of time. Then, the dummy scanning signal line G0 is deactivated. During the second timing adjustment scanning period, the dummy scanning signal line G1081 is subjected to timing adjustment scanning so as to be made active for a predetermined period of time. Then, the dummy scanning signal line G1081 is deactivated.

Figure 31:
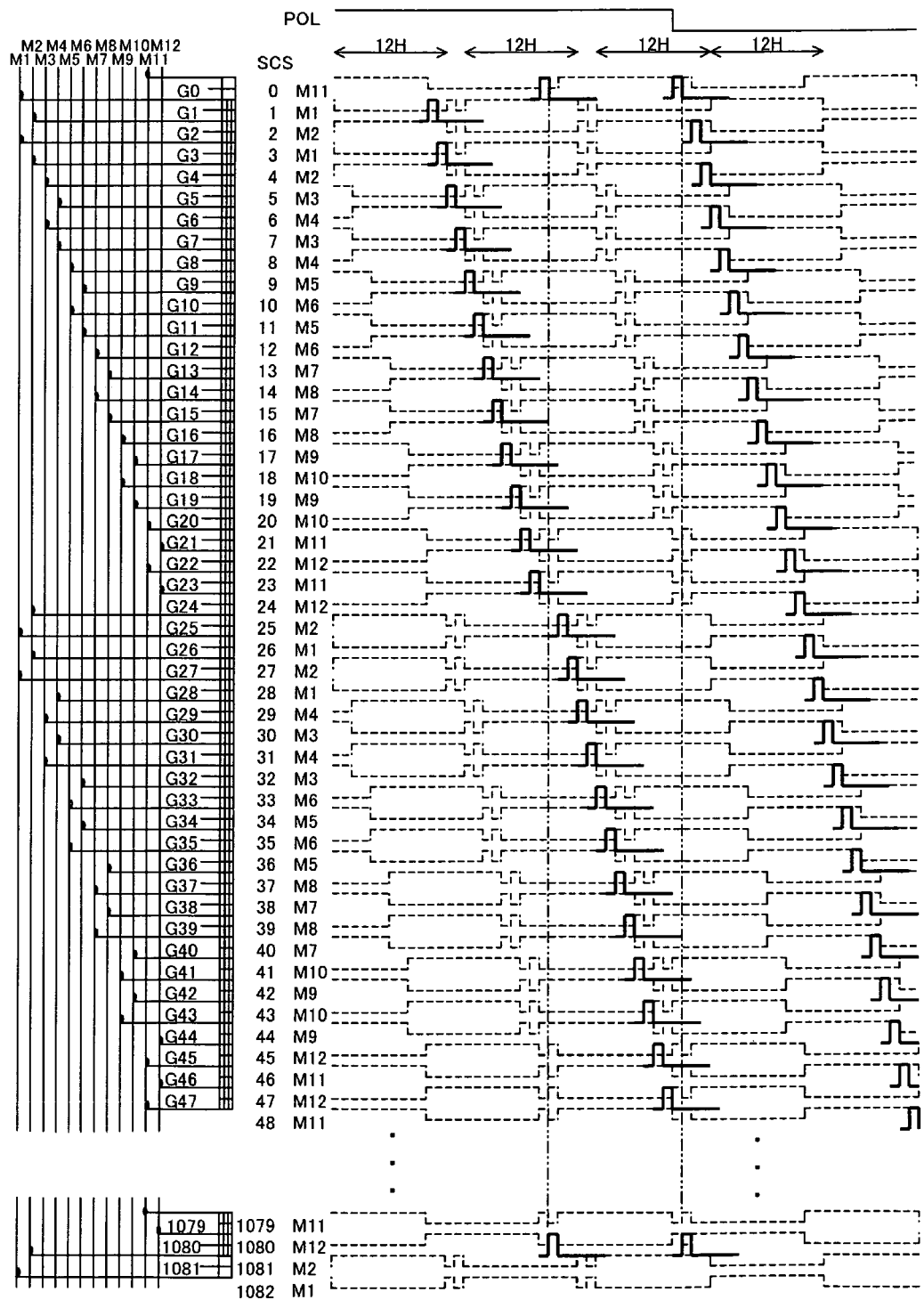
FIG. 31 is a timing chart showing exemplary driving (upstream side) carried out in the case of FIG. 30.

In this case, each of the storage capacitor wire signals SCS0 through SCS1082 has any one of waveforms of 12 phases (first through twelfth phases represented by the storage capacitor wire signals SCS1 through SCS12, respectively), as shown in FIG. 31. An odd-numbered phase has a basic waveform that is repeated and that is constituted by a first section in which a Low level continues for 12H, a second section in which a High level continues for 1H, a third section in which a Low level continues for 1H, a fourth section in which a High level continues for 12H, a fifth section in which a Low level continues for 1H, a sixth section in which a High level continues for 1H, a seventh section in which a Low level continues for 12H, and a eighth section in which a High level continues for 12H, and an even-numbered phase has a basic waveform that is repeated and that is constituted by a first section in which a High level continues for 12H, a second section in which a Low level continues for 1H, a third section in which a High level continues for 1H, a fourth section in which a Low level continues for 12H, a fifth section in which a High level continues for 1H, a sixth section in which a Low level continues for 1H, a seventh section in which a High level continues for 12H, and a eighth section in which a Low level continues for 12H. Note that the second phase represented by the storage capacitor wire signal SCS2 is identical to one obtained by inverting the first phase represented by the storage capacitor wire signal SCS1. Note also that one of any two successive odd-numbered phases is behind the other one which is followed by the one by 1H, and one of any two successive even-numbered phases is behind the other one which is followed by the one by 1H. For example, the third phase represented by the storage capacitor wire signal SCS3 is behind the first phase represented by the storage capacitor wire signal SCS1 by 1H, and the fourth phase represented by the storage capacitor wire signal SCS4 is behind the second phase represented by the storage capacitor wire signal SCS2 by 1H.

A storage capacitor wire signal SCS($48j+1$) (j is an integer in a range from 0 to 22), a storage capacitor wire signal SCS($48j+3$), a storage capacitor wire signal SCS($48k+26$) (k is an integer in a range from 0 to 21), a storage capacitor wire signal SCS($48k+28$), and the storage capacitor wire signal SCS1082 have the first phase, a storage capacitor wire signal SCS($48j+2$), a storage capacitor wire signal SCS($48j+4$), a storage capacitor wire signal SCS($48j+25$), and a storage capacitor wire signal SCS($48k+27$) have the second phase, a storage capacitor wire signal SCS($48j+5$), a storage capacitor wire signal SCS($48j+7$), a storage capacitor wire signal SCS($48k+30$), and a storage capacitor wire signal SCS($48k+32$) have the third phase, a storage capacitor wire signal SCS($48j+6$), a storage capacitor wire signal SCS($48j+8$), a storage capacitor wire signal SCS($48k+29$), and a storage capacitor wire signal SCS($48k+31$) have the fourth phase, a storage capacitor wire signal SCS($48j+9$), a storage capacitor wire signal SCS($48j+11$), a storage capacitor wire signal SCS($48k+34$), and a storage capacitor wire signal SCS($48k+36$) have the fifth phase, a storage capacitor wire signal SCS($48j+10$), a storage capacitor wire signal SCS($48j+12$), a storage capacitor wire signal SCS($48k+33$), and a storage capacitor wire signal SCS($48k+35$) have the sixth phase, a storage capacitor wire signal SCS($48j+13$), a storage capacitor wire signal SCS($48j+15$), a storage capacitor wire signal SCS($48k+38$), and a storage capacitor wire signal SCS($48k+40$) have the seventh phase, a storage capacitor wire signal SCS($48j+14$), a storage capacitor wire signal SCS($48j+16$), a storage capacitor wire signal SCS($48k+37$), and a storage capacitor wire signal SCS($48k+39$) have the eighth phase, a storage capacitor wire signal SCS($48j+17$), a storage capacitor wire signal SCS($48j+19$), a storage capacitor wire signal SCS($48k+42$), and a storage capacitor wire signal SCS($48k+44$) have the ninth phase, a storage capacitor wire signal SCS($48j+18$), a storage capacitor wire signal SCS($48j+20$), a storage capacitor wire signal SCS($48k+41$), and a storage capacitor wire signal SCS($48k+43$) have the tenth phase, a storage capacitor wire signal SCS($48j+21$), a storage capacitor wire signal SCS($48j+23$), a storage capacitor wire signal SCS($48k+46$), a storage capacitor wire signal SCS($48k+48$), and the storage capacitor wire signal SCS0 have the eleventh phase, and a storage capacitor wire signal SCS($48j+22$), a storage capacitor wire signal SCS($48j+24$), a storage capacitor wire signal SCS($48k+45$), and a storage capacitor wire signal SCS($48k+47$) have the twelfth phase. As shown in FIG. 31, storage capacitor wire signals of the first through twelfth phases are supplied to the storage capacitor main wires M1 through M12, respectively.

As shown in FIG. 31, the storage capacitor wire signal SCS1 (first phase) has "L" level (the first section) during the horizontal scanning period H1 corresponding to the scanning signal line G1, and is level-shifted from "L" level to "H" level (start of the second section) at a timing when 1H elapses from end of the horizontal scanning period H1, and the storage capacitor wire signal SCS2 (second phase) has "H" level (the first section) during the horizontal scanning period H1 corresponding to the scanning signal line G1, and is level-shifted from "H" level to "L" level (start of the second section) at a timing when 1H elapses from end of the horizontal scanning period H1.

Figure 32:
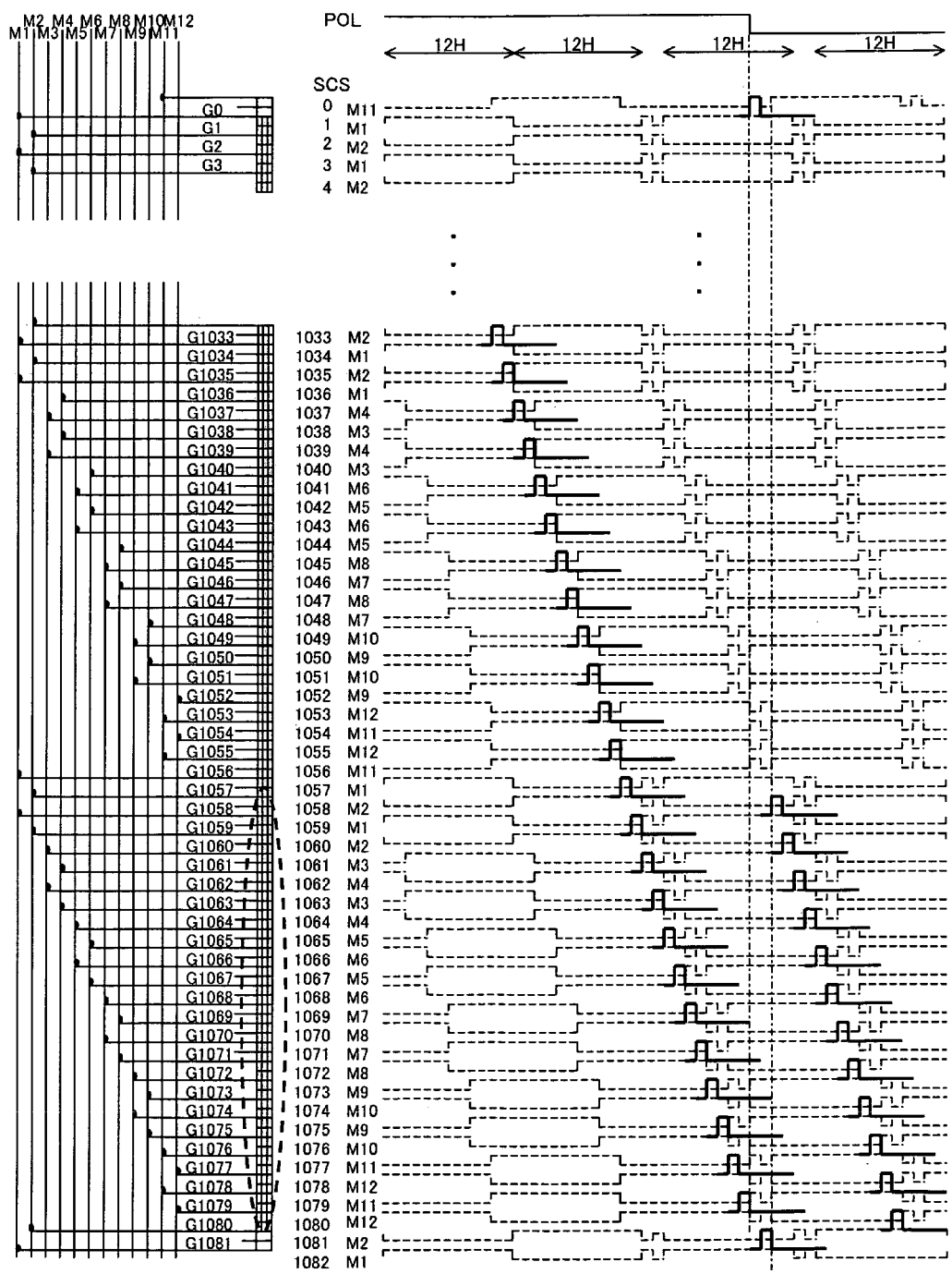
FIG. 32 is a timing chart showing exemplary driving (downstream side) carried out in the case of FIG. 30.
Figure 33:
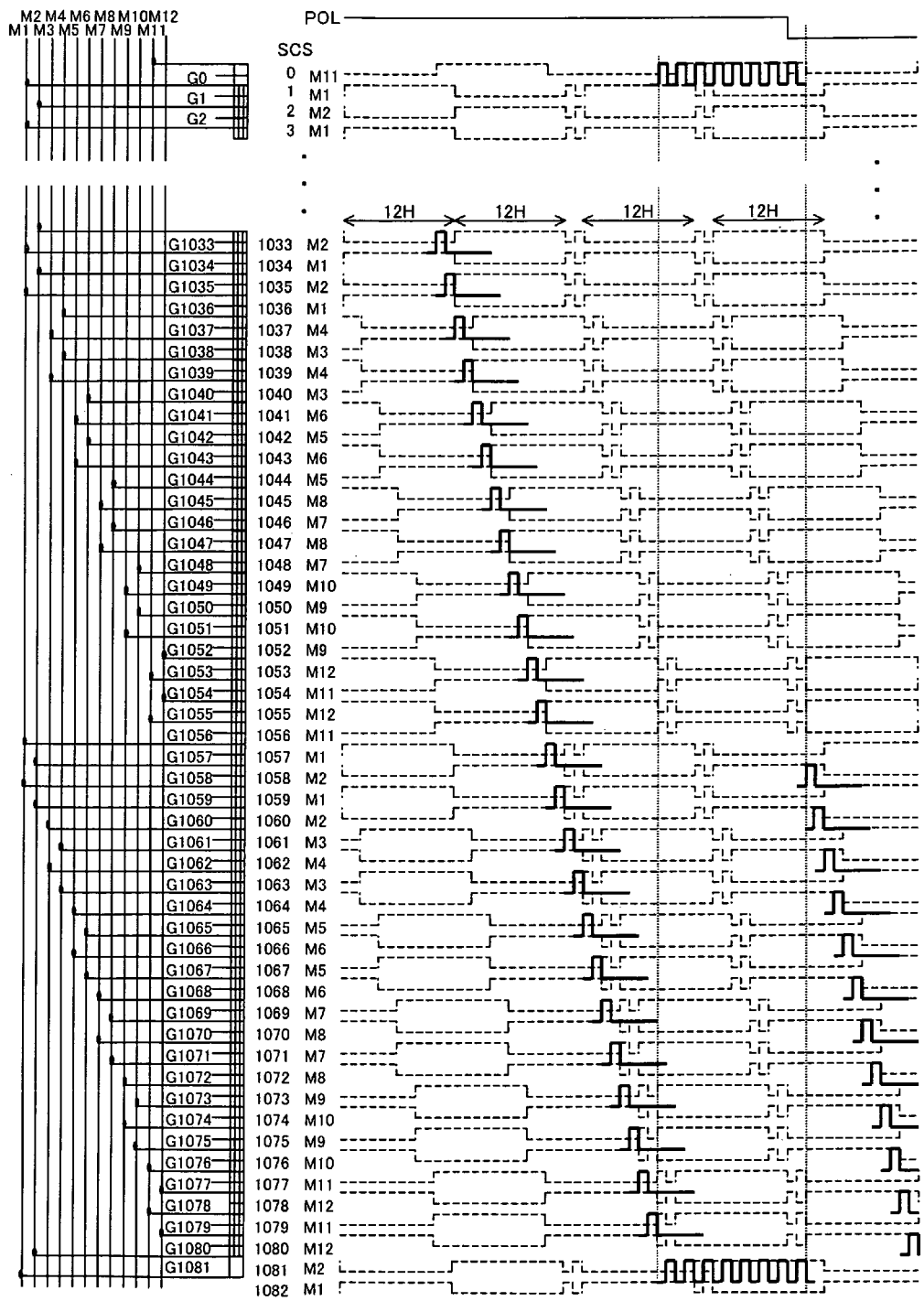
FIG. 33 is a timing chart showing an improvement example of FIG. 32.

In a case where the storage capacitor wire signals SCS0 through SCS1082 are set as above and where the timing adjustment scanning periods are set as shown in FIG. 30, bright sub-pixels are dark sub-pixels are alternately disposed in a range from the scanning signal line G0 to the scanning signal line G1058, whereas a set of dark sub-pixel, bright sub-pixel, bright sub-pixel, and dark sub-pixel is repeatedly disposed in a range from the scanning signal line G1058 to the scanning signal line G1081, as shown in FIG. 32. That is, checkered pattern display cannot be achieved in a pixel connected to the scanning signal line G1058 and the subsequent pixels.

In view of this, it is desirable that 14 timing adjustment scanning periods (first through fourteenth TA periods) be inserted between a horizontal scanning period corresponding to horizontal scanning of the scanning signal line G1079 and a dummy scanning period corresponding to dummy scanning of the scanning signal line G1058. The dummy scanning signal lines G0 and G1081 may be alternately subjected to timing adjustment scanning as follows for example. Specifically, the dummy scanning signal line G0 is subjected to timing adjustment scanning during the first TA, the dummy scanning signal line G1081 is subjected to timing adjustment scanning during the second TA, the dummy scanning signal line G0 is subjected to timing adjustment scanning again during the third TA, the dummy scanning signal line G1081 is subjected to timing adjustment scanning again during the fourth TA. It is thus possible to preserve checkered pattern display in the pixel connected to the scanning signal line G1058 and the subsequent pixels.

Figure 34:
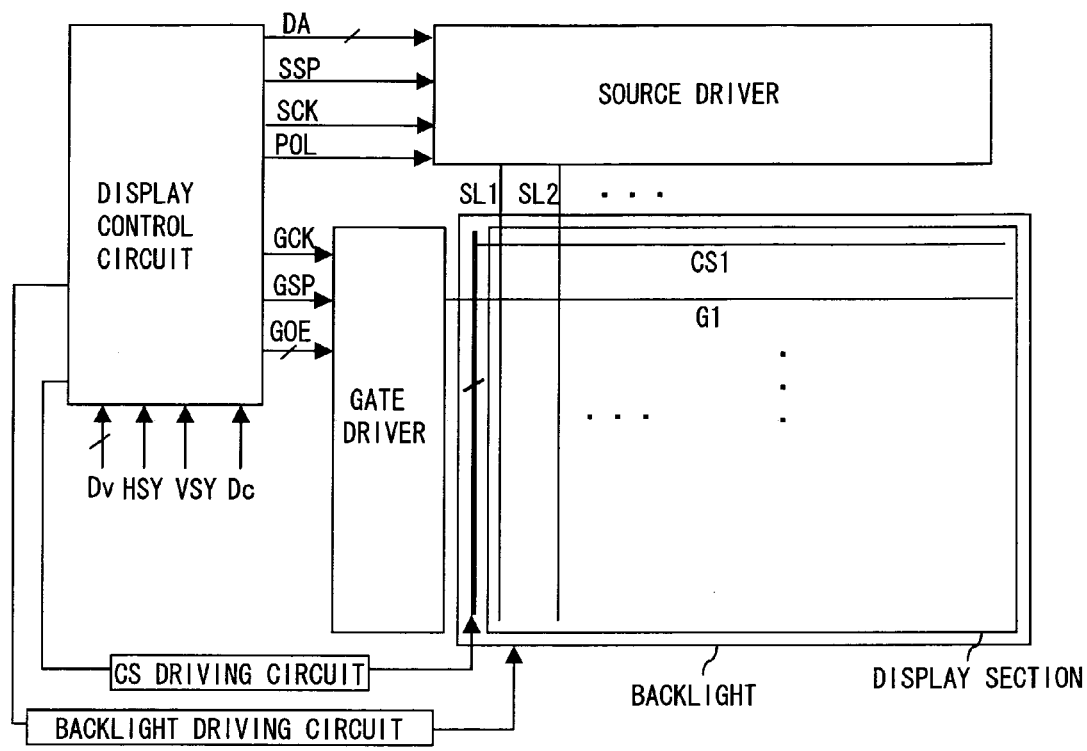
FIG. 34 is a block diagram explaining an overall configuration of the present liquid crystal display device.

FIG. 34 is a block diagram illustrating a configuration of the present liquid crystal display device. As illustrated in FIG. 34, the present liquid crystal display device includes a display area (liquid crystal panel), a source driver, a gate driver, a backlight, a backlight driving circuit, and a display control circuit. The source driver drives the data signal lines. The gate driver drives the scanning signal lines. The display control circuit controls the source driver, the gate driver, and the backlight driving circuit.

The display control circuit receives, from an external signal source (e.g., tuner), a digital video signal Dv indicative of an image to be displayed, a horizontal sync signal HSY and a vertical sync signal VSY that correspond to the digital video signal Dv, and a control signal Dc for controlling display operation. Based on the signals Dv, HSY, VSY, and Dc thus received, the display control circuit generates and outputs, as signals for causing the display area to display the image indicated by the digital video signal Dv, a data start pulse signal SSP, a data clock signal SCK, a digital image signal DA (corresponding to the video signal Dv) indicative of the image to be displayed, a gate start pulse signal GSP, a gate clock signal GCK, a gate driver output control signal (scanning signal output control signal) GOE, and a polarity inverting signal POL for controlling a polarity of a signal electric potential supplied to a data signal line.

More specifically, the video signal Dv is subjected to timing adjustment etc. in an internal memory as necessary, and is then outputted, as the digital image signal DA, from the display control circuit. The data clock signal SCK is generated as a signal constituted by pulses corresponding to respective pixels of the image indicated by the digital image signal DA. The data start pulse signal SSP that becomes high level (H level) every 1 horizontal scanning period only for a predetermined period of time is generated based on the horizontal sync signal HSY. The gate start pulse signal GSP that becomes H level every 1 frame period (1 vertical scanning period) only for a predetermined period of time is generated based on the vertical sync signal VSY. The gate clock signal GCK is generated based on the horizontal sync signal HSY. The gate driver output control signal GOE is generated based on the horizontal sync signal HSY and the control signal Dc.

Among the signals thus generated in the display control circuit, the digital image signal DA, the polarity inverting signal POL, the data start pulse signal SSP, and the data clock signal SCK are supplied to the source driver, whereas the gate start pulse signal GSP, the gate clock signal GCK, and the gate driver output control signal GOE are supplied to the gate driver.

Based on the digital image signal DA, the data clock signal SCK, the data start pulse signal SSP, and the polarity inverting signal POL, the source driver sequentially generates data signals for each horizontal scanning period as analog electric potentials corresponding to pixels values on scanning signal lines of the image indicated by the digital image signal DA. The data signals are supplied to the data signal lines (SL1 and SL2).

The gate driver generates scanning signals based on the gate start pulse signal GSP, the gate clock signal GCK, and the gate driver output control signal GOE. The scanning signals are respectively supplied to the scanning signal lines so that the scanning signal lines are selectively driven.

The data signal lines and the scanning signal lines of the display area (liquid crystal panel) are thus driven by the source driver and the gate driver so that a signal electric potential is written from a data signal line to a pixel electrode via a TFT connected to a selected scanning signal line. Thus, a voltage whose intensity depends on the digital image signal DA is applied to the liquid crystal layer. The voltage application controls how much light emitted from the backlight is transmitted. Thus, the image indicated by the digital video signal Dv is displayed on the pixels.

Figure 35:
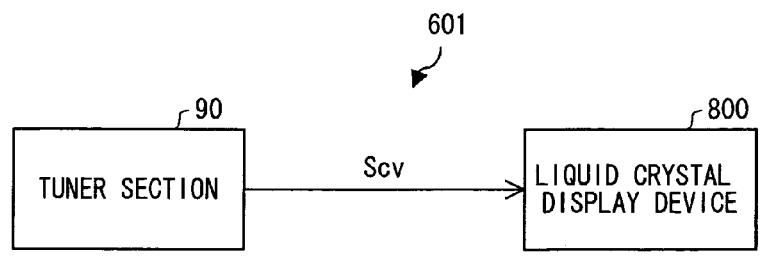
FIG. 35 is a block diagram explaining functions of the present television receiver.

In a case where an image based on television broadcast is displayed by a liquid crystal display device 800, a tuner section 90 is connected to the liquid crystal display device 800, as shown in FIG. 35. Thus, a present television receiver 601 is configured. The tuner section 90 extracts a channel signal to be received from waves (high-frequency signals) received by an antenna (not illustrated), and converts the channel signal into an intermediate frequency signal. The tuner section 90 detects the intermediate frequency signal so as to extract a complex color video signal Scv as a television signal. The complex color video signal Scv is supplied to the liquid crystal display device 800 as described above, and the liquid crystal display device 800 displays an image based on the complex color video signal Scv.

The term "polarity of electric potential" used herein indicates whether the electric potential is not less than a reference electric potential or not more than the reference electric potential. The term "electric potential of positive polarity" refers to an electric potential that is not less than the reference electric potential, and the term "electric potential of negative polarity" refers to an electric potential that is not more than the reference electric potential. The reference electric potential may be Vcom (common electric potential) which is an electric potential of a common electrode (counter electrode) or may be any other electric potential.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

A liquid crystal display device of the present invention is suitably applicable to a liquid crystal television for example.

REFERENCE SIGNS LIST

G0, G1081: Dummy scanning signal line
G1 through G1080: Scanning signal line
CS0, G1082: Dummy storage capacitor wire
CS1 through CS1081: Dummy storage capacitor wire
Gr1 through Gr46: Group
B1 through G45: Block
P1 through P1080: Pixel
P0, P1081: Dummy pixel
D1 through D1080: Video data
Da, Db, Dc, Dd: Dummy data
H1 through H1080: Horizontal scanning period
DS1: First dummy scanning period
DS2: Second dummy scanning period
SL1, SL2: Data signal line

The invention claimed is:
1. A liquid crystal display device comprising:
scanning signal lines provided in a display area;
a scanning signal line driving circuit; and
a dummy scanning signal line or a plurality of dummy scanning signal lines provided in a non-display area,
the scanning signal lines being divided into groups each of which includes a plurality of scanning signal lines, the groups being sequentially selected, signal electric potentials of an identical polarity being sequentially supplied to a data signal line while scanning signal lines belonging to a selected one of the groups are sequentially scanned horizontally,
the polarity of the signal electric potentials being inverted when the selected one of the group is changed from a preceding group to a succeeding group which is selected subsequent to the preceding group,
a dummy scanning period or a plurality of dummy scanning periods being inserted between a horizontal scanning period corresponding to the last horizontal scanning in the preceding group and a horizontal scanning period corresponding to the first horizontal scanning in the succeeding group,
the dummy scanning signal line or the plurality of dummy scanning signal lines being subjected to dummy scanning during the dummy scanning period or the plurality of dummy scanning periods, wherein
a number of gate pulse(s), for dummy scanning, output from the scanning signal line driving circuit in the dummy scanning period or each of the plurality of dummy scanning periods is same as a number of gate pulse(s), for horizontal scanning, output from the scanning signal line driving circuit in the horizontal scanning period corresponding to the first horizontal scanning in the succeeding group,

(i) a termination of a first gate pulse in the dummy scanning period or one of the plurality of dummy scanning periods and (ii) an initiation of a second gate pulse in the horizontal scanning period corresponding to the first horizontal scanning in the succeeding group have time overlap, and (A) each of the scanning signal lines is activated in synchronization with a start of corresponding horizontal scanning, and is deactivated in synchronization with an end of the corresponding horizontal scanning, a width of the first gate pulse and second gate pulse being equal to a single horizontal scanning period, or (B) each of the scanning signal lines is activated in synchronization with a start of another horizontal scanning carried out immediately before the corresponding horizontal scanning, and is deactivated in synchronization with the end of the corresponding horizontal scanning, a width of the first gate pulse and second gate pulse being two times as wide as a single horizontal scanning period.

2. The liquid crystal display device according to claim 1, wherein a dummy electric potential is supplied to the data signal line during the dummy scanning period or each of the plurality of dummy scanning periods.

3. The liquid crystal display device according to claim 2, wherein a polarity of the dummy electric potential is identical to that of the signal electric potentials in the succeeding group.

4. The liquid crystal display device according to claim 2, wherein:
video data that correspond to respective horizontal scanning of the scanning signal lines are arranged in an order identical to that of the horizontal scanning,
dummy data is inserted between video data corresponding to the last horizontal scanning in the preceding group and video data corresponding to the first horizontal scanning in the succeeding group, the signal electric potentials correspond to the video data, respectively, and the dummy electric potential corresponds to the dummy data.

5. The liquid crystal display device according to claim 4, wherein the dummy data is identical to the video data corresponding to the first horizontal scanning in the succeeding group.

6. The liquid crystal display device according to claim 1, wherein:
a time interval between start of a horizontal scanning period and start of horizontal scanning is equal to a time interval between start of a dummy scanning period and start of dummy scanning, and
a time interval between end of horizontal scanning and end of a horizontal scanning period is equal to a time interval between end of dummy scanning and end of a dummy scanning period.

7. The liquid crystal display device according to claim 1, wherein:
in a case where the plurality of dummy scanning signal lines are provided in the non-display area and where the plurality of dummy scanning periods are inserted between the horizontal scanning period corresponding to the last horizontal scanning in the preceding group and the horizontal scanning period corresponding to the first horizontal scanning in the succeeding group, different dummy scanning signal lines are subjected to dummy scanning during the plurality of dummy scanning periods.

8. The liquid crystal display device according to claim 1, wherein:
in a case where two dummy scanning signal lines are provided in the non-display area and where the plurality of dummy scanning periods are inserted between the horizontal scanning period corresponding to the last horizontal scanning in the preceding group and the horizontal scanning period corresponding to the first horizontal scanning in the succeeding group, one of the two dummy scanning signal lines is subjected to dummy scanning during one of the plurality of dummy scanning periods and the other one of the two dummy scanning signal lines is subjected to dummy scanning during another one of the plurality of dummy scanning periods.

9. The liquid crystal display device according to claim 1, wherein:
in a case where the plurality of dummy scanning periods are inserted between the horizontal scanning period corresponding to the last horizontal scanning in the preceding group and the horizontal scanning period corresponding to the first horizontal scanning in the succeeding group, an identical dummy scanning signal line is subjected to dummy scanning during the plurality of dummy scanning periods.

10. The liquid crystal display device according to claim 1, wherein when each of the scanning signal lines is activated in synchronization with the start of the corresponding horizontal scanning, and is deactivated in synchronization with the end of the corresponding horizontal scanning, the dummy scanning signal line or each of the plurality of dummy scanning signal lines is activated in synchronization with a start of corresponding dummy scanning, and is deactivated in synchronization with an end of the corresponding dummy scanning.

11. The liquid crystal display device according to claim 1, wherein when each of the scanning signal lines is activated in synchronization with the start of the other horizontal scanning carried out immediately before the corresponding horizontal scanning, and is deactivated in synchronization with the end of the corresponding horizontal scanning, the dummy scanning signal line or each of the plurality of dummy scanning signal lines is activated in synchronization with a start of horizontal scanning carried out immediately before corresponding dummy scanning or a start of dummy scanning carried out immediately before the corresponding dummy scanning, and is deactivated in synchronization with an end of the corresponding dummy scanning.

12. The liquid crystal display device according to claim 1, wherein the horizontal scanning period is equal in length to the dummy scanning period or each of the plurality of dummy scanning periods.

13. The liquid crystal display device according to claim 1, wherein each pixel in the display area includes a plurality of sub-pixels.

14. The liquid crystal display device according to claim 13, further comprising:
pixel electrodes; and
storage capacitor wires provided corresponding to the pixel electrodes,
a single pixel electrode being provided for each of the plurality of sub-pixels, and
storage capacitor wire signals respectively supplied to the storage capacitor wires controlling brightness of the plurality of sub-pixels, respectively.

15. The liquid crystal display device according to claim 14, wherein a storage capacitor wire signal supplied to a storage capacitor wire is not level-shifted during writing of a signal electric potential into a pixel electrode that forms capacitance with the storage capacitor wire, and is level-shifted to a positive side or a negative side relative to a reference electric potential in synchronization with or after end of the writing.

16. The liquid crystal display device according to claim 15, wherein a storage capacitor wire signal supplied to a storage capacitor wire that forms capacitance with one of two pixel electrodes included in a pixel is level-shifted in a direction opposite to a direction in which a storage capacitor wire signal supplied to a storage capacitor wire that forms capacitance with the other one of the two pixel electrodes is level-shifted.

17. The liquid crystal display device according to claim 15, wherein the storage capacitor wire signal is level-shifted every predetermined period of time until one vertical scanning period elapses from the level-shift.

18. The liquid crystal display device according to claim 15, wherein the storage capacitor wire signal maintains a same level until one vertical scanning period elapses from the level-shift.

19. The liquid crystal display device according to claim 14, further comprising:
a plurality of storage capacitor main wires to which different storage capacitor wire signals are supplied, each of the storage capacitor wires being connected to any one of the plurality of storage capacitor main wires.

20. The liquid crystal display device according to claim 14, wherein:
a single storage capacitor wire is provided per gap between two pixels that are adjacent in a direction in which the data signal line extends, and
the single storage capacitor wire forms capacitance with a pixel electrode disposed in one of the two pixels and forms capacitance with a pixel electrode disposed in the other one of the two pixels.

21. The liquid crystal display device according to claim 14, wherein:
a timing adjustment scanning period is inserted between a predetermined horizontal scanning period and a horizontal scanning period or a dummy scanning period which comes next after the predetermined horizontal scanning period, and
the dummy scanning signal line is subjected to timing adjustment scanning during the timing adjustment scanning period.

22. The liquid crystal display device according to claim 21, wherein the dummy scanning period or the plurality of dummy scanning periods and the timing adjustment scanning period are inserted between a horizontal scanning period corresponding to last horizontal scanning in a next-to-last group and a horizontal scanning period corresponding to first horizontal scanning in a last group.

23. The liquid crystal display device according to claim 1, wherein one of the preceding group and the succeeding group includes only odd-numbered scanning signal lines, and the other one of the preceding group and the succeeding group includes only even-numbered scanning signal lines in a case where a predetermined scanning signal line in the display area is a first scanning signal line in counting.

24. The liquid crystal display device according to claim 23, wherein:
the predetermined scanning signal line and subsequent scanning signal lines in the display area are divided into blocks by borders parallel to the scanning signal lines,
a group that is selected first is constituted by odd-numbered scanning signal lines included in a most upstream side block or constituted by even-numbered scanning signal lines included in the most upstream side block, the most upstream side block including the predetermined scanning signal line and being disposed at one end,
a group that is selected last is constituted by odd-numbered scanning signal lines included in a most downstream side block or constituted by even-numbered scanning signal lines included in the most downstream side block, the most downstream side block being disposed at the other end,
each of groups other than the group that is selected first and the group that is selected last is constituted by even-numbered scanning signal lines included in adjacent two blocks or constituted by odd-numbered scanning signal lines included in adjacent two blocks, and
the groups are sequentially selected in an order from an upstream side to a downstream side.

25. The liquid crystal display device according to claim 23, wherein:
the predetermined scanning signal line and subsequent scanning signal lines in the display area are divided into blocks by borders parallel to the scanning signal lines,
the preceding group includes odd-numbered scanning signal lines included in one of the blocks and the succeeding group includes even-numbered scanning signal lines included in the one of the blocks, or
the preceding group includes even-numbered scanning signal lines included in one of the blocks and the succeeding group includes odd-numbered scanning signal lines included in the one of the blocks, and
the groups are selected in an order from a group included in a most upstream side block to a group included in a most downstream block, the most upstream side block including the predetermined scanning signal line and being disposed at one end, and the most downstream block being disposed at the other end.

26. The liquid crystal display device according to claim 1, wherein:
a predetermined scanning signal line and subsequent scanning signal lines in the display area are divided into blocks by borders parallel to the scanning signal lines,
scanning signal lines in each of the blocks constitute a group, and
groups thus created are sequentially selected in an order from a group constituted by scanning signal lines in a most upstream side block to a group constituted by scanning signal lines in a most downstream side block, the most upstream side block including the predetermined scanning signal line and being disposed at one end, and the most downstream block being disposed at the other end.

27. A liquid crystal display device comprising:
a plurality of data signal lines;
a plurality of scanning signal lines;
dummy scanning signal lines provided in a non-display area;
a data signal line driving circuit that supplies signal electric potentials of a first polarity to the plurality of data signal lines during a first period constituted by a plurality of successive horizontal scanning periods, the data signal line driving circuit further supplying signal electric potentials of a second polarity to the plurality of data signal lines during a second period constituted by a plurality of successive horizontal scanning periods, the second period following the first period; and
a scanning signal line driving circuit that activates at least one scanning signal line by at least one pulse during each horizontal scanning period and activates at least one dummy scanning signal line by at least another pulse during a dummy scanning period inserted between the first period and the second period, wherein

- a number of gate pulse(s) from the scanning signal line driving circuit in the dummy scanning period is same as a number of gate pulse(s) from the scanning signal line driving circuit in the first horizontal scanning period of the second period,
- (i) a termination of a first gate pulse in the dummy scanning period and (ii) an initiation of a second gate pulse in the first horizontal scanning period of the second period have time overlap, and
- (A) each of the scanning signal lines is activated in synchronization with a start of corresponding horizontal scanning, and is deactivated in synchronization with an end of the corresponding horizontal scanning, a width of the first gate pulse and second gate pulse being equal to a single horizontal scanning period, or
- (B) each of the scanning signal lines is activated in synchronization with a start of another horizontal scanning carried out immediately before the corresponding horizontal scanning, and is deactivated in synchronization with the end of the corresponding horizontal scanning, a width of the first gate pulse and second gate pulse being two times as wide as a single horizontal scanning period.

28. The liquid crystal display device according to claim 27, wherein the scanning signal line driving circuit activates at least one scanning signal line for a predetermined period of time during each horizontal scanning period, and then deactivates said at least one scanning signal line, and the scanning signal line driving circuit activates the at least one dummy scanning signal line for a predetermined period of time during the dummy scanning period, and then deactivates the dummy scanning signal line.

29. The liquid crystal display device according to claim 27, wherein the data signal line driving circuit supplies a dummy electric potential of the second polarity to the plurality of data signal lines during the dummy scanning period.

30. The liquid crystal display device according to claim 27, wherein the scanning signal line driving circuit activates the at least one dummy scanning signal line during a timing adjustment scanning period inserted between a predetermined horizontal scanning period and a horizontal scanning period or a dummy scanning period which comes next after the predetermined horizontal scanning period.

31. The liquid crystal display device according to claim 27, wherein the scanning signal line driving circuit performs interlace scanning.

32. A method for driving a liquid crystal display device which includes scanning signal lines disposed in a display area, a scanning signal line driving circuit and at least one dummy scanning signal line disposed in a non-display area, the scanning signal lines being divided into groups each of which includes a plurality of scanning signal lines, the groups being sequentially selected, and signal electric potentials of an identical polarity being sequentially supplied to a data signal line while scanning signal line belonging to a selected one of the groups are sequentially scanned horizontally, the method comprising:

- inverting the polarity of the signal electric potentials when the selected one of the groups is changed from a preceding group to a succeeding group which is selected subsequent to the preceding group,
- inserting a dummy scanning period between a horizontal scanning period corresponding to last horizontal scanning in the preceding group and a horizontal scanning period corresponding to first horizontal scanning in the succeeding group,
- causing the at least one dummy scanning signal line to be subjected to dummy scanning during the dummy scanning period, wherein
- a number of gate pulse(s), for dummy scanning, output from the scanning signal line driving circuit in the dummy scanning period or each of the plurality of dummy scanning periods is same as a number of gate pulse(s), for horizontal scanning, output from the scanning signal line driving circuit in the horizontal scanning period corresponding to first horizontal scanning in the succeeding group,
- (i) a termination of a first gate pulse in the dummy scanning period or one of the plurality of dummy scanning periods and (ii) an initiation of a second gate pulse in the horizontal scanning period corresponding to first horizontal scanning in the succeeding group have time overlap, and
- (A) each of the scanning signal lines is activated in synchronization with a start of corresponding horizontal scanning, and is deactivated in synchronization with an end of the corresponding horizontal scanning, a width of the first gate pulse and second gate pulse being equal to a single horizontal scanning period, or
- (B) each of the scanning signal lines is activated in synchronization with start of another horizontal scanning carried out immediately before the corresponding horizontal scanning, and is deactivated in synchronization with the end of the corresponding horizontal scanning, a width of the first gate pulse and second gate pulse being two times as wide as a single horizontal scanning period.

33. A television receiver comprising:
a liquid crystal display device as set forth in claim 1; and
a tuner section that receives television broadcast.

* * * * *